US005526389A

United States Patent [19]
Buell et al.

[11] Patent Number: 5,526,389
[45] Date of Patent: Jun. 11, 1996

[54] SPREAD SPECTRUM OPEN LOOP DATA RECOVERY PROCESSOR

[75] Inventors: Bruce A. Buell, San Jose; Migdat Hodzic, Santa Clara, both of Calif.

[73] Assignee: Senses Data Communicaion, San Jose, Calif.

[21] Appl. No.: 93,194

[22] Filed: Jul. 16, 1993

[51] Int. Cl.[6] .............................. H04B 1/69; H04B 1/707
[52] U.S. Cl. .......................... 375/200; 375/206; 375/208; 380/34
[58] Field of Search .............................. 375/1, 200–210; 380/34

[56] References Cited

U.S. PATENT DOCUMENTS

| | | | |
|---|---|---|---|
| 4,701,934 | 10/1987 | Jasper | 375/1 |
| 4,785,463 | 11/1988 | Janc et al. | 375/1 |
| 4,972,430 | 11/1990 | Cantwell | 375/1 |
| 5,120,997 | 6/1992 | Cantwell | 375/1 X |
| 5,237,586 | 8/1993 | Bottomley | 375/1 |
| 5,268,927 | 12/1993 | Dimos et al. | 375/1 |

*Primary Examiner*—Bernarr E. Gregory
*Attorney, Agent, or Firm*—Douglas A. Chaikin

[57] ABSTRACT

A spread spectrum open loop data recovery processor receives a single information channel bi-phase modulated RF signal and combines it with a locally generated fixed frequency signal having an accuracy of at least 5 ppm. A balanced demodulator combines the received and local signals to derive an 'I' and a 'Q' analog information signal. The remote transmitter modulates both channels with the same information. The 'I' and 'Q' analog signals 'slip' with respect to one another. The accuracy of the fixed frequency signal insures that the rate of slip does not exceed the ability of the data recovery processor to attain an error rate of better than 1 ppm. The 'slip' results in both analog signals periodically going through null. The quadrature phase relationship between the 'I' and 'Q' analog signals insures that both are not simultaneously null. An amplitude comparator determines which analog signal has the greater instantaneous amplitude. After noise filtering and correlation with a copy of a 13-bit Barker PN code used by the remote transmitter, the 'stronger' signal is output as 'received data.' The short PN code allows signal acquisition in less than one 'byte,' resulting in rapid switching between transmit and receive modes.

11 Claims, 48 Drawing Sheets

ISR52

SPREAD SPECTRUM OPEN LOOP DATA RECOVERY PROCESSOR

BACKGROUND OF THE INVENTION

1. Field of the Invention

This invention relates to the field of data communications devices, and more particularly to spread spectrum data recovery devices.

2. Previous Art

Spread spectrum systems have been known at least since the disclosure of U.S. Pat. No. 3,160,711 to Schroeder in 1964. Pat. '711 relates to a communication apparatus for transmitting a message wave. The transmission apparatus creates pulse groups for representing the information in the message, and which have two characteristics. One characteristic of the pulse group indicates the amplitude of a time spaced sample of the message wave, and the other characteristic of the pulse group indicates the intended receiver of the pulse group. The transmission apparatus further has means for widening each pulse of the group before transmitting the group. In parlance adopted since Schroeder's disclosure, 'widening' is called 'spreading', and it is accomplished by replacing the presence or absence of one pulse in each time period of the pulse group with a group of pulses arranged in a sequence called a 'spreading code.'

Data communication systems which use spread spectrum have historically been designed to fulfill requirements for communications performance and reliability that are not achievable with prior improvements in communications technology such as frequency modulation (FM) and single-side band (SSB) technologies. Such requirements include immunity from strong interfering signals, receiving signals that are very weak, providing many communication channels within a restricted band of frequencies, scrambling the transmitted information so that it cannot be received by unwanted receivers, and processing the transmitted signal so that the fact that it is even being sent is concealed.

These requirements historically have arisen in applications such as military and aerospace communications systems. In military applications, interfering signals can be caused by the intentional efforts of an enemy. Additionally in military applications, avoidance of detection is an asset. In aerospace applications, difficulties arise due to the weakness of signals received over great distances. Cost has seldom, if ever, been a design constraint in any of the above systems.

Characteristic of spread spectrum communication systems are improved security, greater immunity from interference, and more efficient use of spectrum space, compared with the characteristics of communications systems which do not use spread spectrum technology. These characteristics are attractive for certain consumer and industrial applications. However, the cost of implementation has been an obstacle to adoption of spread spectrum technology in the commercial sector.

One element of prior art spread spectrum receivers that significantly contributes to the expense of spread spectrum equipment is the phase-locked loop which synchronizes the receiver's demodulation clock with the modulation clock of the transmitter whose signal is being received. The expense of this element arises not only from the cost of its individual components, but also from the labor cost to adjust it for proper operation during manufacture.

SUMMARY OF THE INVENTION

It is an object of this invention to provide the advantages of spread spectrum technology to data communications at affordable costs.

It is a further object of this invention to provide a spread spectrum data recovery system which operates with acceptable performance without phase locking a receiver oscillator to the received signal.

It is a further object of this invention to provide a spread spectrum communications system suitable in performance and in cost for applications such as industrial control and sensing.

In accordance with the above objects and those that will be mentioned and will become apparent below, the spread spectrum open loop data recovery processor in accordance with this invention comprises:

a balanced demodulator receiving a single information channel bi-phase modulated spread spectrum RF signal and a fixed frequency signal, the balanced demodulator combining the two signals to provide an 'I' information signal and a 'Q' information signal;

an oscillator for providing the fixed frequency signal; and a digital processor receiving the 'I' information signal and the 'Q' information signal and a predetermined spreading code, the digital processor filtering both the 'I' and the 'Q' information signals for noise and correlating the filtered information signals with the predetermined spreading code, the digital processor defining a 'better quality' information signal based on the filtering and correlation and selecting the better quality information signal for output as a 'received data' signal and outputting a clock signal for use with the received data signal, whereby a single spread spectrum information channel is provided without phase locking to the received RF signal.

In a preferred embodiment, the oscillator is not phase locked to the modulated spread spectrum RF signal, unlike the case in all previous spread spectrum receivers, but has a fixed frequency with an accuracy of at least five parts per million.

In the preferred embodiment, the free-running oscillator operates nominally at the carrier frequency. Yet, since the oscillator is not phase locked to the carrier, the fixed frequency and the carrier frequency will continue to "slip" with respect to one another. This slip will result in modulator in-phase and quadrature information signals whose amplitudes will periodically null in step with the rate of slip. The underlying feature of the invention, which makes possible the elimination of an oscillator phase locked to the received RF signal, is that the in-phase and quadrature signals do not both become null at the same time, since the two signals differ in phase by 90 degrees. The task of the digital processor is to accommodate the slip by selecting the non-null in-phase or quadrature signal during the time each of the signals goes through its periodic null. The selected signal is output as 'received data.'

In another preferred embodiment, the demodulator includes an amplitude comparator and provides a digital output signal indicating which analog information signal has the greater amplitude.

An additional preferred embodiment includes the use of a 13-bit Barker code as the spreading code. This code has many fewer bits than the typical spreading code and results in a rapid acquisition time.

It is an advantage of this invention to eliminate phase locking an oscillator to the received RF signal which is always used for quadrature demodulation of a spread spectrum signal.

It is another advantage of this invention to use a digital processor to accommodate the effects of eliminating the phase locked operation.

It is yet another advantage of the present invention to provide a short acquisition time through the use of a 13-bit long spreading code.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein.

DETAILED DESCRIPTION OF THE INVENTION

Certain terms well known in the art of spread spectrum communication are used herein. The meaning of these terms are found in the book, "Spread Spectrum Systems" 2nd edition, by Robert C. Dixon, published by Wiley-Interscience in 1984, which is specifically incorporated herein by reference. It is the convention in this description that lines connecting functional elements, and the signals carried on those lines, will be referenced by the same numeral. Signal lines labeled with the same name are connected together on the same figure if the signals are not enclosed in boxes, and are connected together among different figures if the signal names are enclosed in boxes.

INTRODUCTION

The present invention represents a technological breakthrough in the field of spread spectrum communications. Briefly, an expensive and difficult to adjust phase locked oscillator, previously necessary to demodulate a received signal, has been replaced by a stable, fixed frequency oscillator operating at the nominal RF sub-carrier frequency. The effects of eliminating the phase locked oscillator are accommodated by digital circuits which do not require adjustment during manufacture or operation.

The transmitted signal begins with a single information bi-phase spread spectrum modulation of an intermediate sub-carrier frequency. In a preferred embodiment the intermediate sub-carrier frequency is 60 MHz. The modulated intermediate sub-carrier frequency is translated to a primary carrier frequency for transmission. In a preferred embodiment the primary carrier frequency is 912.5 MHz.

Figure 25:
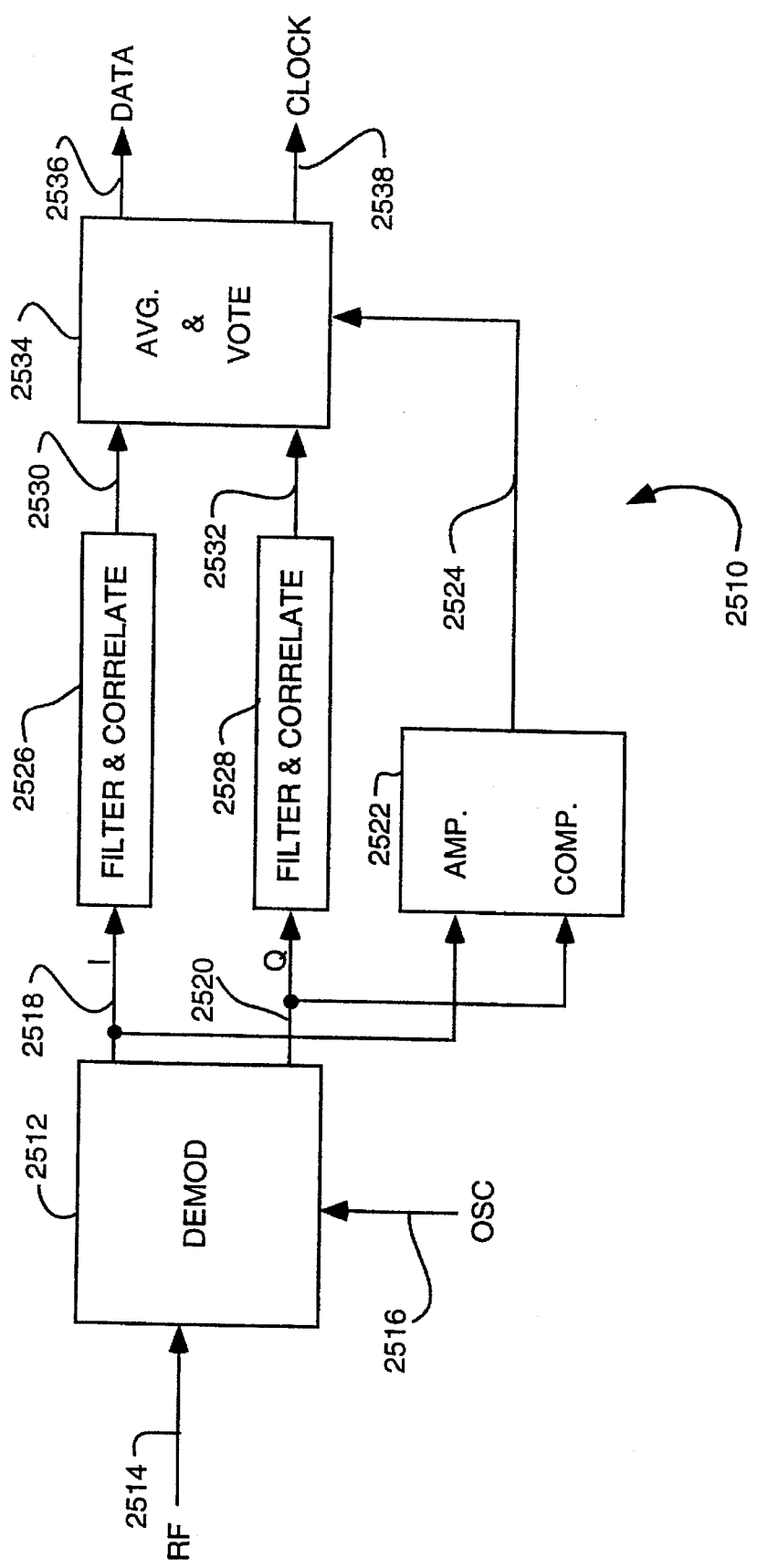
FIG. 25 is a simplified block diagram of a data recovery processor according to one aspect of the present invention.

FIG. 25 illustrates, in a block diagram format, a spread spectrum data recovery processor in accordance with the present invention, designated generally by the numeral 2510. FIG. 25 is highly simplified, and is intended solely for the purpose of introducing the general concepts of the invention. It is not intended to define the structure of the preferred embodiment which will be described below with respect to FIGS. 1–24.

Figure 1A:
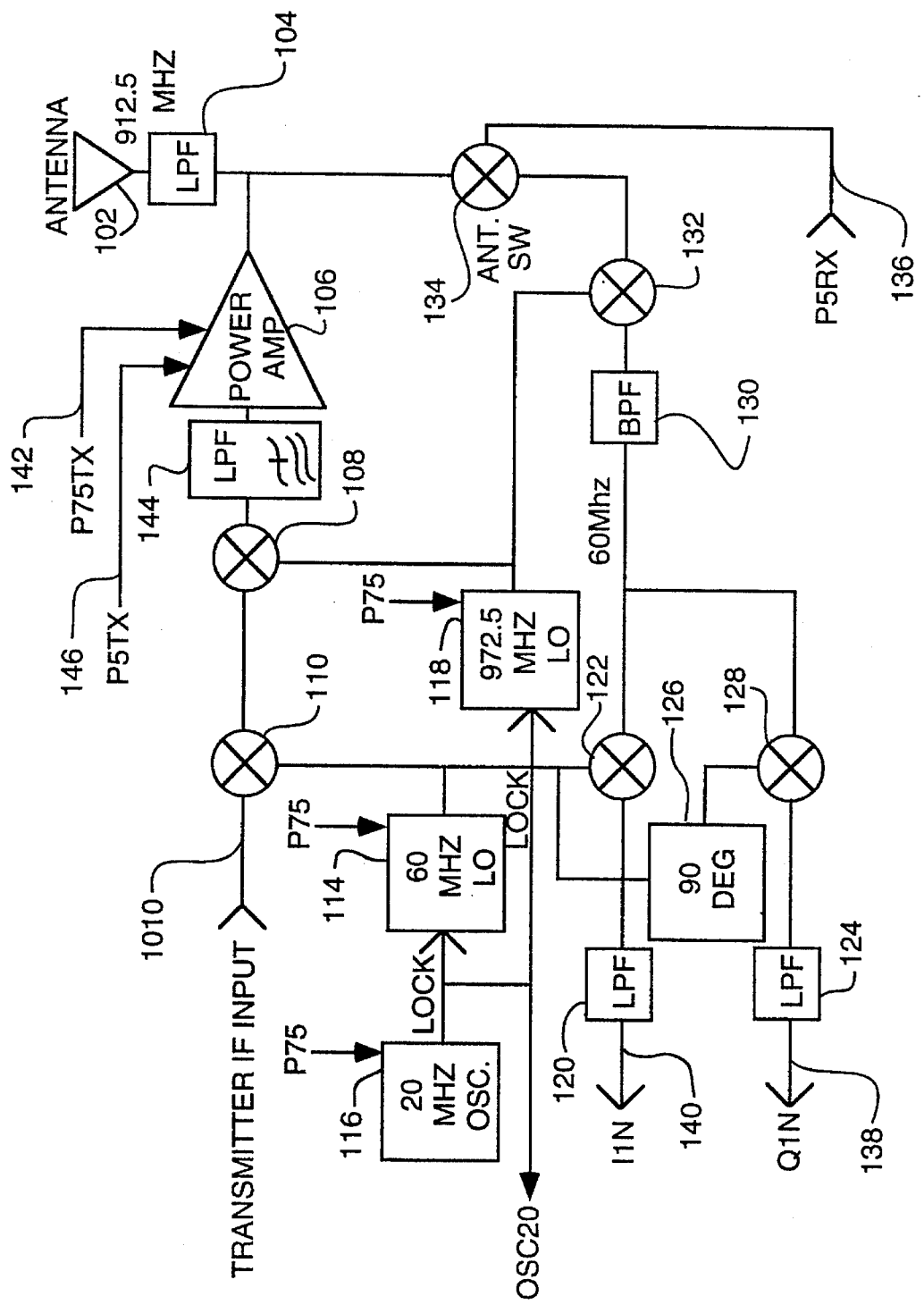
FIGS. 1A and 1B are a block diagram of the transmitter-receiver of this invention.

The data recovery processor 2510 includes a balanced demodulator 2512 having two inputs. The first input is the single information bi-phase modulated intermediate sub-carrier frequency signal 2514. The second input is a fixed frequency signal 2516 supplied by the stable, fixed frequency oscillator, signal OSC 2516. As illustrated in FIG. 25, the modulated sub-carrier RF signal 2514 has been separated previously from the primary carrier (FIG. 1A). The balanced demodulator 2512 produces a single in-phase analog information signal ("I") 2518 and a single quadrature analog information signal ("Q") 2520.

The frequency of the fixed frequency oscillator is nominally equal to the subcarrier RF frequency. But since the fixed frequency oscillator is not phase locked to the sub-carrier RF input 2514, the fixed frequency input signal 2516 will slip with respect to the modulated sub-carrier RF signal 2514. This slip will cause the amplitude of the I analog information signal 2518 and the Q analog information signal 2520 to periodically null. This periodic null will occur at a rate equal to the rate of the slip. However, because of the fixed phase relationship between the I and the Q analog information signals 2518, 2520, the two analog signals will not both be null at the same instant. The fact that the I and Q analog information signals cannot both be null at the same instant is central to the operation of the invention. This concept will be more fully explained below with respect to the preferred embodiment.

The I and the Q analog information signals 2518, 2520, are inputs to an amplitude comparator 2522. The I and Q information signals are analog signals and each has an amplitude which varies as the demodulator inputs 2514, 2516 slip with respect to one another. The amplitude comparator 2522 continuously compares the amplitudes of the I and Q analog information signals 2518, 2520, and produces a single output signal 2524 based upon which of the I or Q analog information signals has the greater amplitude at any time. The purpose of this comparator output signal 2524 will be explained below.

The I and Q analog information signals 2518, 2520 are each received by identical filtering and correlation digital circuits 2526 and 2528, respectively. Each of the analog information signals 2518, 2520 is converted to a digital signal and is then digitally filtered to detect the presence of noise and is then correlated with a copy of the spreading code which was used to create the spread spectrum modulated RF signal 2514. Successful filtering and correlation will result in the creation of valid and correlated in-phase and quadrature data signals 2530 and 2532, respectively.

Data signals 2530 and 2532 are applied as inputs to an averaging and voting digital circuit 2534 used to select the better quality of the two data signals 2530, 2532 for output as a received data signal 2536. A corresponding clock signal 2538 is provided for use with the received data signal 2536.

Selection of the better quality data signal is accomplished as follows. If the inphase and the quadrature data signals 2530 and 2532 are both valid and correlated and if the two data signals agree, a predetermined one of the data signals is selected as the better quality signal. If on the other hand, either data signal 2530, or 2532 is not both valid and correlated, the other data signal is selected as the better quality signal.

A special case arises when both data signals 2530, 2532 are valid and correlated but do not agree. When this happens, the averaging and voting circuit 2534 relies upon the amplitude comparator 2522 output signal 2524 indicating which of the I or Q analog information signals 2518, 2520 has the greater amplitude. The better quality signal will be that which corresponds to the analog information signal having the greater amplitude, and therefore derived from the stronger analog information signal 518, 2520. In the preferred embodiment, the greater amplitude signal 2524 is averaged over a predetermined interval by the averaging and voting circuit 2534. The result of the averaging is used to make the final selection of the better quality signal.

STRUCTURE

The invention will now be described with respect to FIGS. 1A and 1B which illustrate the RF section of the present invention, and the relationship between the RF, the IF and the digital sections. A balanced mixer 110 receives a spread transmitter IF signal 1010, mixes it with a signal from a 60 MHz locked oscillator 114, and provides a 60 MHz signal to a balanced mixer 108. The 60 MHz oscillator 114 and a 972.5 MHz locked oscillator 118 are phase locked to a 5 ppm accurate crystal oscillator 116. The balanced mixer 108 receives the 60 MHz signal from the mixer 110 and mixes it with the 972.5 MHz signal from the oscillator 118, producing a difference output of 912.5 MHz which is filtered by a low pass filter 144, amplified by a power amplifier 106, and fed through a low pass filter 104 to an antenna 102 where the 912.5 MHz signal is radiated so that it can be received at a distance.

Figure 1B:
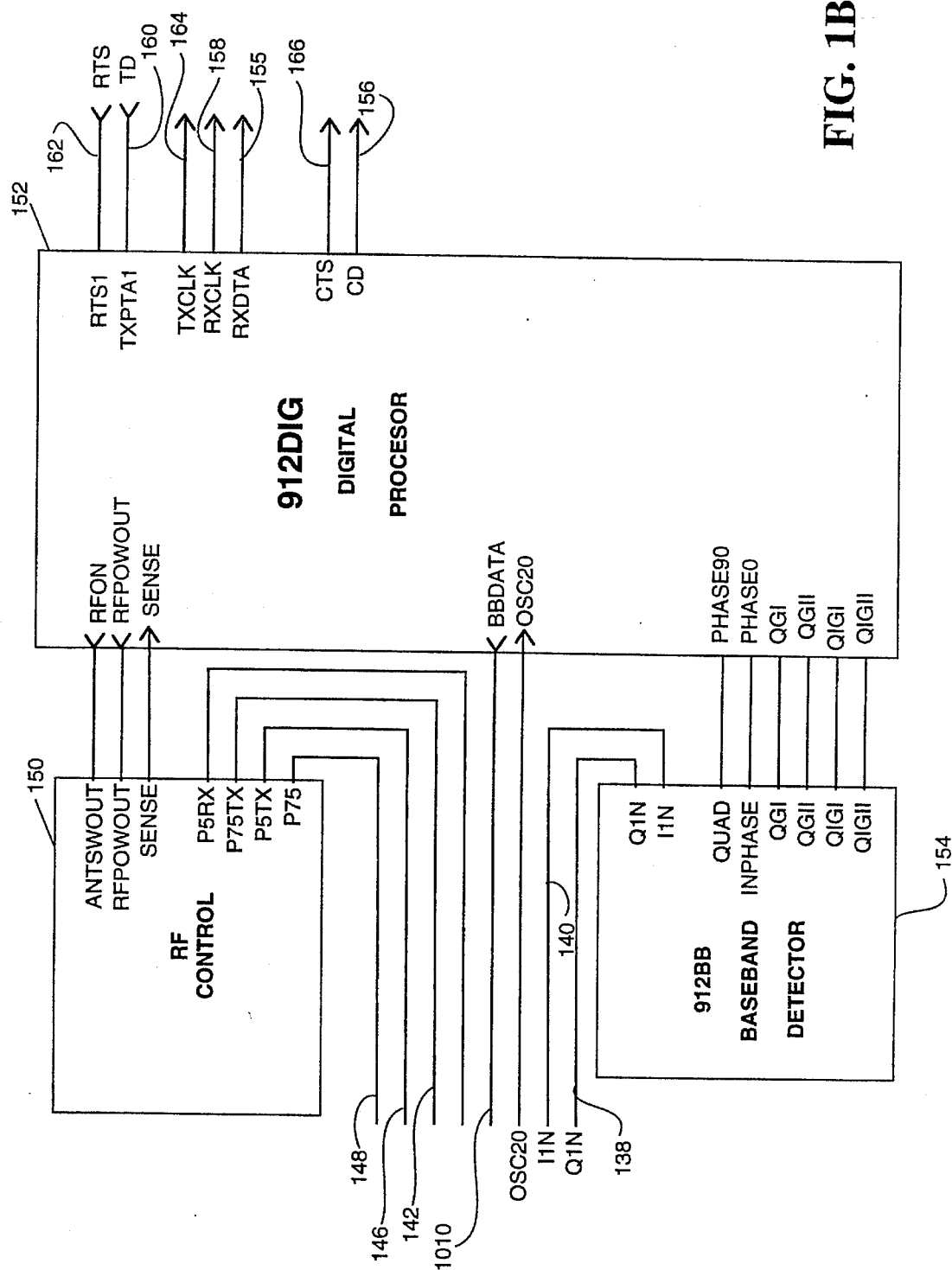
Figure 2:
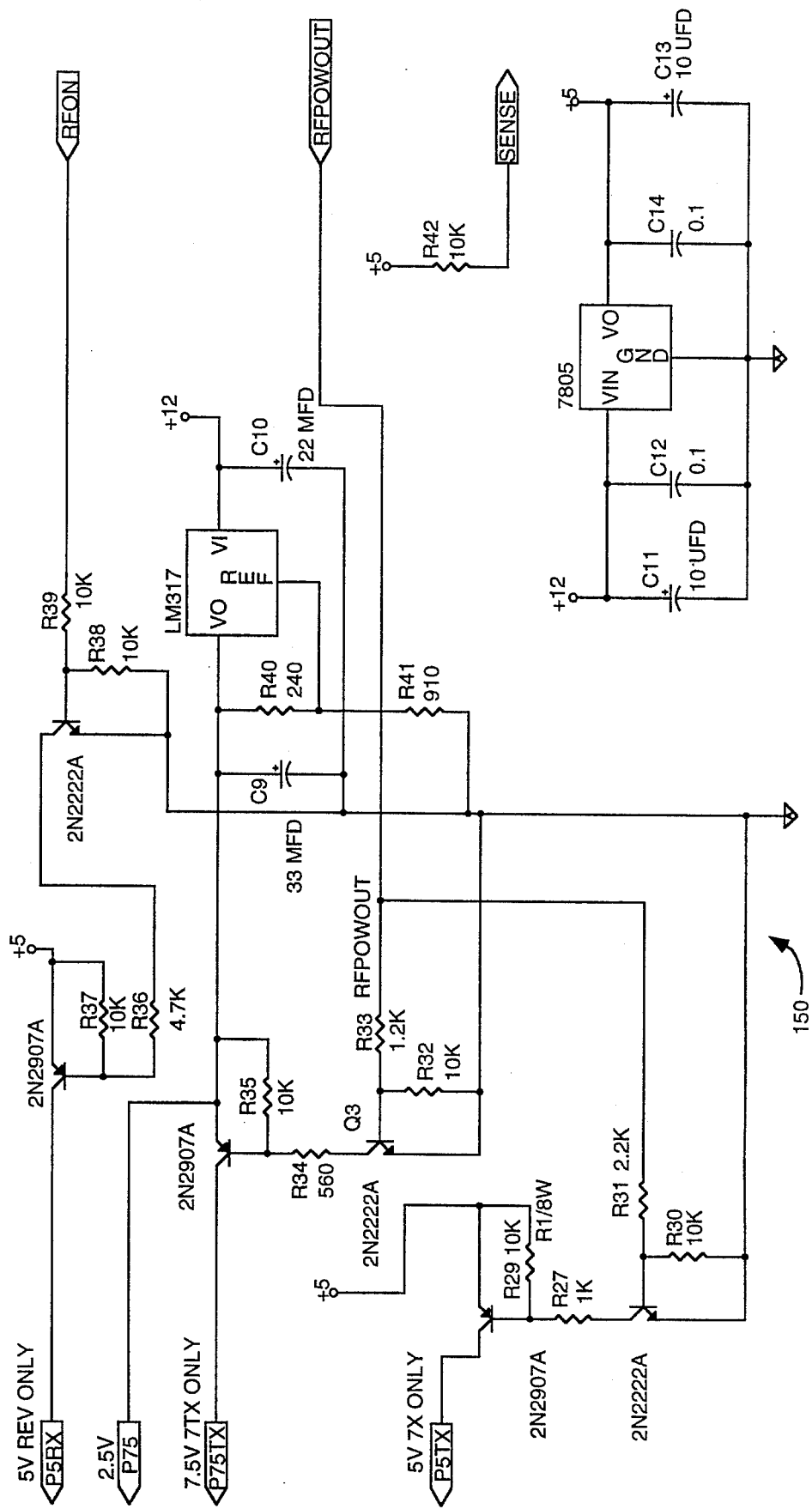
FIG. 2 is a schematic diagram of the RF control circuit of FIGS. 1A, 1B.

The power amplifier 106 is enabled by switched power lines 142 and 146 which are generated by transmitter control logic 150 (FIG. 1B). Signals radiated by antennas connected to other transmitters are coupled from the antenna 102 through the low pass filter 104 and an antenna switch 134 to a balanced mixer 132. The antenna switch 134 is enabled by a switched power signal 136 to connect the antenna 102 to the balanced mixer 132 when the receiver is to operate. The balanced mixer 132 combines the received 912.5 MHz signal with the output of the 972.5 MHz oscillator 118. The 60 MHz difference signal produced by the mixer 132 is passed by a 60 MHz bandpass filter 130 to double balanced demodulators 122 and 128. The balanced demodulator 122 additionally receives a 60 MHz signal from the oscillator 114, and produces an in-phase demodulated signal which is filtered by a low pass filter 120 and provided to receiver IF circuitry as the I1N signal 140. The balanced demodulator 128 receives a 60 MHz signal from a 90 degree phase shifter 126 which in turn receives a 60 MHz signal from the oscillator 114. The balanced demodulator 128 then produces a quadrature-phase demodulated signal which is filtered by a low pass filter 124 and provided to the receiver IF circuitry as the Q1N signal 138. Circuitry common to the receiver and transmitter, oscillators 114, 116, and 118 are powered by a power line 148 (FIG. 1B). An RF control circuit 150 (FIG. 1B) receives digital control signals from a digital processor 152 and supplies power to the RF circuitry in accordance with the selection of transmit or receive mode, as is apparent in the detailed schematic of FIG. 3.

A baseband detector 154 receives the demodulator output signals Q1N 138 and I1N 140, and converts them into polarity and amplitude signals for the digital processor 152, which in turn converts these inputs into outputs typical of a synchronous modem, namely, received data RXDTA 155, carrier detect signal CD 156, and receive clock RXCLK 158. The digital processor 152 also receives typical transmit modem signals as transmit data TD 160, request to send RTS 162, and provides transmit modem signals as transmit clock TXCLK 164 and clear to send signal CTS 166.

In the preferred embodiment, the oscillator 116 is specified to have an accuracy of 5 ppm (parts per million) (part number XA2602 by KVG). At the present time, oscillators of less accuracy do not cost significantly less, and oscillators of significantly greater accuracy, say, 1 or 2 ppm, cost disproportionately more than any benefit that would be derived from their accuracy in this receiver. The oscillator 116 provides a 20 MHz signal to all parts of the transmitter and receiver which require a signal of this frequency.

With respect to FIGS. 10A–10D, the transmitter IF signal 1010 is generated by first passing the data to be transmitted through a 4-bit scrambler 1002 to randomize the data without encrypting it, in a manner similar to that found in modems of the Bell 212 variety. The scrambled transmit data is then phase shift encoded in an encoder 1004 so that, in the preferred embodiment, data 'zeros' produce a phase shift, and data 'ones' do not produce a phase shift and then spread in the traditional way by XOR-ing each bit with a pseudo-noise (PN) code in an XOR gate 1006. In the preferred embodiment, a relatively short code is used, namely a 13-bit Barker code produced by a code generator 1008. The resulting spread data stream is IF signal 1010 which is provided to the transmitter RF section described above (FIG. 1A).

A short code is advantageous for permitting more rapid receiver lock-in, which in turn permits more efficient transmission of short messages. This is particularly useful to help hold down equipment cost, because it permits efficient half-duplex transmission protocols in which the receiver and the transmitter in a given unit are not operated at the same time. In such a protocol, the time it takes to acquire receiver lock to the remote transmitter determines how quickly the message may be received so that the receiver can be shut off and the transmitter turned on. Rapid receiver locking reduces this overhead period and thus permits more information to be sent and received in a given period of time. Full duplex protocols do not require transmission to be interrupted in order to receive information, but do require expensive filters in the receiver and antenna circuitry to prevent the local transmitter from swamping the local receiver.

The disadvantages of a short code, that it is more likely to cause a false lock in the receiver, and that it provides less process gain which in turn provides a lower signal to noise ratio, are largely offset by the novel design of the receiver circuit which lessens the likelihood of a false lock on noise, and which is discussed below.

Figure 3:
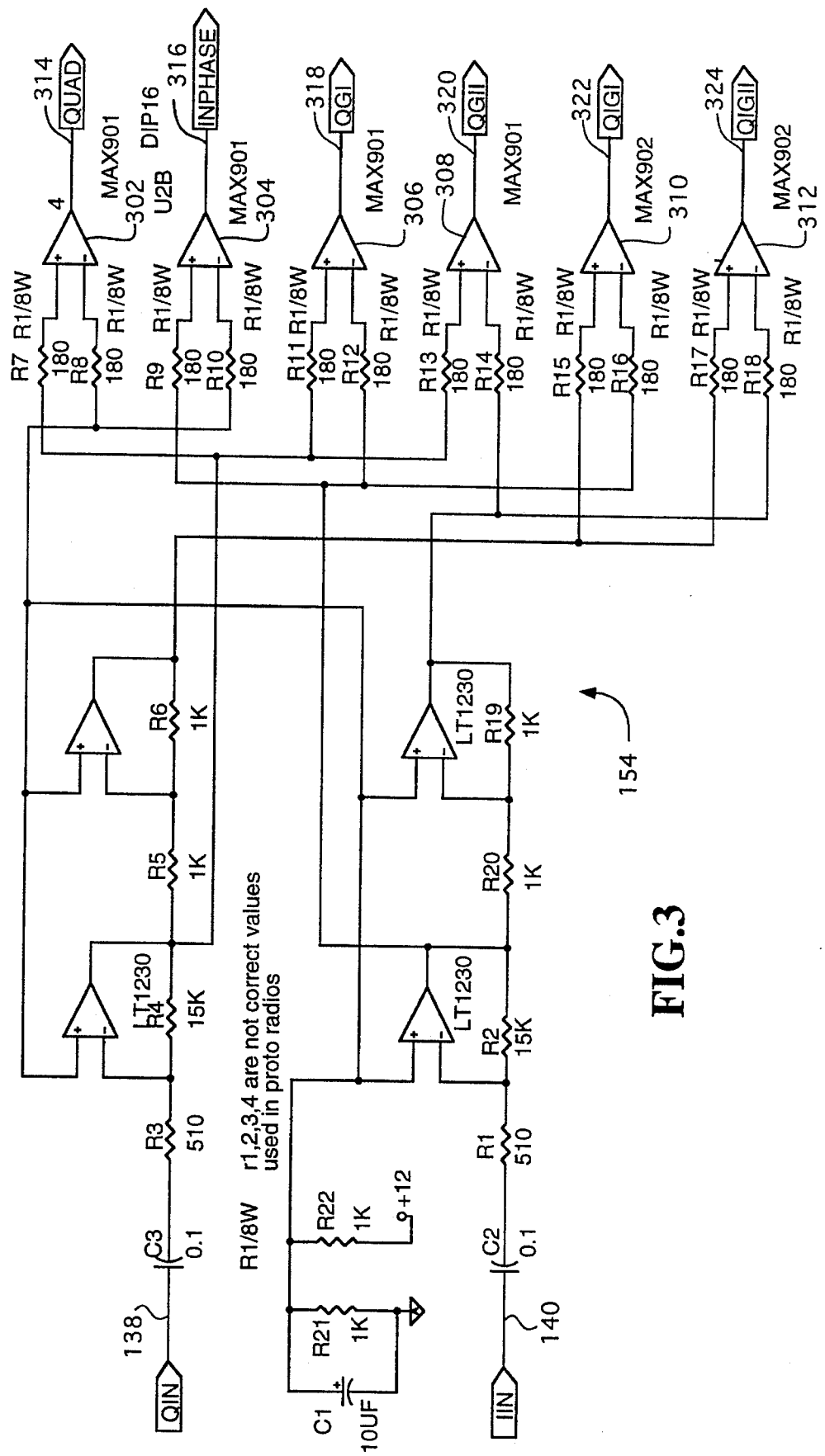
FIG. 3 is a schematic diagram of the baseband detector of FIGS. 1A, 1B.

With respect to FIG. 3, the outputs I1N 140 and Q1N 138 of the I and Q balanced receiver demodulators 122, 128 in the receiver RF section (FIG. 1A) are coupled to the baseband detector circuit 154, consisting of a set of six comparators 302–312 which produce I and Q data signals INPHASE 316 and QUAD 314, and four comparison signals 318–324, QGI ('Q' amplitude greater than 'I' amplitude), QGI I ('Q' amplitude greater than inverted 'I' amplitude), QIGI (inverted 'Q' amplitude greater than 'I' amplitude), and QIGII (inverted 'Q' amplitude greater than inverted 'I' amplitude). The I and Q data signal comparators 304 and 302 respond only to the polarity of their respective demodulators, generating a digital zero on the positive half cycle of the demodulator output, and generating a digital one on the negative half cycle of the demodulator output. The comparison signals 318–324 are generated in comparators 306–312 by comparing the inverted or non-inverted 'Q' demodulator output Q1N 138 with the inverted or non-inverted 'I' demodulator output I1N 140, thus providing a set of digital signals 318–324 which indicate which of the two demodulators 122 and 128 is generating the stronger signal, i.e., the 'better quality' signal.

Figure 4A:
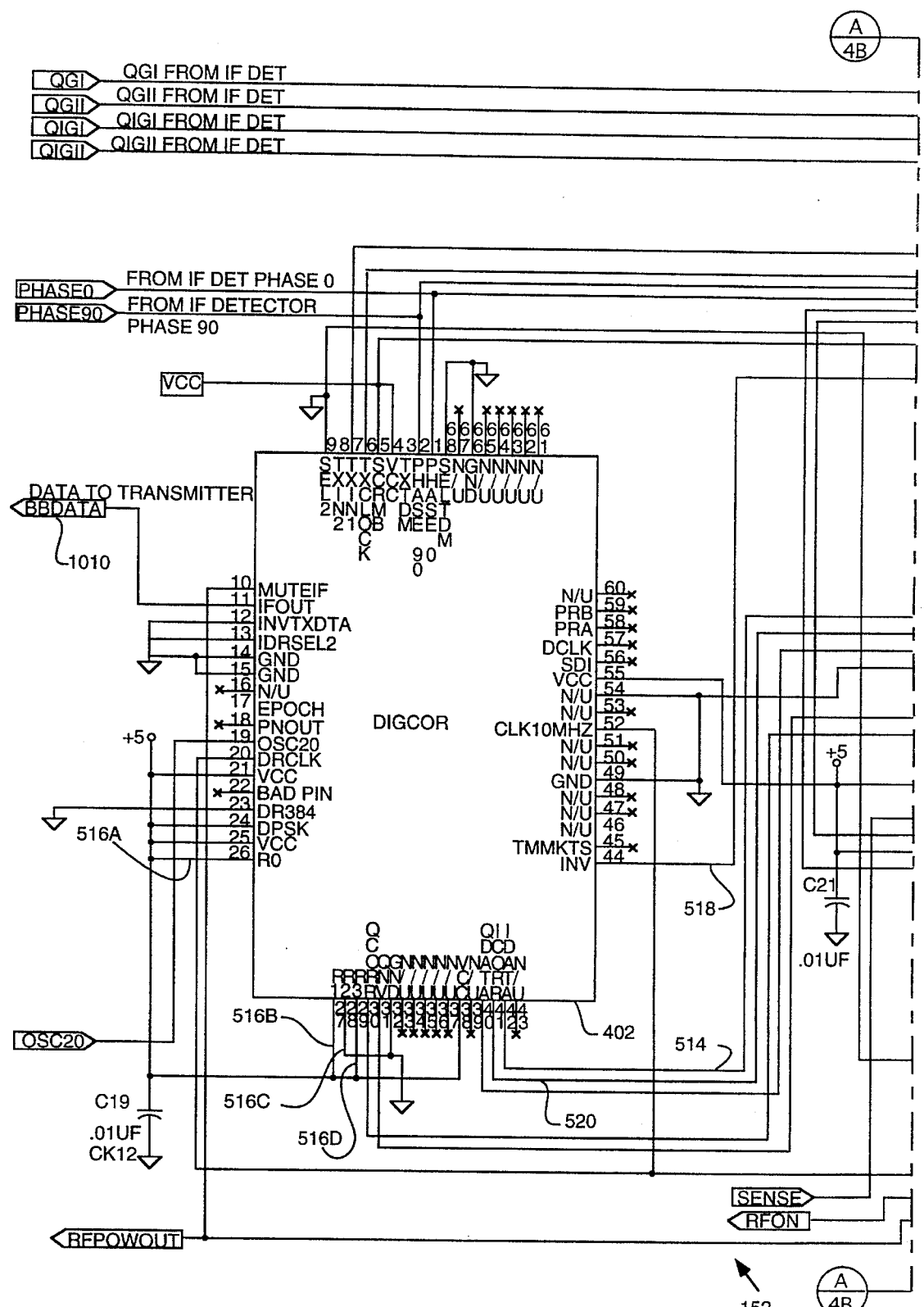
FIGS. 4A and 4B are a block diagram of the digital processor of FIGS. 1A, 1B.
Figure 4B:
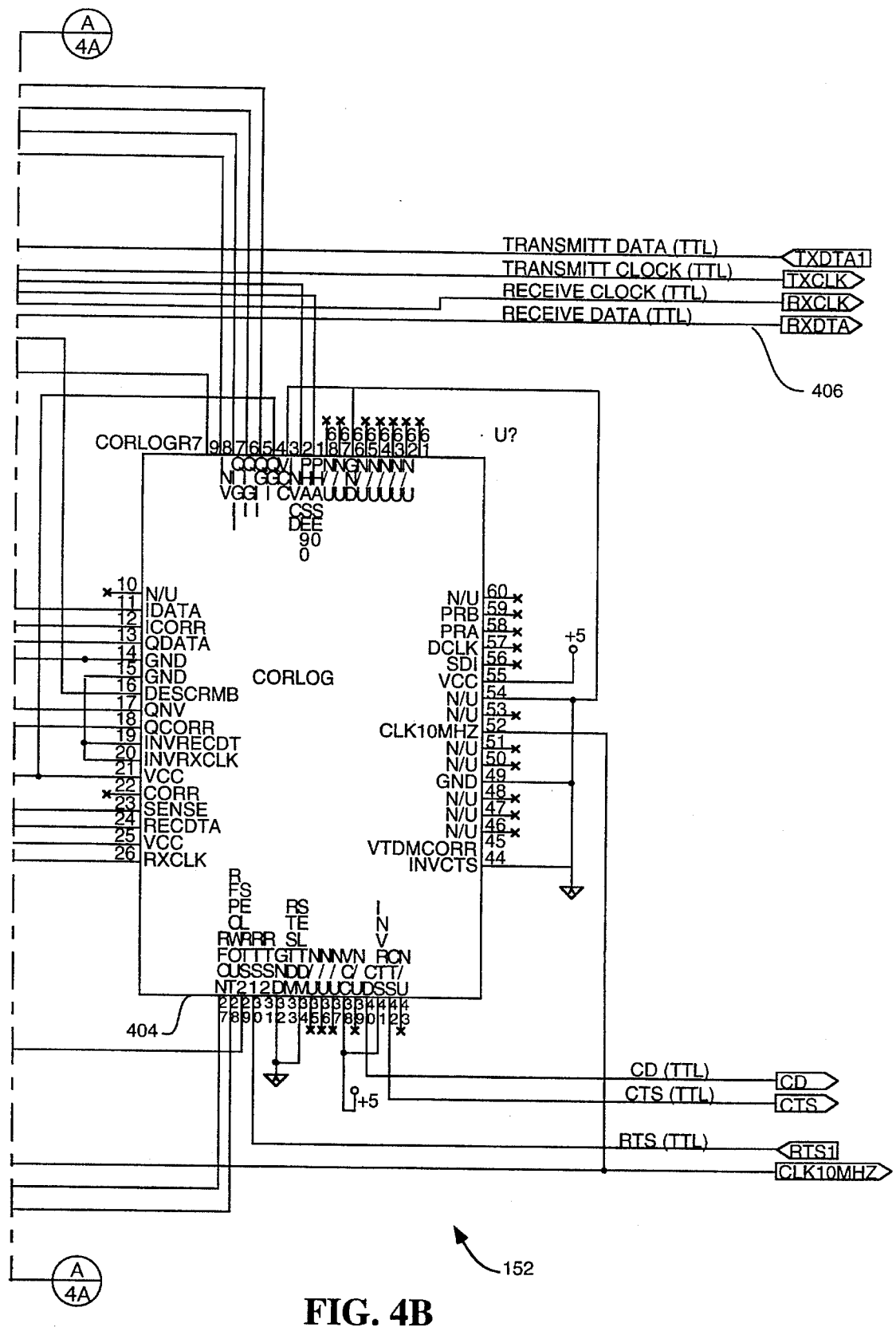

With respect to FIGS. 4A and 4B, the digital processor 152 is composed of two circuit blocks, DIGCOR 402 and CORLOG 404. In the preferred embodiment, these two circuit blocks are implemented in separate digital CMOS gate array circuits, but all of this circuitry could just as easily be partitioned into more or fewer logic chips as the specific application requires.

With respect to FIGS. 5A–5C and 16A, 16B, the receiver consists of two separate digital processing channels, one to process the in-phase (I-channel) output of the receiver RF section, and one to process the quadrature-phase (Q-channel) output of the receiver RF section. In addition, there is an amplitude comparison and processing channel which generates a control signal used in the last stage of the receiver processing where the output of the two digital processing channels are combined.

The digital channel is shown in block form in FIGS. 5A–5C and 16A, 16B. Inphase polarity signal 316 (INPHASE on FIG. 3 and PHASE0 on FIG. 5A) from the baseband detector 154 is processed through a shift register 502, a summation circuit 504, a pipeline register 506, a polarity generator and absolute value converter 508, a pipeline register 510, a correlation threshold circuit 512, an in-phase channel data recovery and timing window circuit 1602, and finally, a combined channel data recovery and timing window circuit 1604.

Figure 6A:
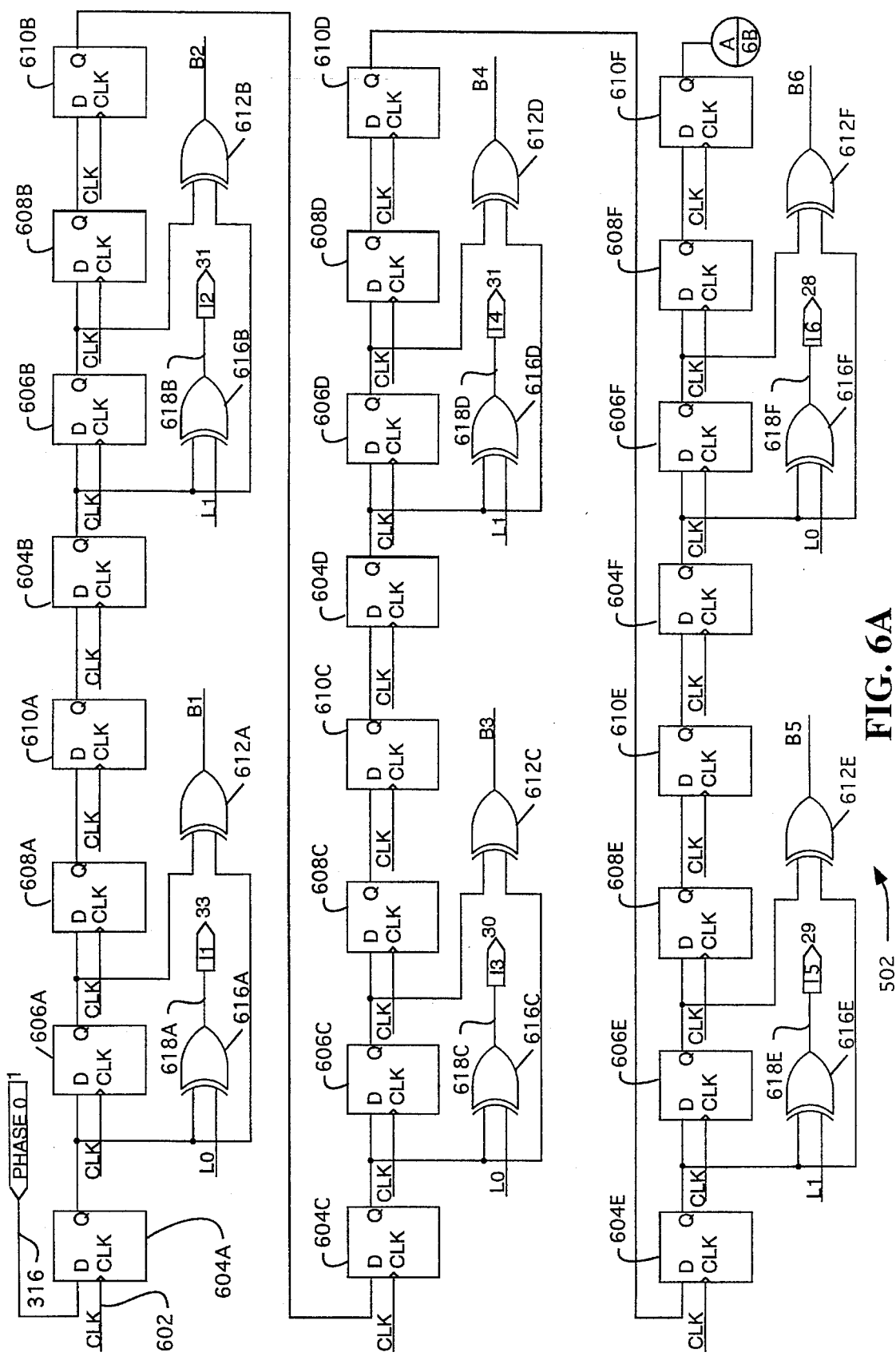
FIGS. 6A–C; 7A, B; 8A–C; 9A,B; 10A–D and 11–15 are schematic diagrams of each block illustrated in FIGS. 5A, 5B and 5C.
Figure 6B:
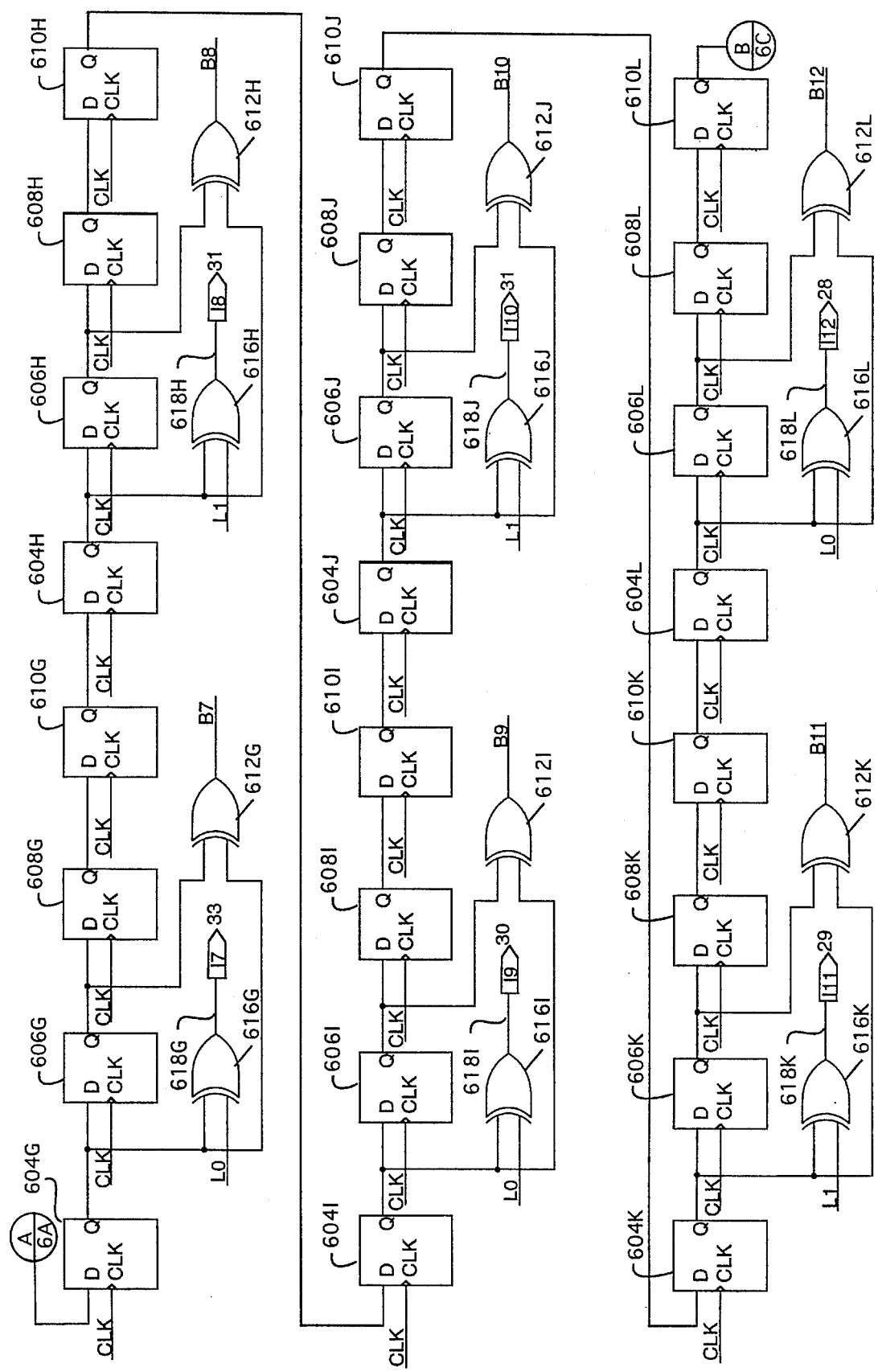
Figure 6C:
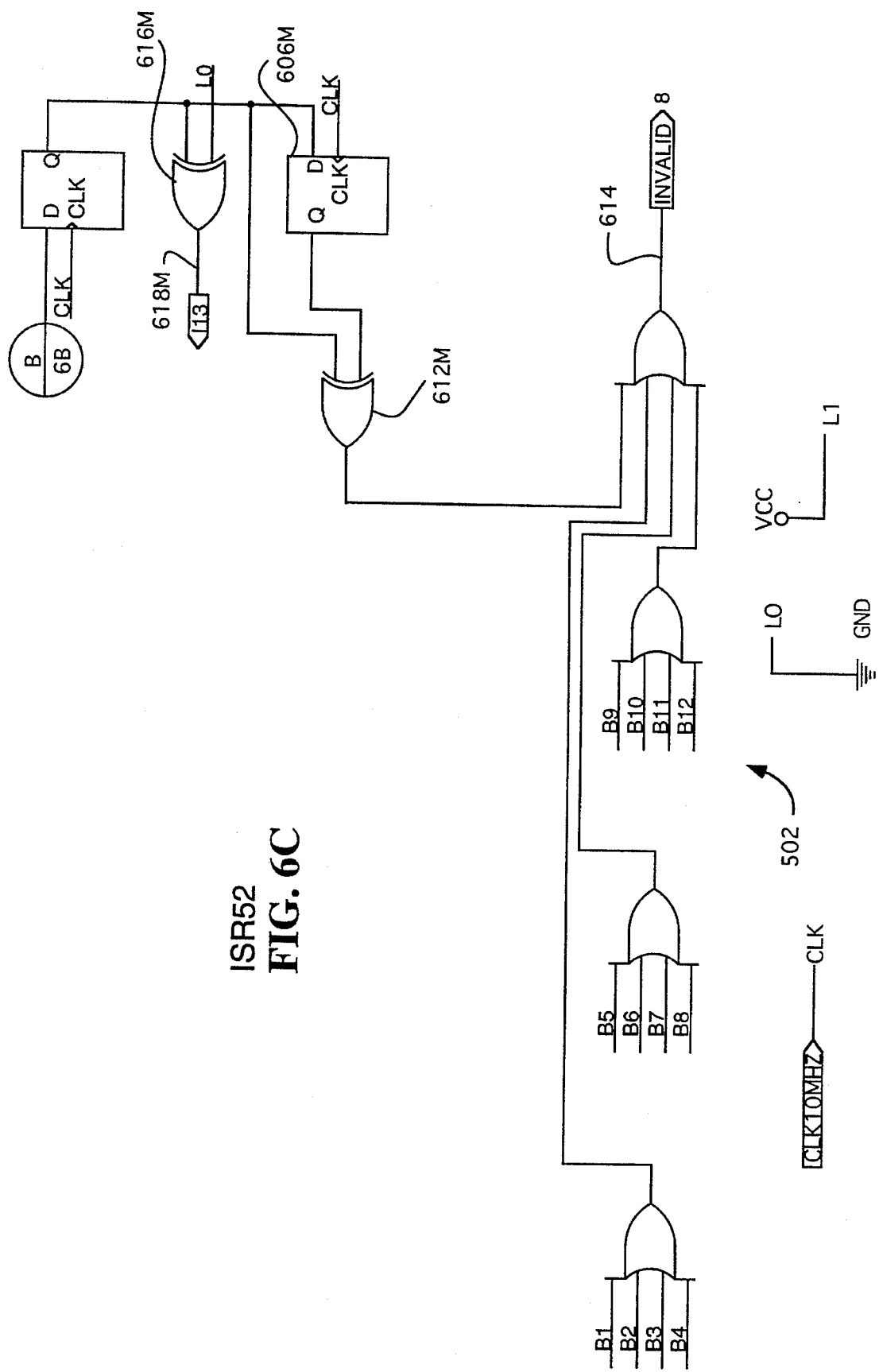

The shift register 502 is shown schematically in FIGS. 6A–6C. The digital 'I' signal 316 (PHASE0) is shifted into a shift register having 4 stages for each of the first 12 bits of the spreading code (chips) and 2 stages for the last chip, which in this case makes a total of (4×12+2=) 50 stages. The shift register 502 is clocked at 4 times the chip rate by a clock signal 602, so that each chip is sampled 4 times. Connected to the output of the first two flip flops 604 and 606 of every four shift register flip-flops 604–610, is a comparator 612 whose output is false when two adjacent chip samples have the same value. When all 13 such comparators indicate simultaneously that their respective adjacent chip samples are identical, an INVALID signal 614 is set false. An additional set of comparators 616 compare the 13-bit pN code present on the lower input of each XOR gate 616 as a false level L0 or a true level L1, with one sample from the 604 flip-flop in each of the 13 groups A–M of the 4 shift register flip-flops 604–610.

Figure 5A:
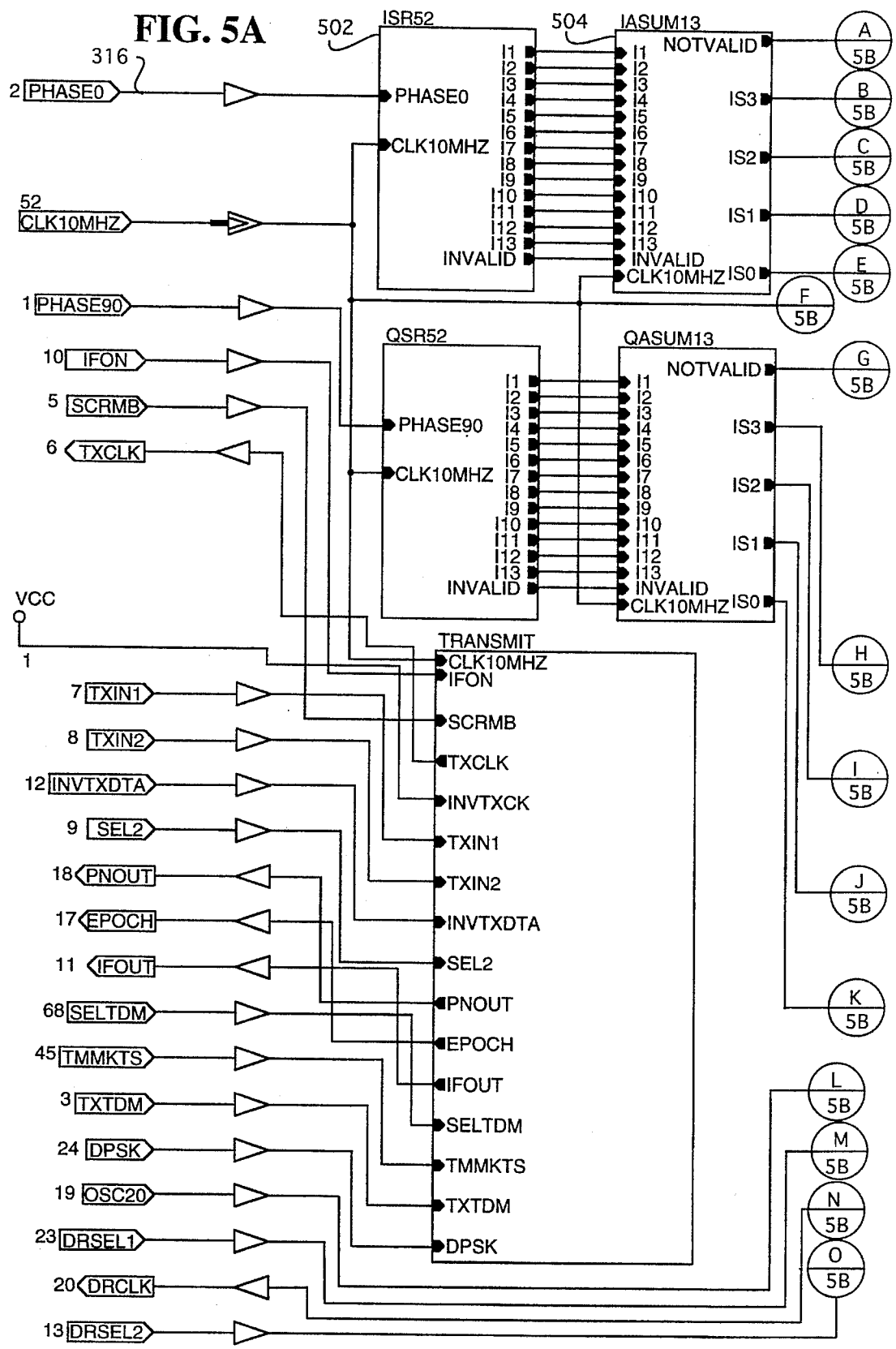
FIGS. 5A–5C are a block diagram of the DIGCOR block of FIG. 4A.
Figure 7A:
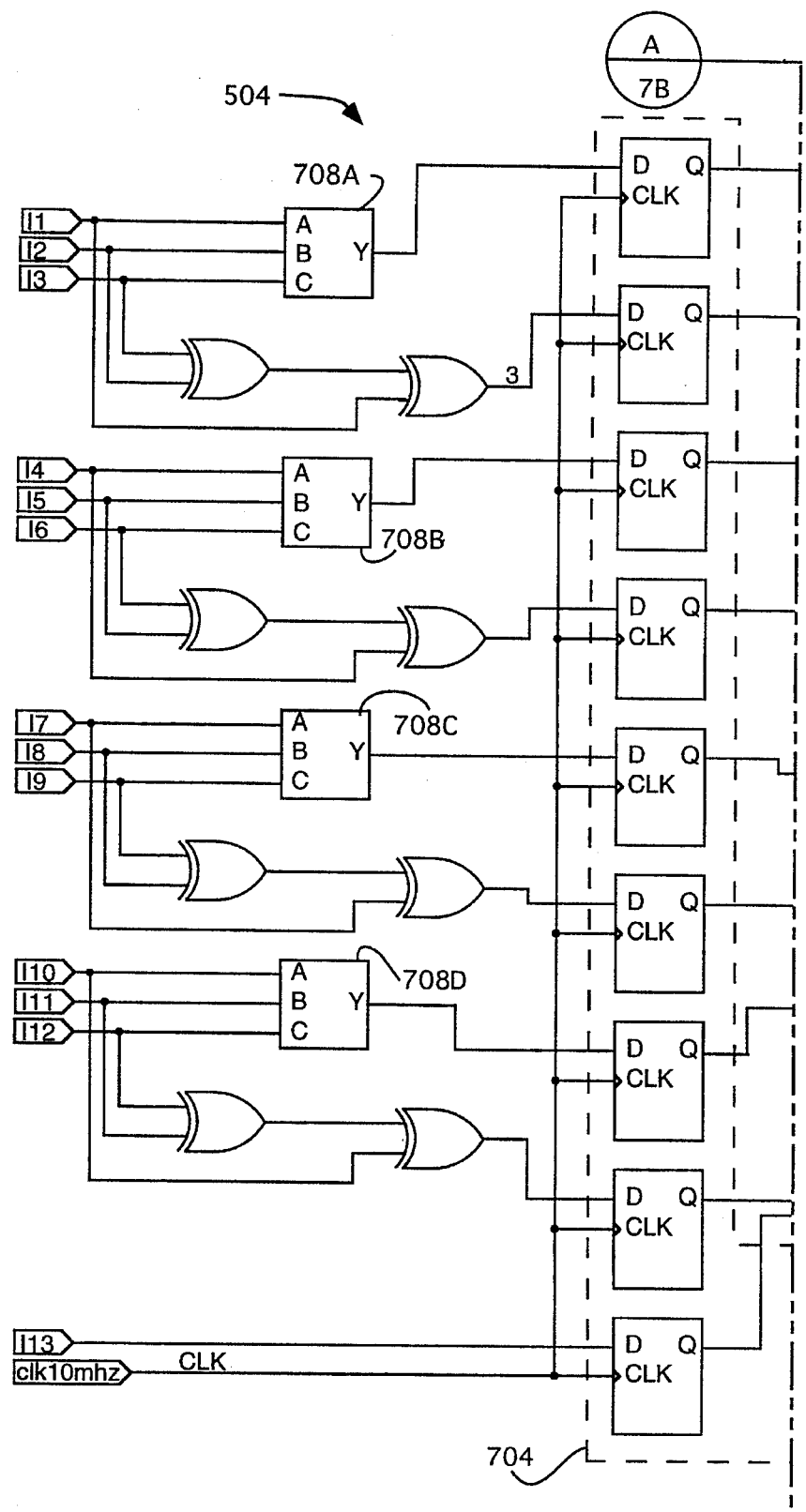
Figure 7B:
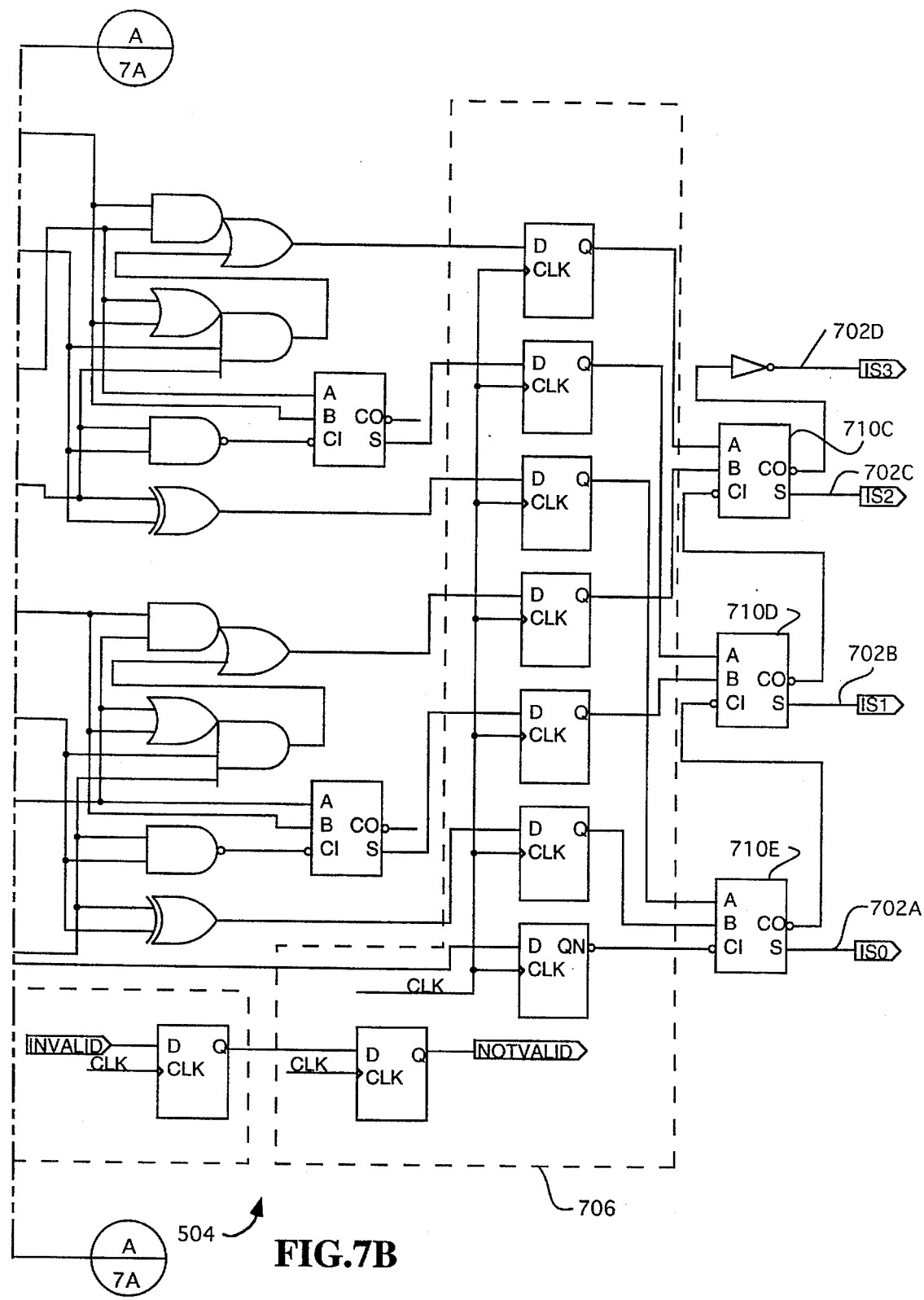
Figure 8A:
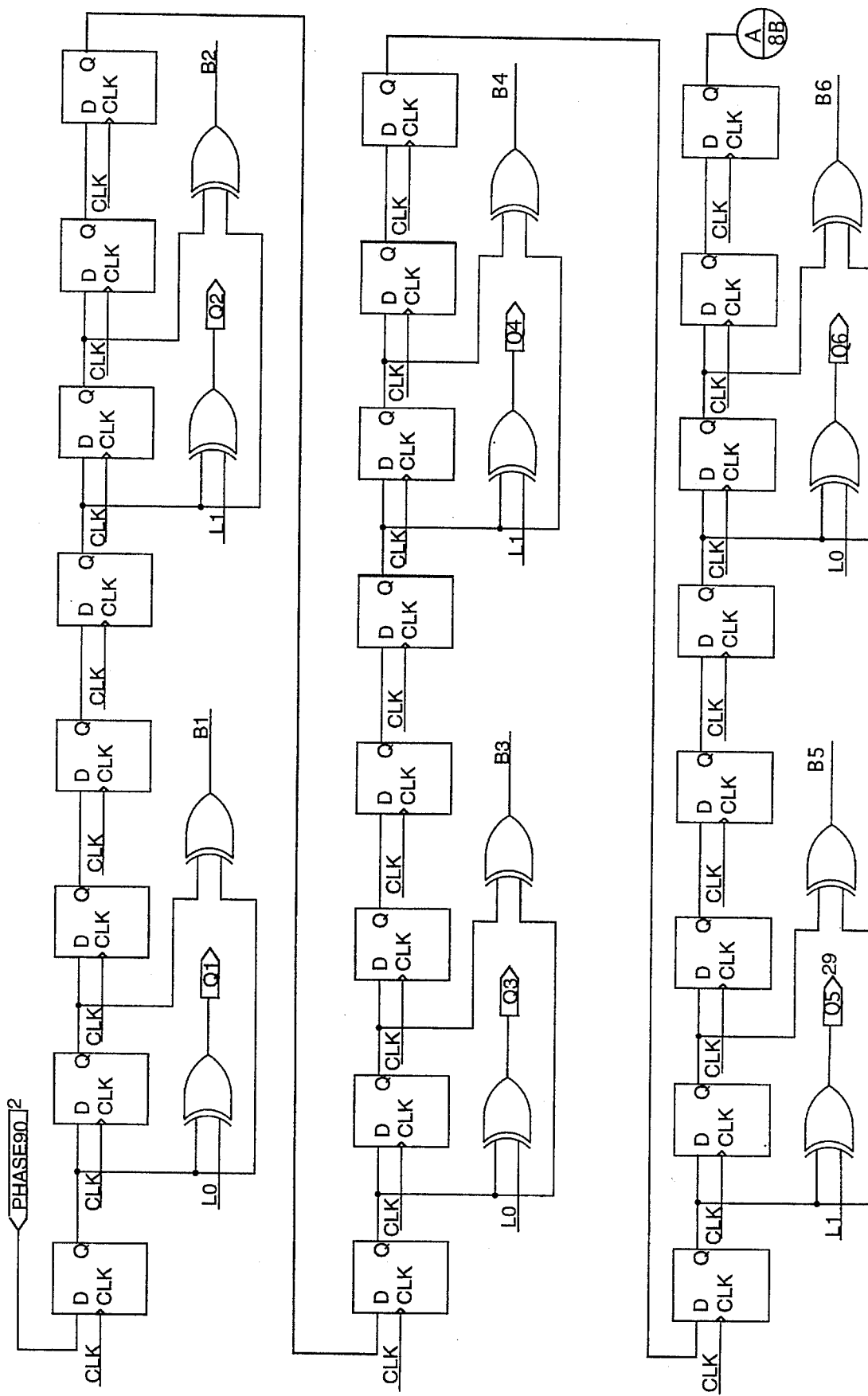
Figure 8B:
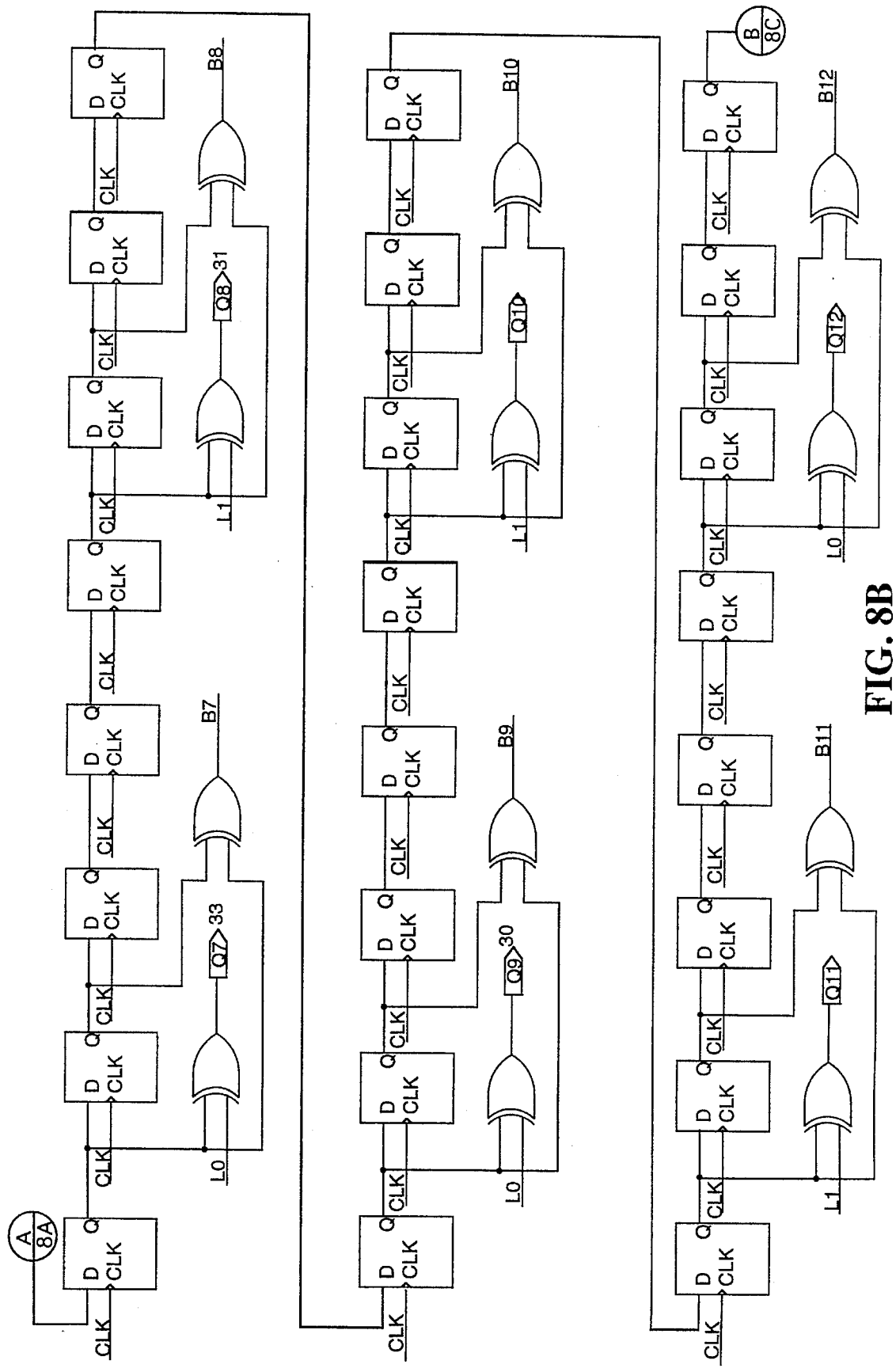
Figure 8C:
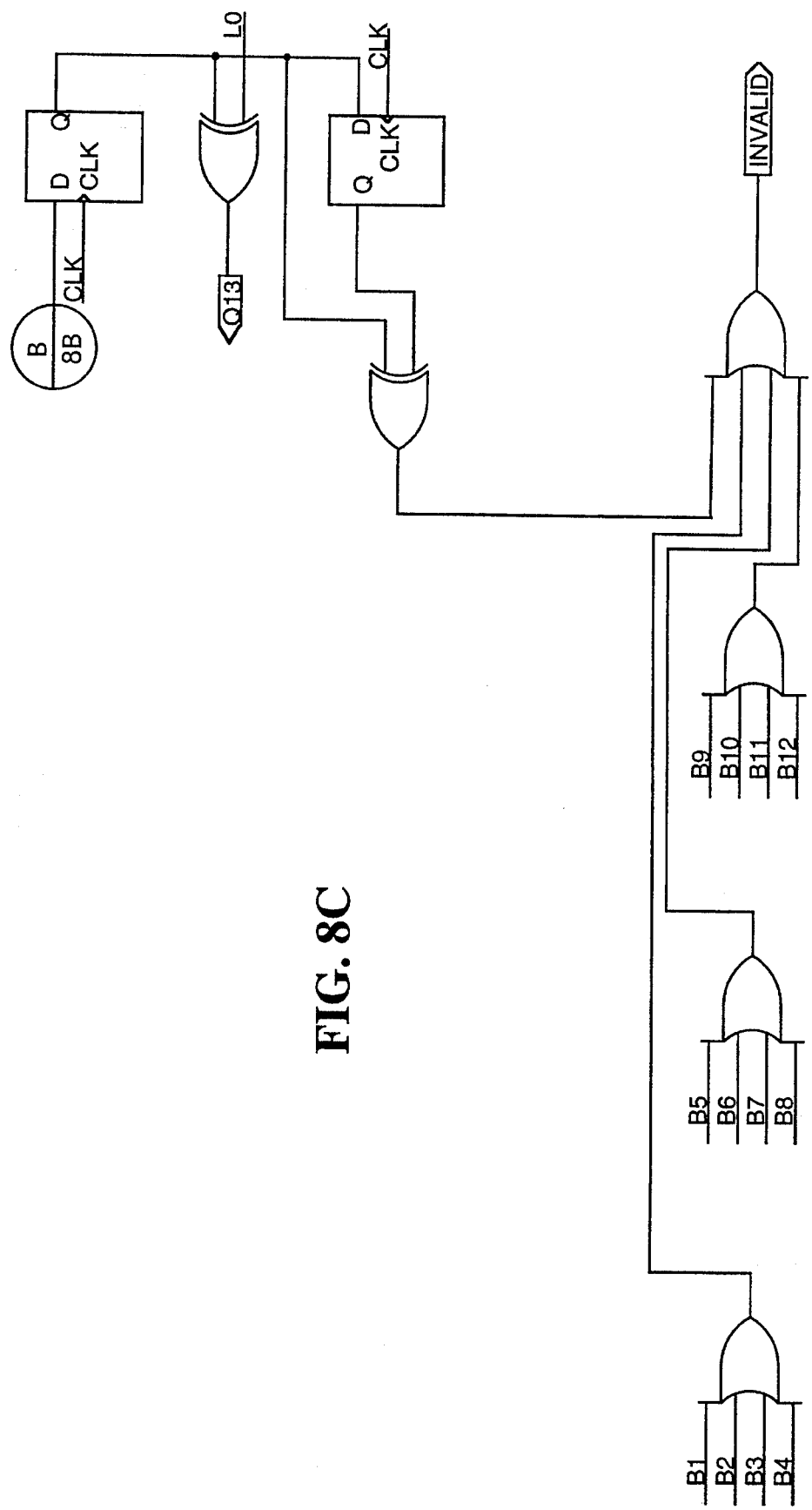
Figure 9A:
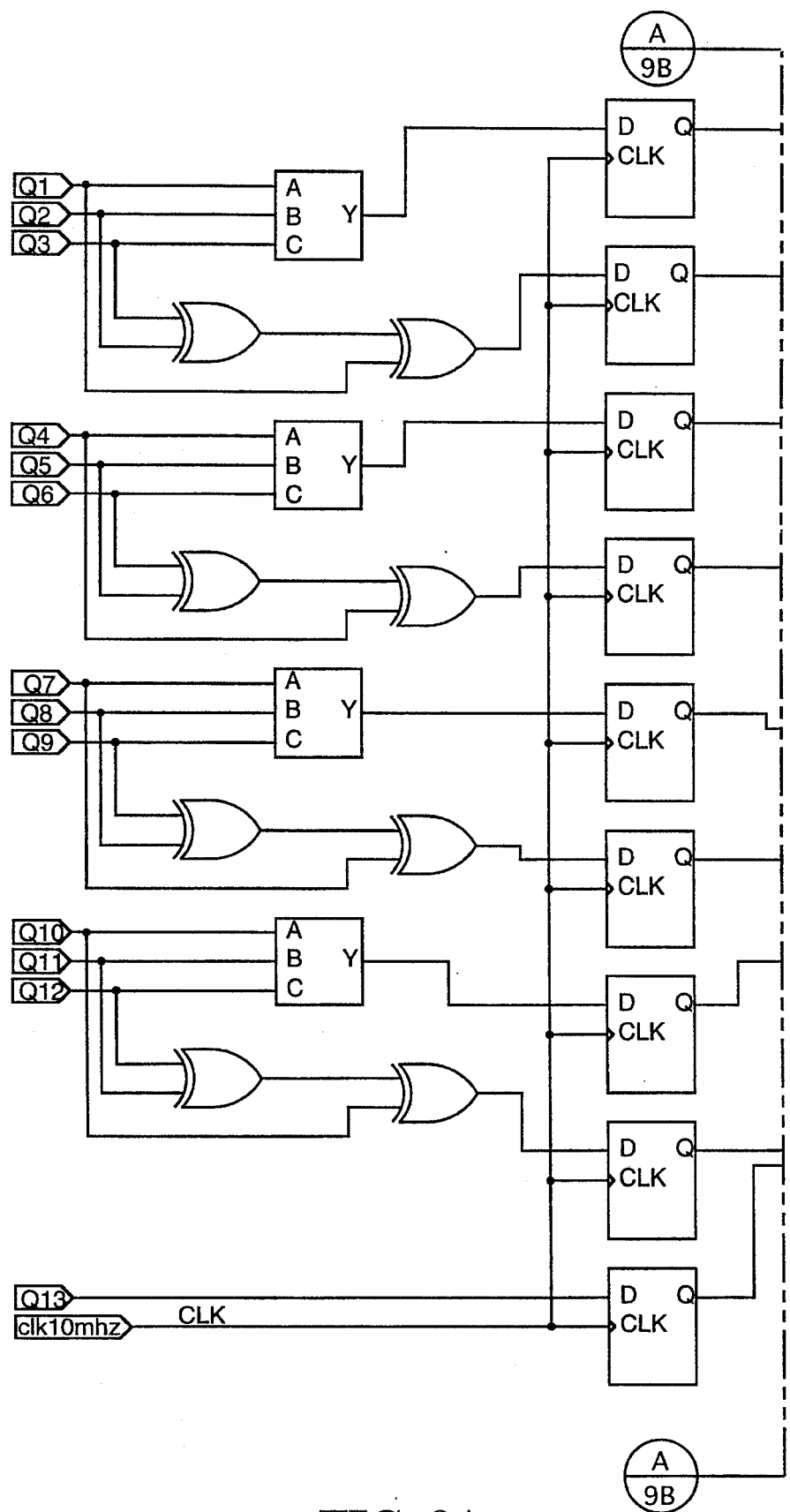
Figure 9B:
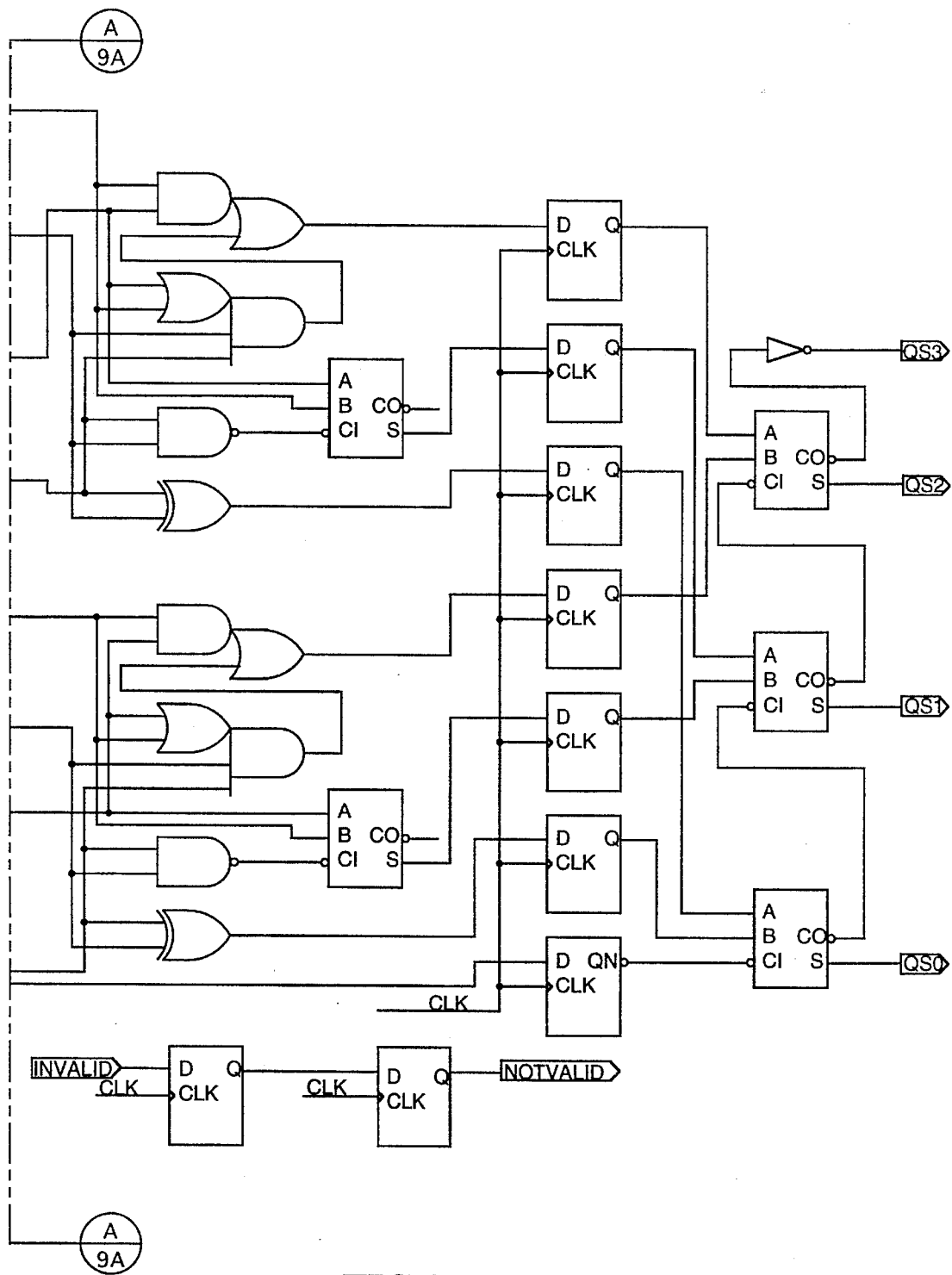
Figure 10A:
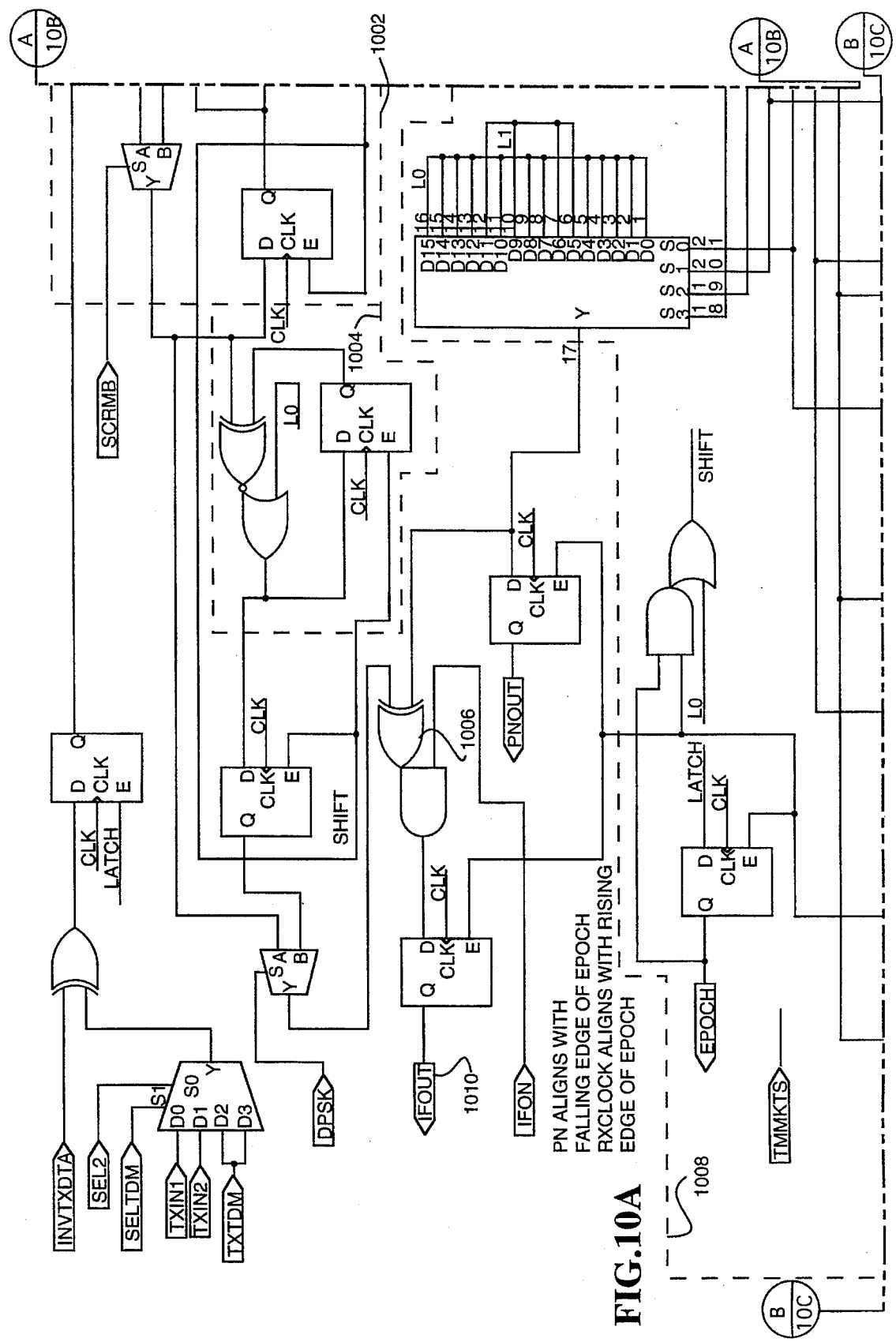
Figure 10B:
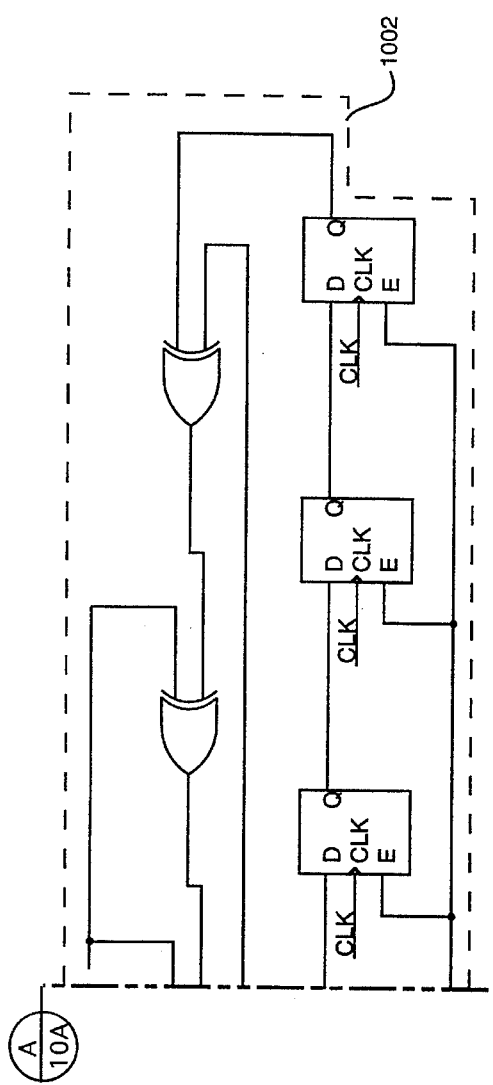
Figure 10B:
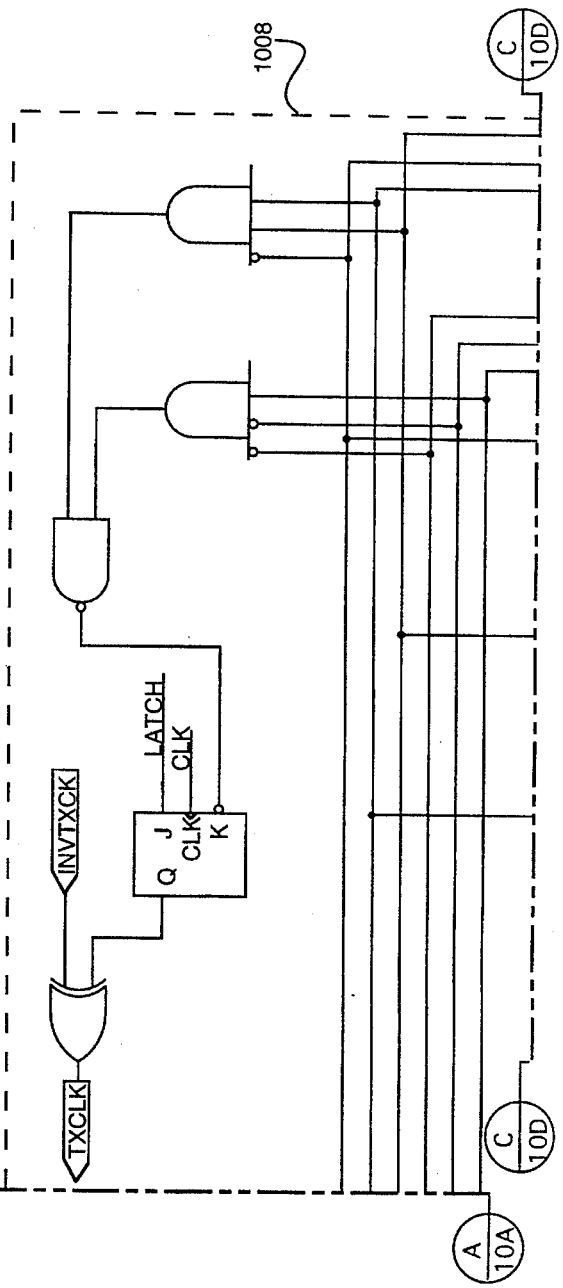
Figure 10C:
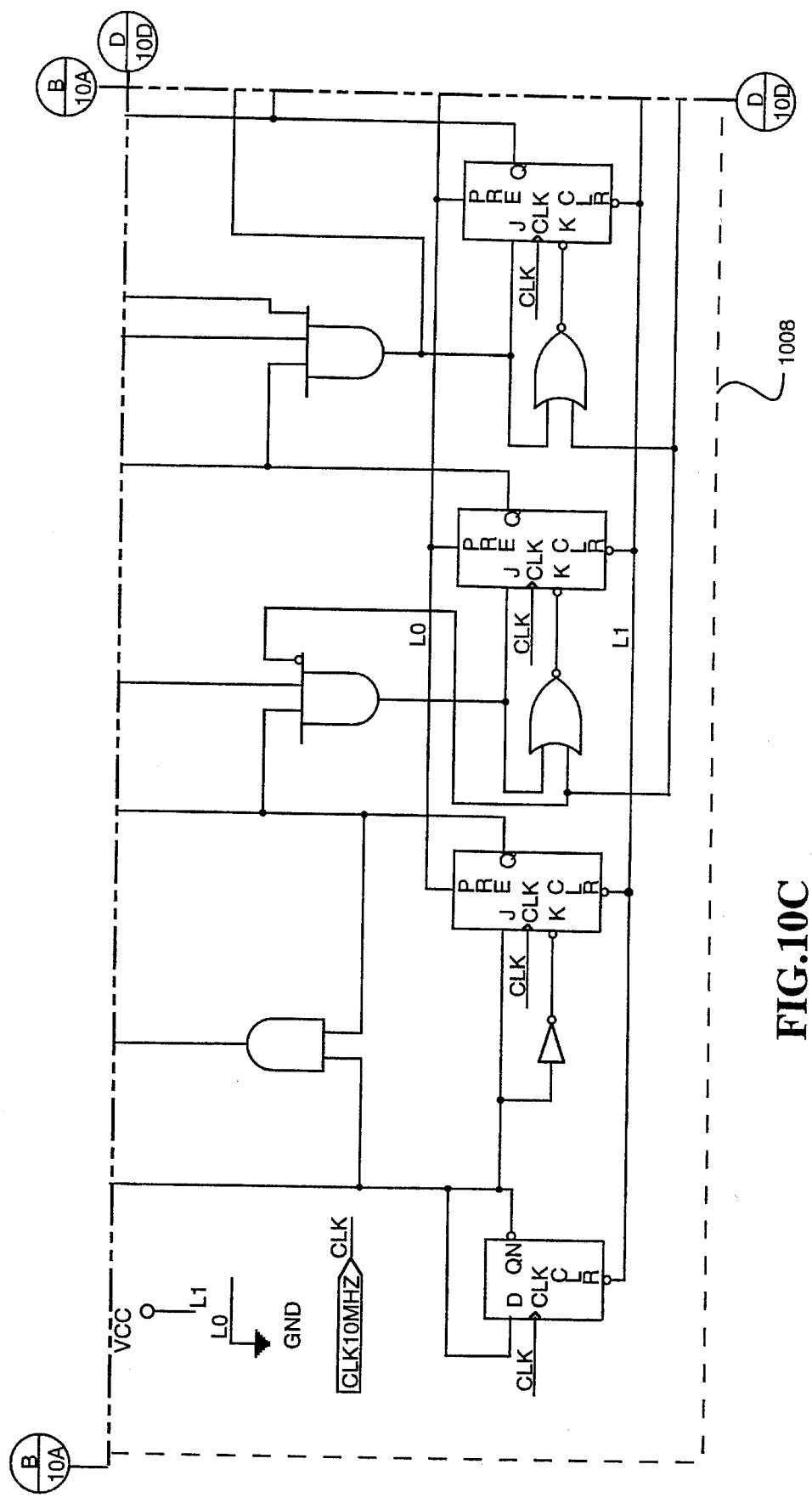
Figure 10D:
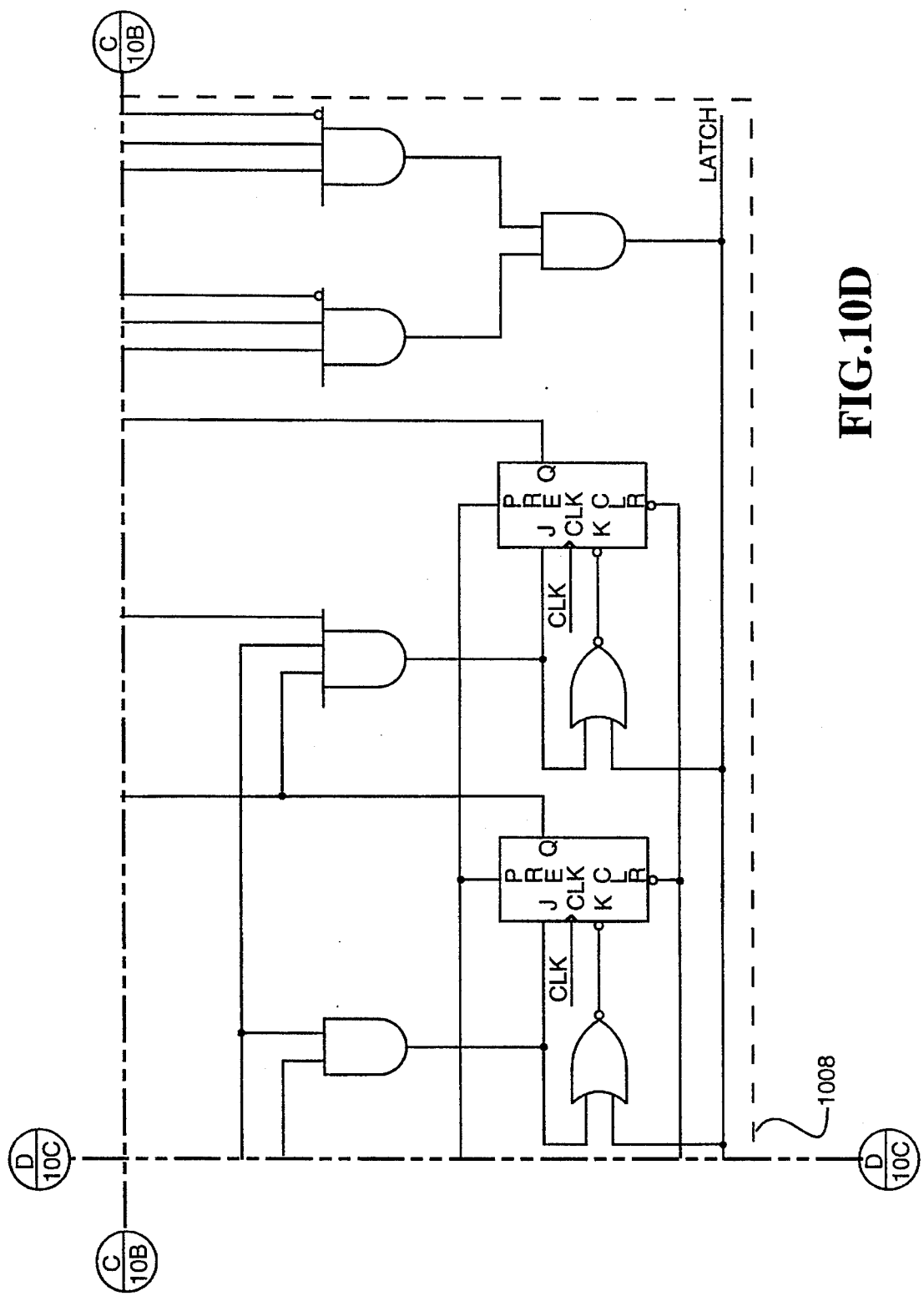

The outputs 618 of the code comparators 616 are summed with equal weight in a 13-input unary adder IASUM 504 shown in FIG. 5A. The schematic of the adder 504 is illustrated in FIGS. 7A, 7B, showing circuitry including majority circuits 708 and full adders 710 whereby outputs 702A–D are produced as a 4-bit binary number representing the number of samples of the input signal (PHASE0) 316 which match the PN code pattern. The adder 504 also contains banks of registers composed of D flip-flop sets 704 and 706 to perform the function well-known in the digital circuit design art as pipelining, to permit the digital circuit to process samples at a rate limited by the speed of propagation of a smaller number of levels of combinatorial logic than if such pipeline registers were not used. Because of the use of pipeline registers, the INVALID signal 614 is delayed through the same number of registers as the pN code comparison signals, even though it is not otherwise processed in the adder 504.

Figure 5B:
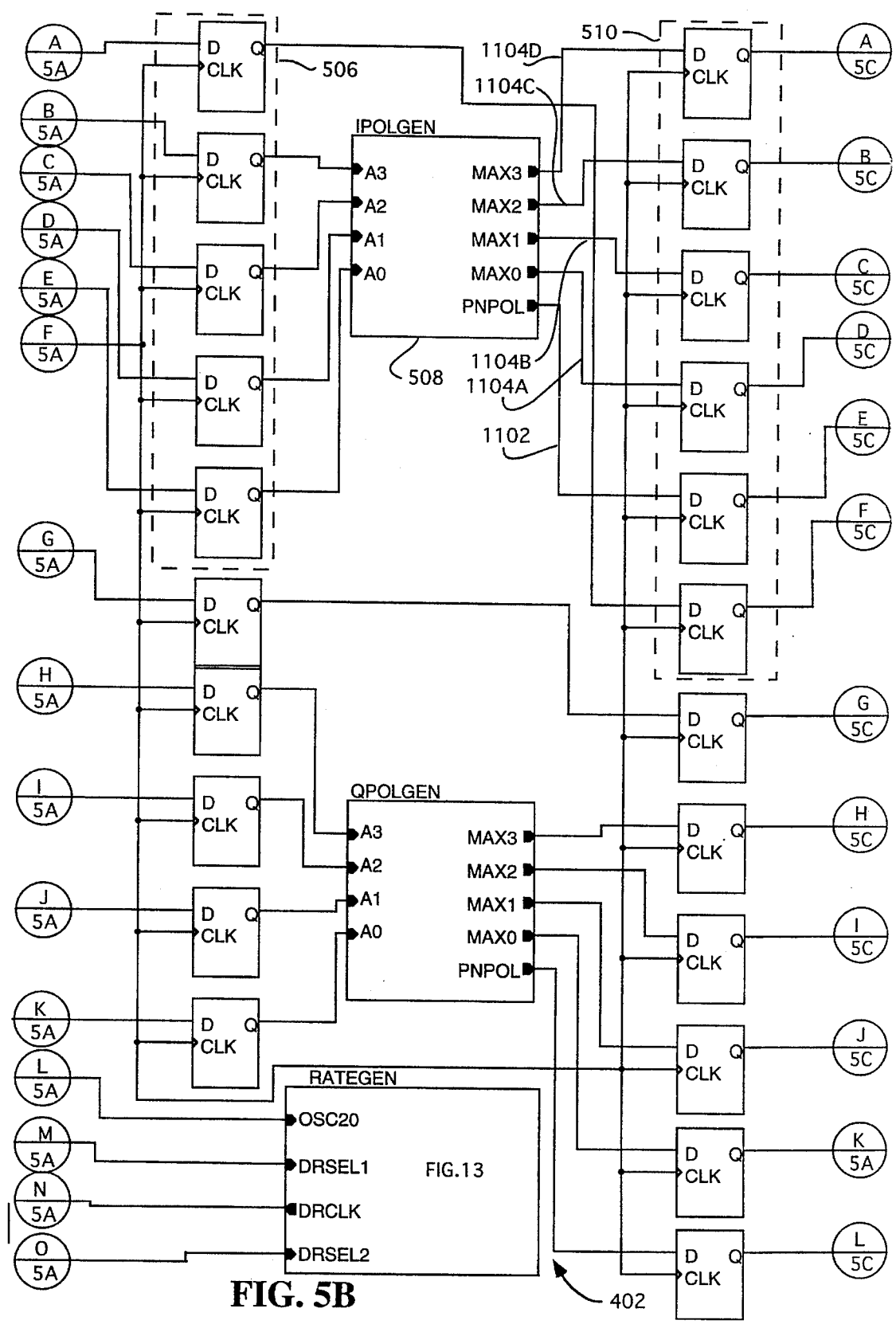
Figure 5C:
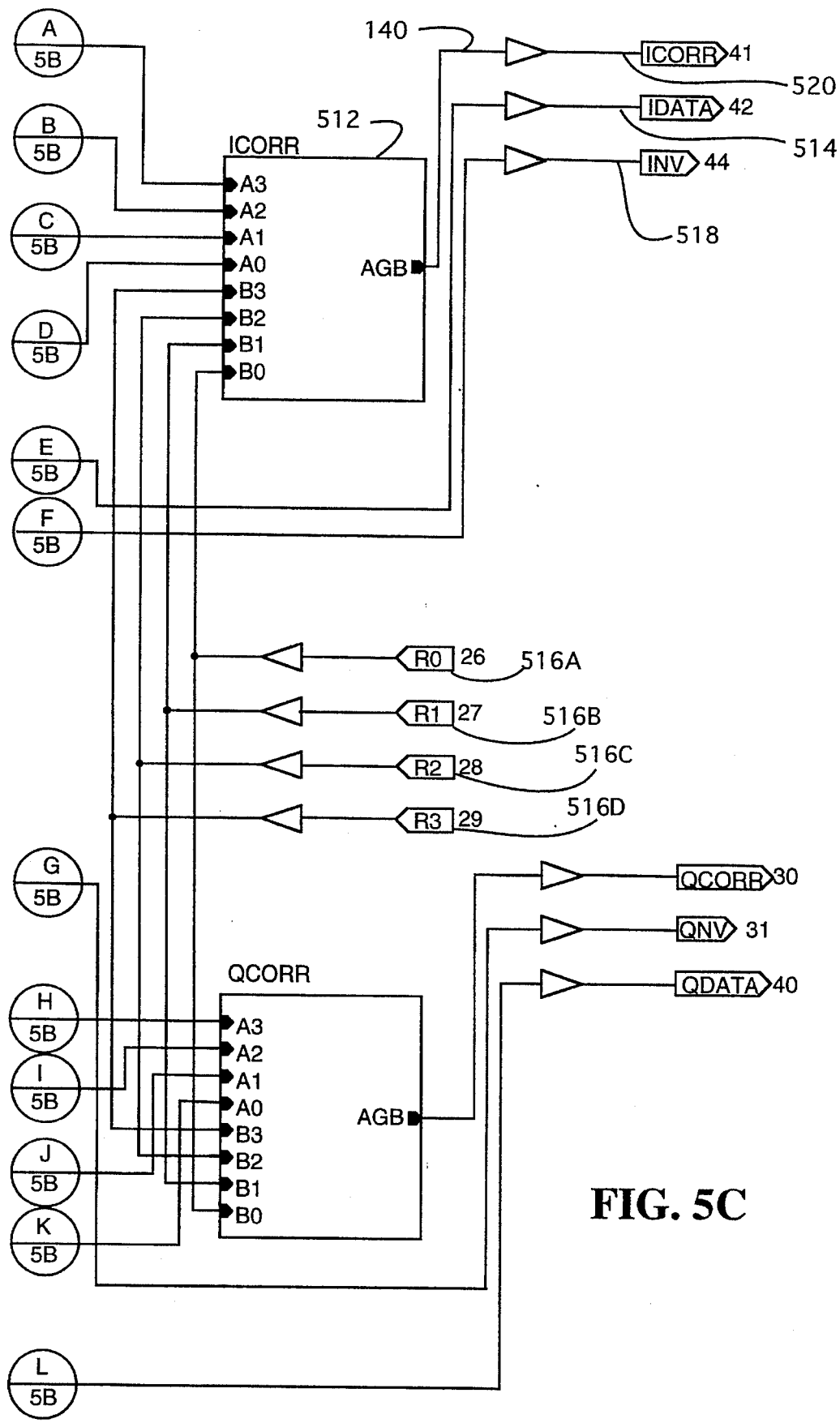
Figure 11:
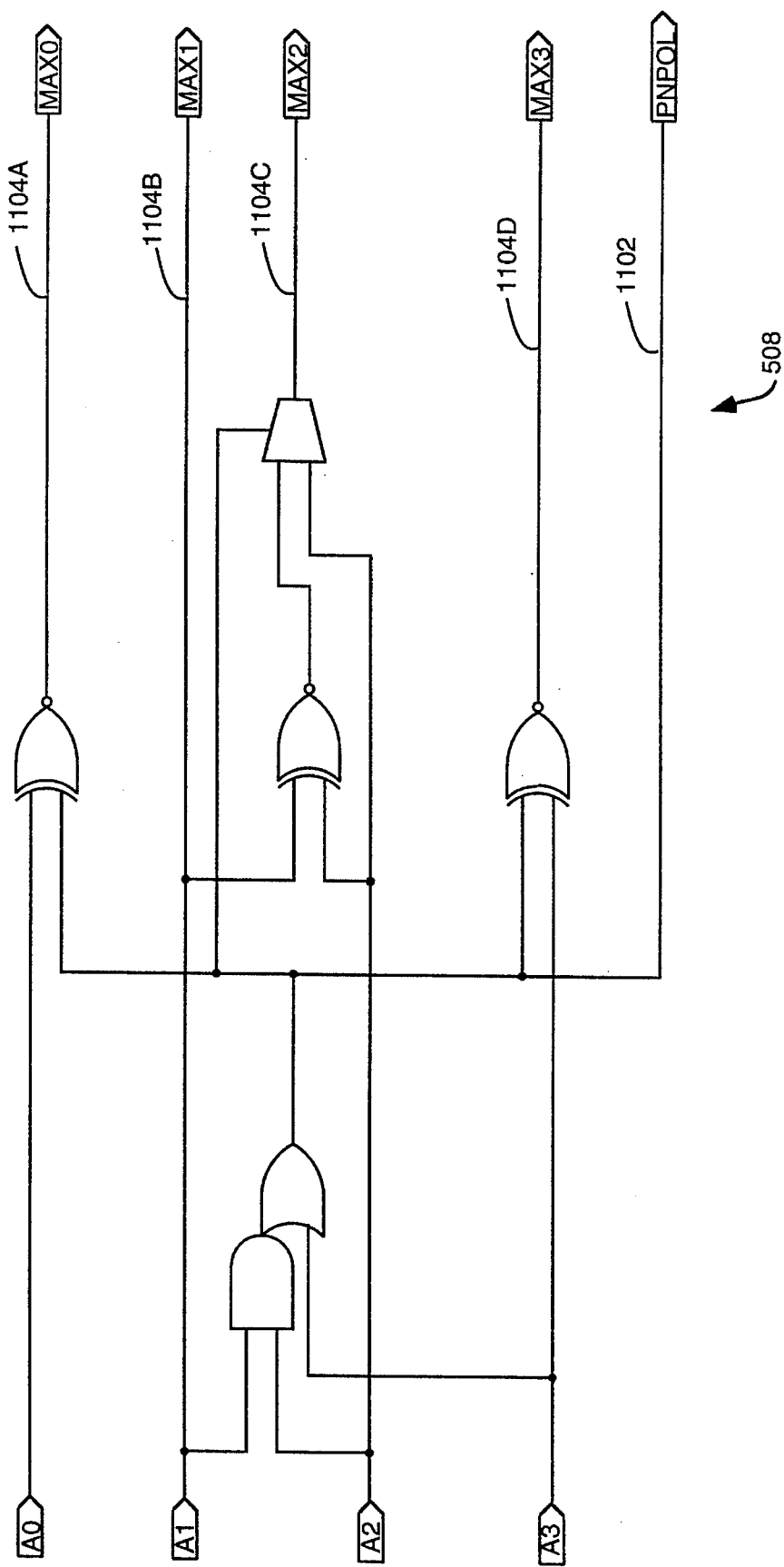
Figure 12:
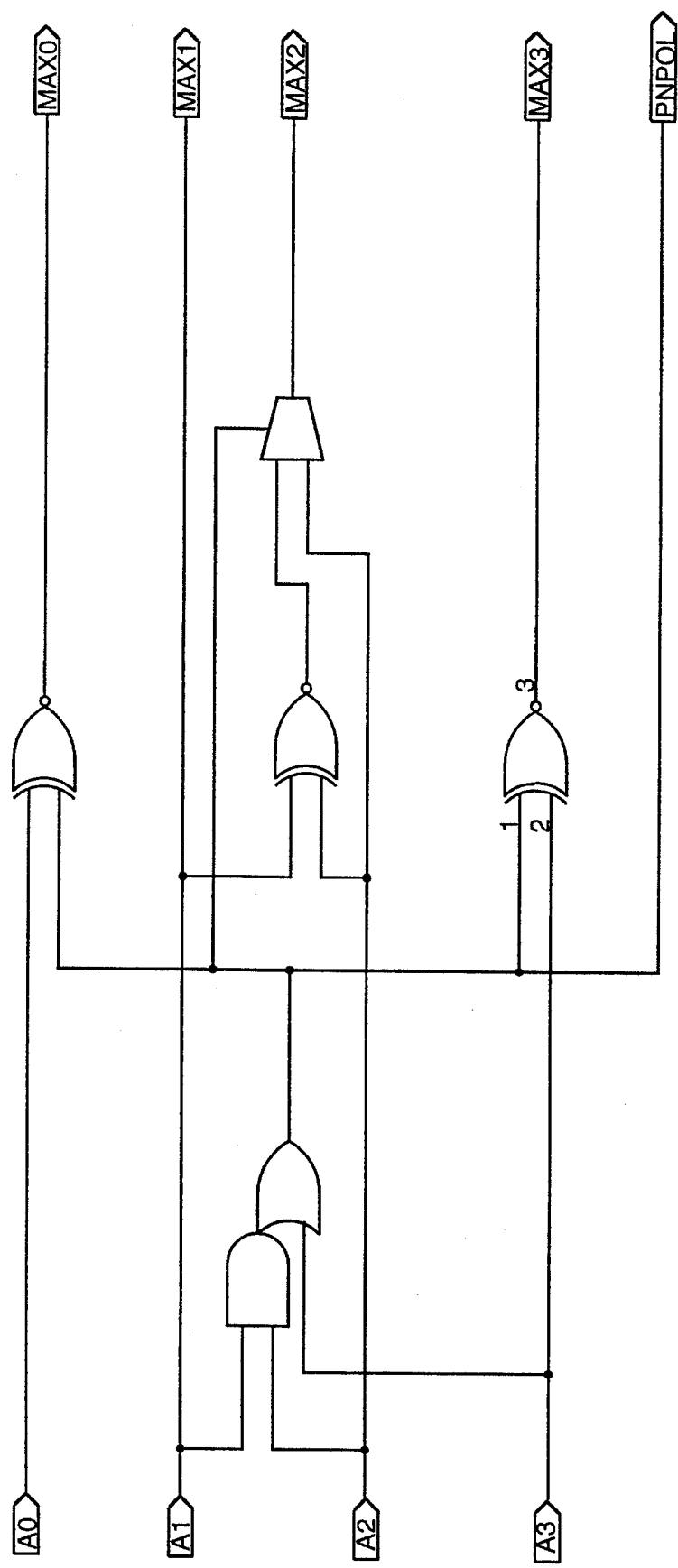
Figure 13:
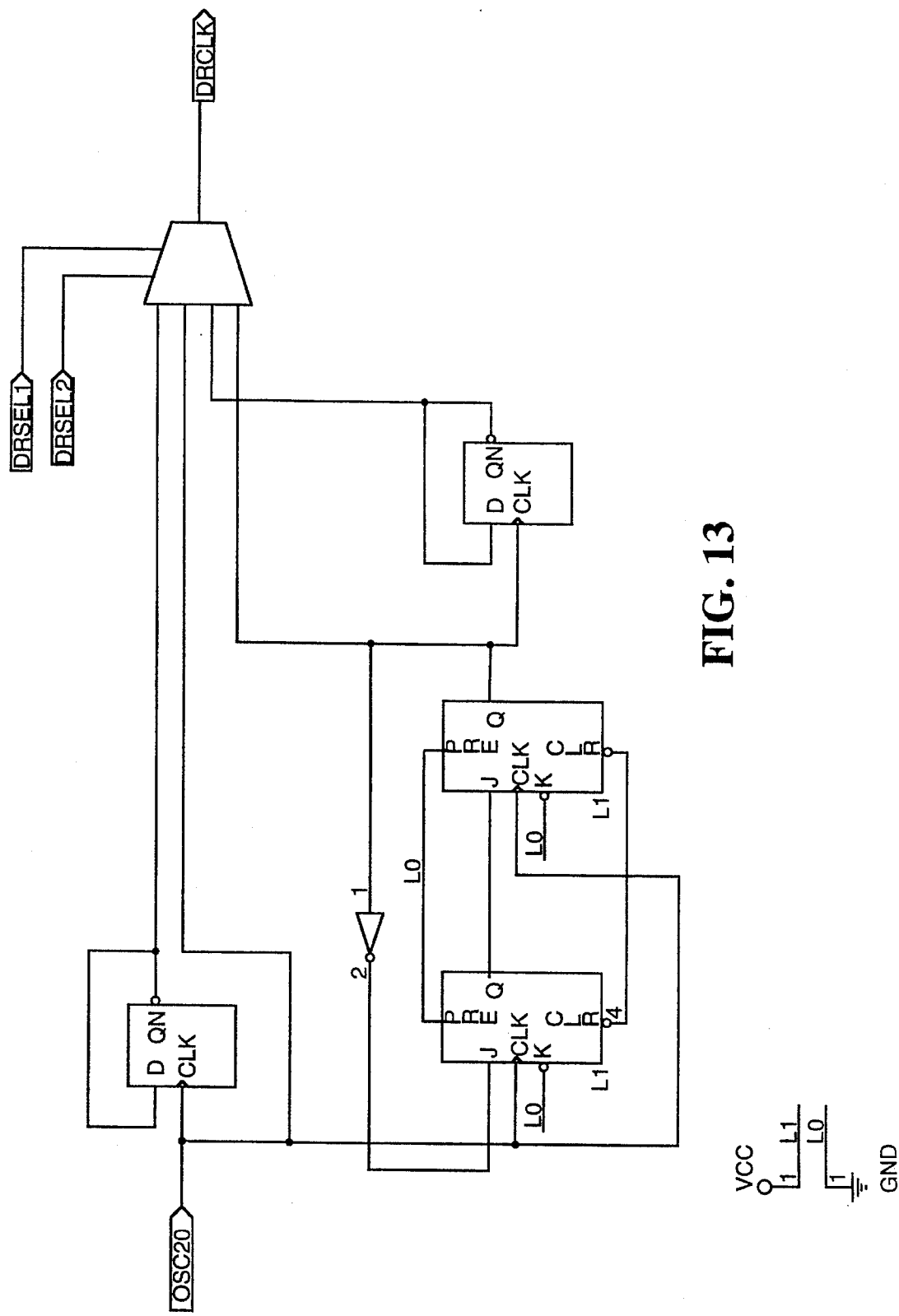
Figure 14:
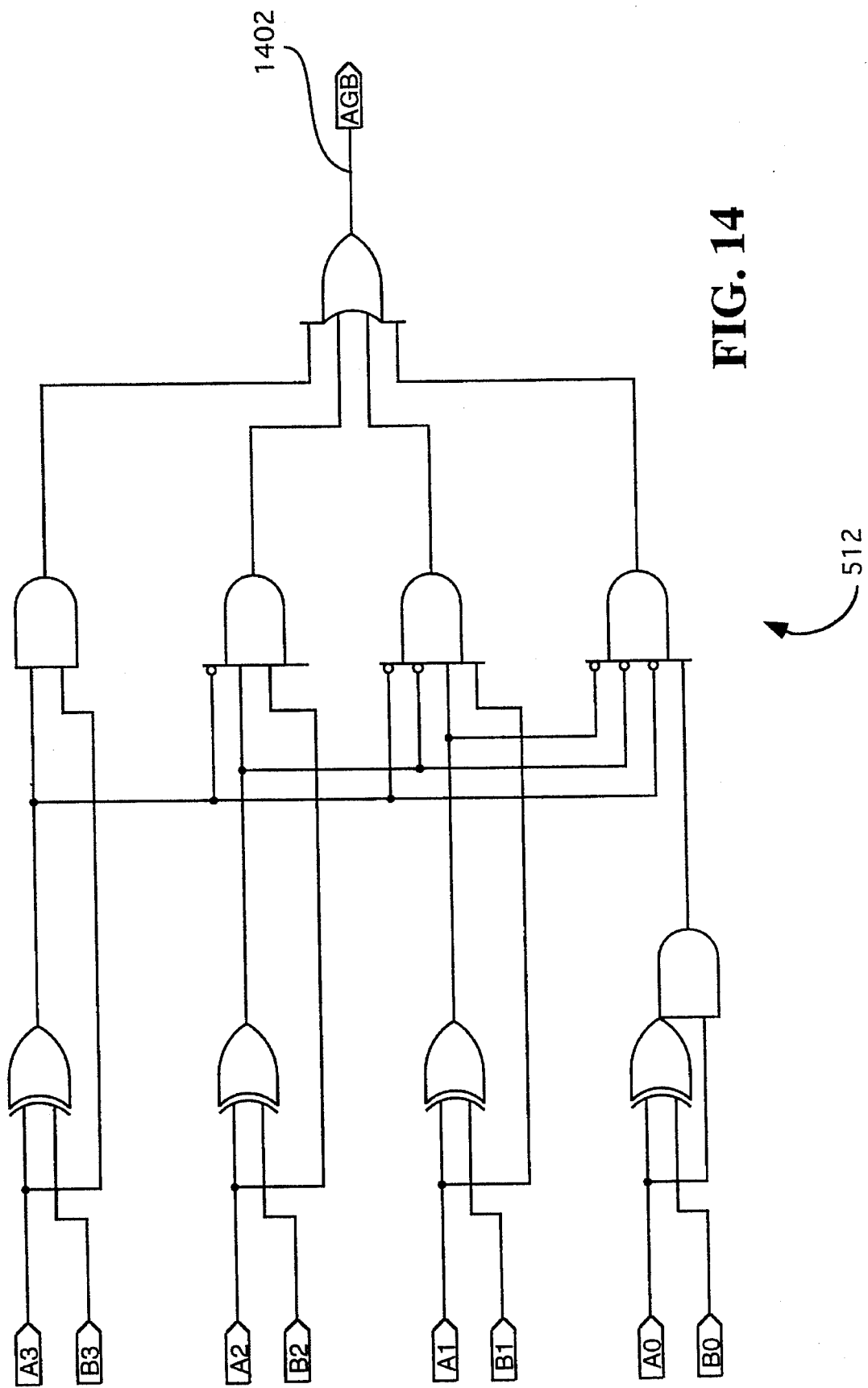
Figure 15:
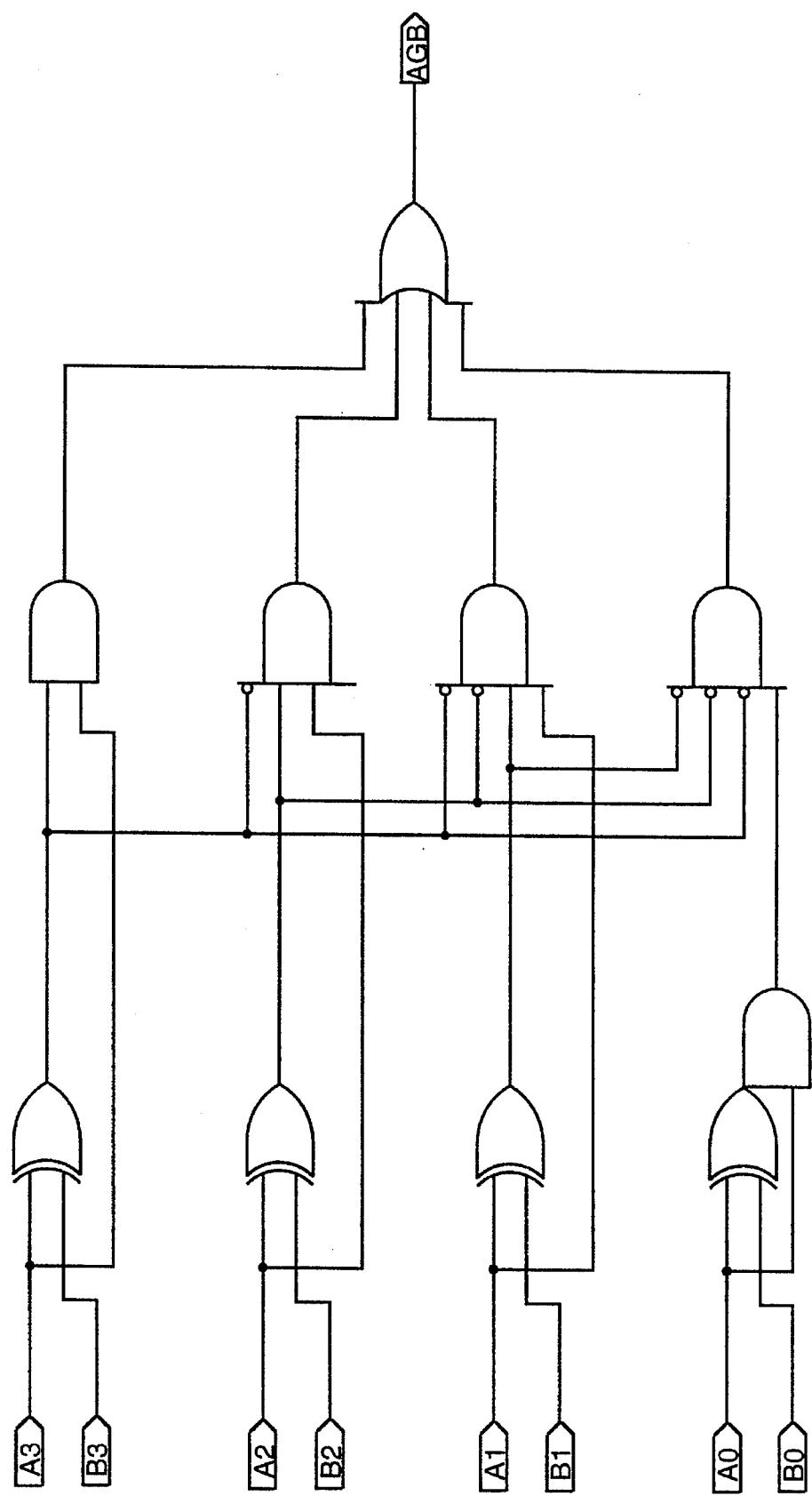

As shown in FIGS. 5A–5C, the adder outputs 702A–D, representing a 4 bit number ranging from 0 to 13 is passed through the pipeline register 506 and then processed by the polarity generator and absolute value circuit IPOLGEN 508, whose schematic is FIG. 11. IPOLGEN 508 produces a polarity signal 1102 and a magnitude signal 1104. The polarity signal 1102 is true if the adder outputs 702A–D have a value greater than or equal to 6, and false if the adder outputs are less than 6. The magnitude signal 1104 has the value 13 if the adder outputs are 0, diminishing linearly to 8 if the adder outputs are 5, and has the value 6 if the adder outputs are 6, increasing linearly to 13 if the adder outputs are 13.

As shown in FIG. 5B, the polarity signal 1102 becomes an in-phase data signal IDATA 514 after delay through a pipeline stage 510, and the magnitude signals 1104A–D are delayed by a stage 510 and then applied to the comparator 512 which compares it with, in the preferred embodiment, the value 11 as established by connections between the inputs R0–R3, 516A–D, and +5 V or ground as shown in FIG. 4A. The comparator 512, as detailed in FIG. 14, produces a correlation signal AGB 1402 which is true if the delayed magnitude signals 1104A–D are greater than 11, and false if the magnitude signals are less than 11. In FIG. 5C, signal 1402 is buffered to produce ICORR signal 520. DIGCOR 402 (FIG. 4A) produces in-phase invalid signal INV 518 as a delayed version of invalid signal INVALID 614 (FIG. 6C) having no further processing after being generated by the shift register circuit 502.

Figure 16A:
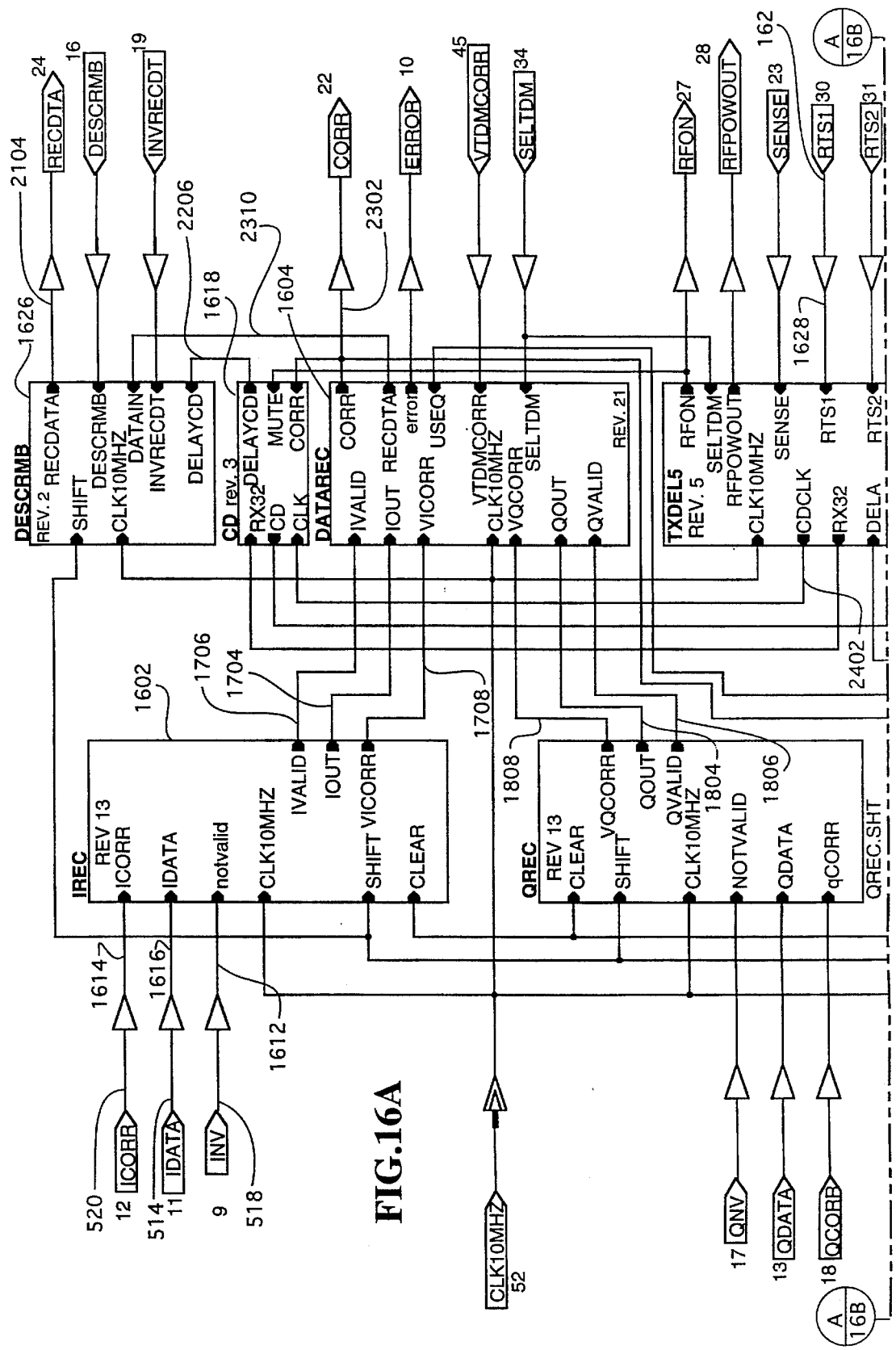
FIGS. 16A and 16B are a block diagram of the CORLOG block of FIG. 4B.
Figure 16B:
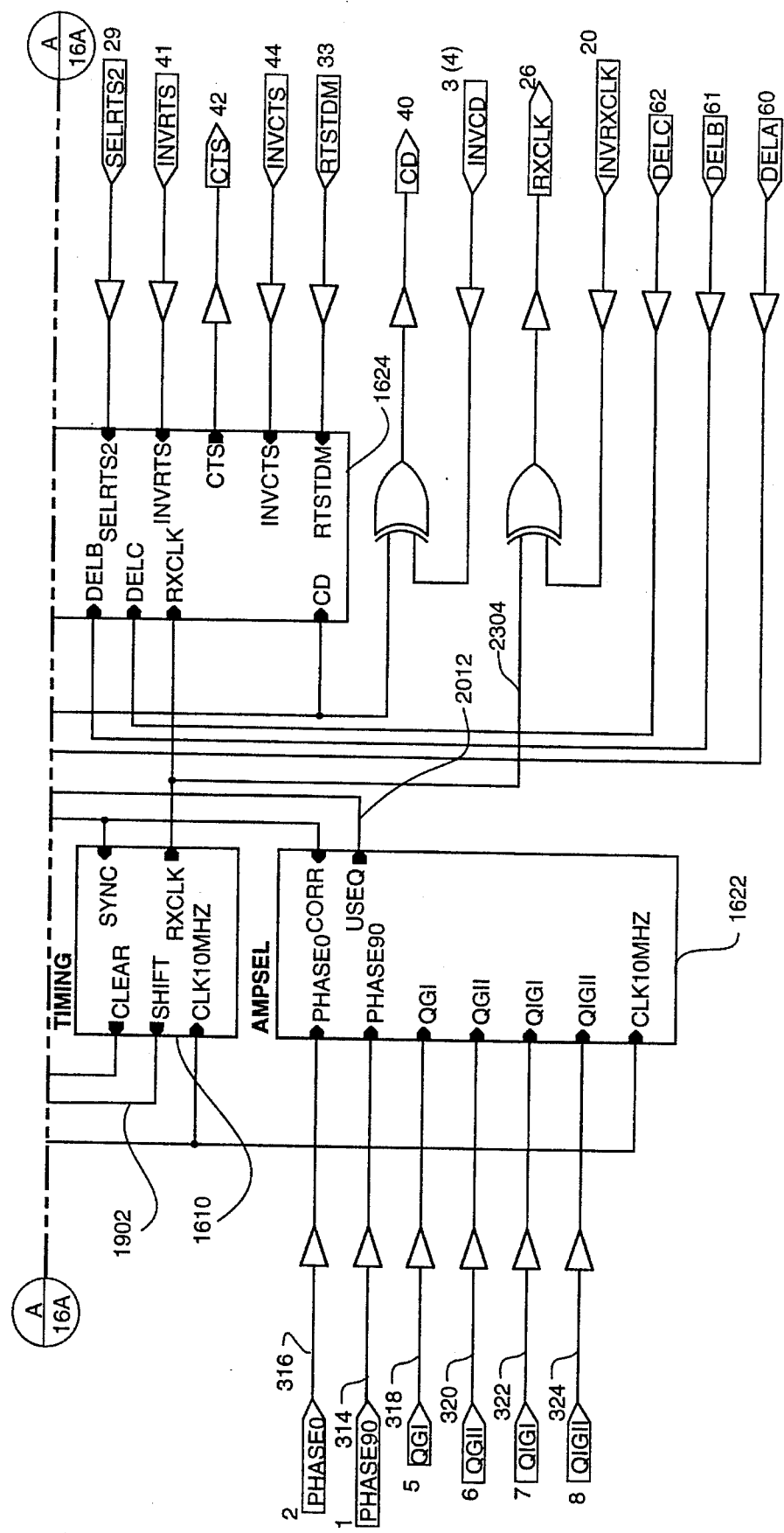
Figure 17B:
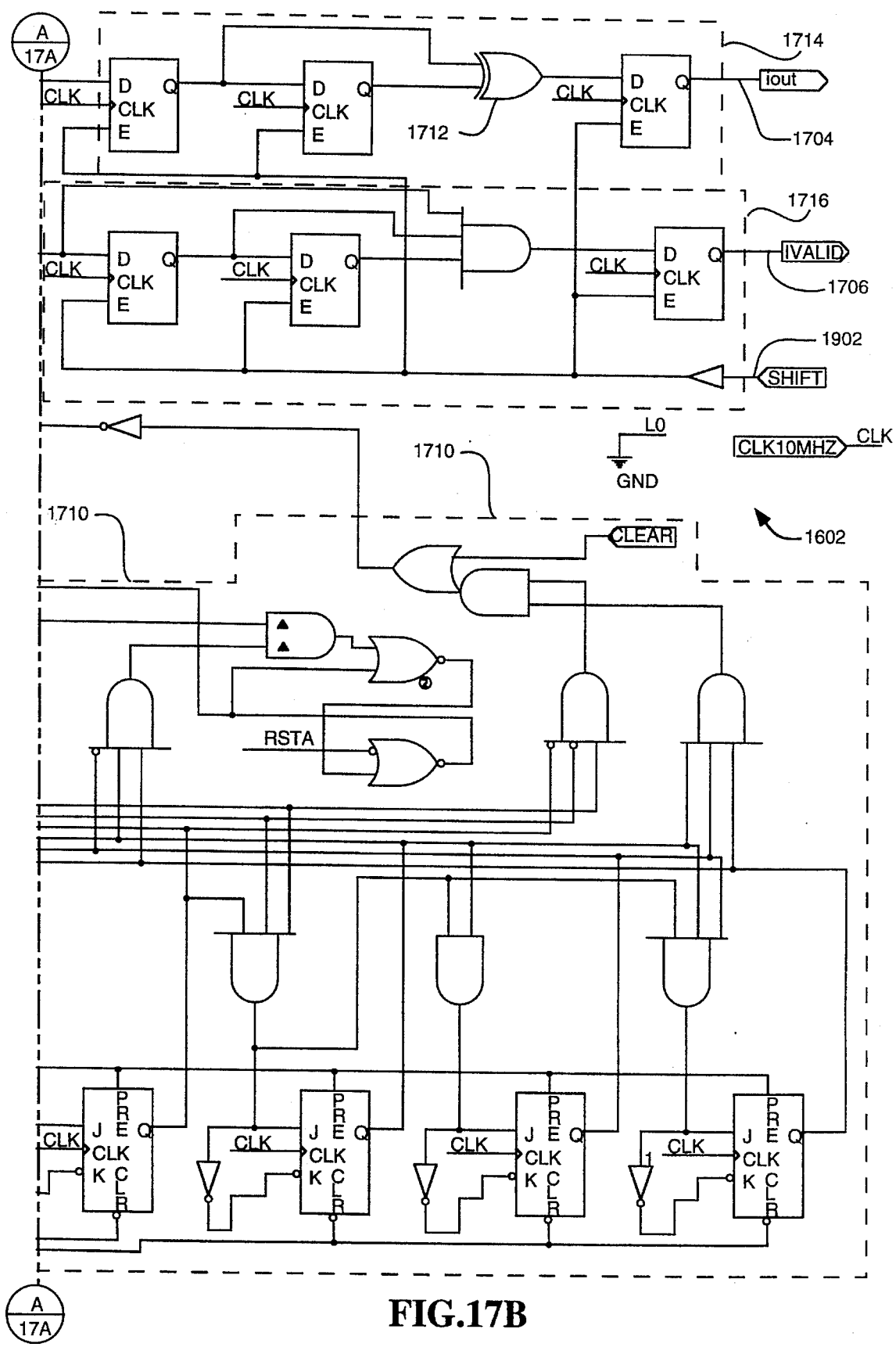
FIGS. 17A, B; 18A, B; 19; 20A–D; 21; 22; 23A, B and 24A–D are schematic diagrams of each block illustrated in FIGS. 16A and 16B.
Figure 18A:
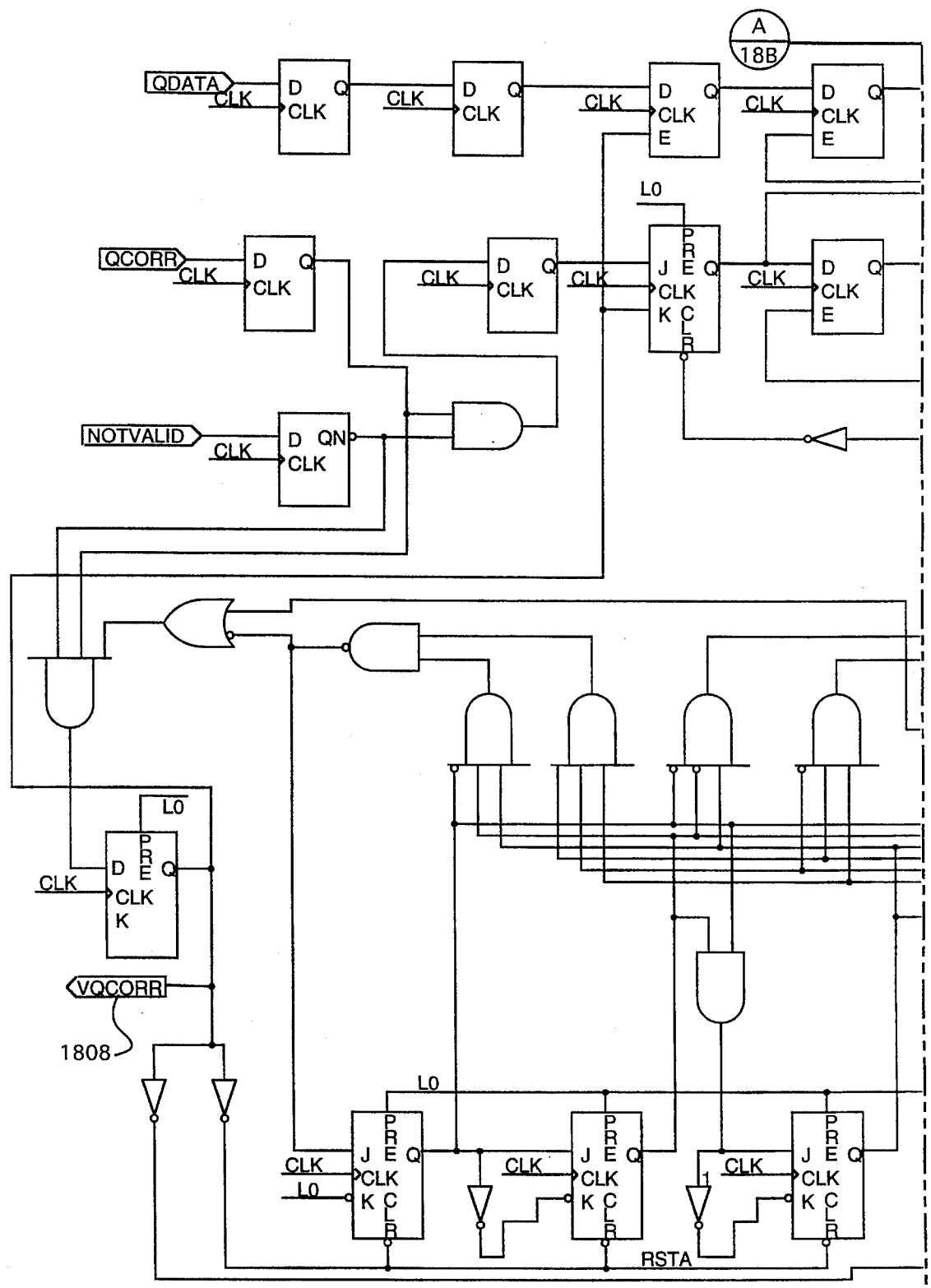
Figure 18B:
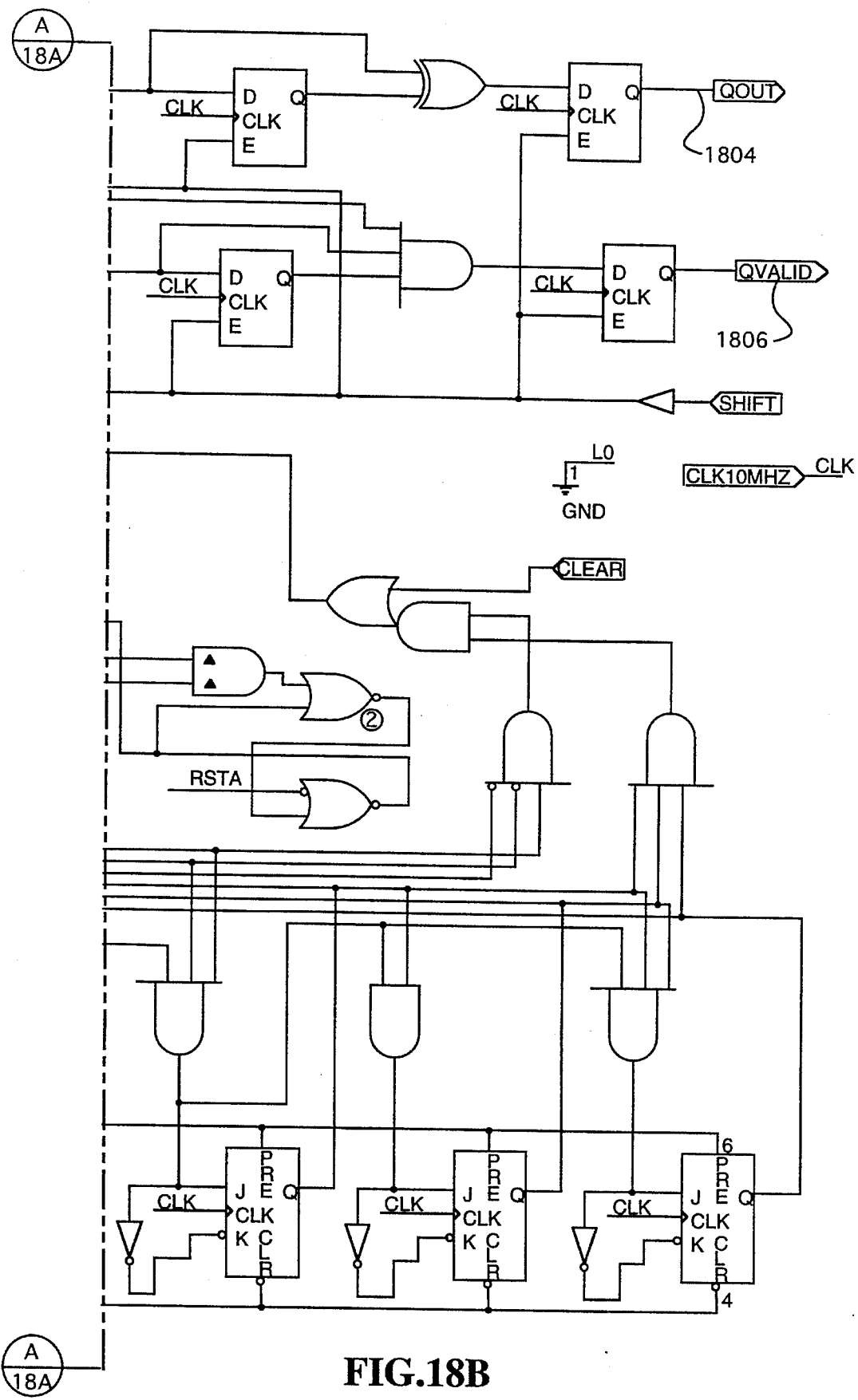

The DIGCOR output signals IDATA 514, INV 518, and ICORR 520 are passed to the CORLOG circuit 404 as shown in FIGS. 4A, B. In FIGS. 16A, B, a CORLOG internal block diagram shows that the signals 514, 518, and 520 are processed by an I-channel data recovery circuit IREC 1602, whose outputs are an I-channel data signal IOUT 1704, an I-channel data valid signal IVALID 1706, and an I-channel data valid and correlated signal VICORR 1708, which are all latched for the duration of one data bit. In FIGS. 17A, B, the schematic of the data recovery circuit IREC 1602 is seen to control the latching of its output signals with a window counting circuit 1710 which begins counting as soon as a NOT VALID input signal 1612 is false and a CORRELATED input signal 1614 is true. At the first sample clock in which these signals are respectively false and true, a flip-flop 1716 sets, enabling the data signal to be latched in a flip flop 1718 and enabling the window counter 1710 to begin counting for 4.4 microseconds (μsec.). Then, under control of a SHIFT signal 1902 produced by a receive data timing recovery circuit 1610 as seen in FIG. 16B, which is common to both the Q and the I channels and which is described below, the latched data in the flip-flop 1718 is shifted to the output of the data recovery circuit at 1704, and while it is shifted, the phase shift encoding introduced at the transmitter is decoded by an XOR gate 1712 to generate the output data signal IOUT 1704. While the window counter 1710 is counting, the input signals 1612–1616 to the recovery circuit are ignored. When the 4.4 μsec. period has expired, the recovery circuit once again awaits the combination of the NOT VALID signal 1612 becoming false and the CORRELATED signal 1614 becoming true, whereupon the recovery circuit 1602 will repeat the cycle described above and present new output values IOUT, IVALID and VICORR 1704–1708. The logic dedicated to the Q-channel operates identically to the I-channel dedicated logic described above.

The recovery circuit output signals IOUT, IVALID and VICORR 1704–1708 and QOUT, QVALID and VQCORR 1804–1808 representing valid and correlated status and data from the 'I' and 'Q' channels are provided to the DATAREC circuit 1604 as shown in FIGS. 16A, B. The DATAREC circuit 1604, as shown in schematic form in FIGS. 23A, B, generates a master correlation signal CORR 2302, using a timing window counter circuit identical to the window counter circuit 1710 in the individual channels as described above. The first channel to provide a true value on its VxCORR line 1708 or 1808 causes the DATAREC circuit to produce a true CORR signal as an output, and also starts a window counter 2312 which will then inhibit recognition of any further VxCORR signals until 4.4 μSecs have expired. The CORR signal 2302 is one clock interval in duration, so with a system clock of 10 MHz, the CORR signal 2302 is a pulse of 100 nsec duration. As shown in FIG. 16A, the CORR pulse 2302 is provided to three other circuits, the timing recovery circuit TIMING 1610, the carrier detect circuit CD 1618, and the signal amplitude processing circuit AMPSEL 1622. A data selector circuit 2306 generates a received data signal RECDTA 2310 from the inputs IOUT 1704 and QOUT 1804, under the control of the IVALID 1706, the QVALID 1806, and the USEQ 2012 signals. The data selector 2306 also generates an error signal ERROR 2308 when neither channel has valid data.

Figure 19:
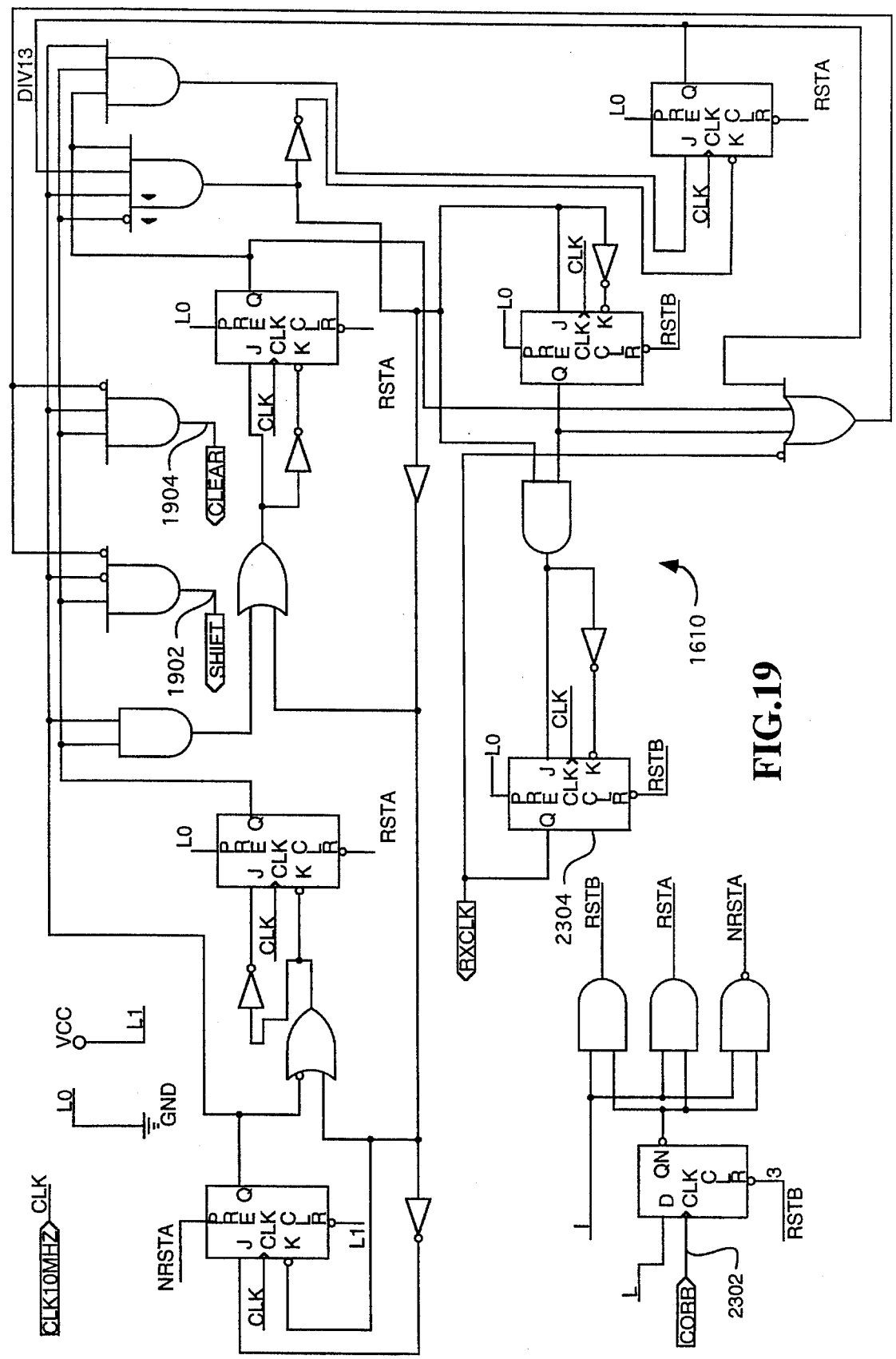
Figure 20A:
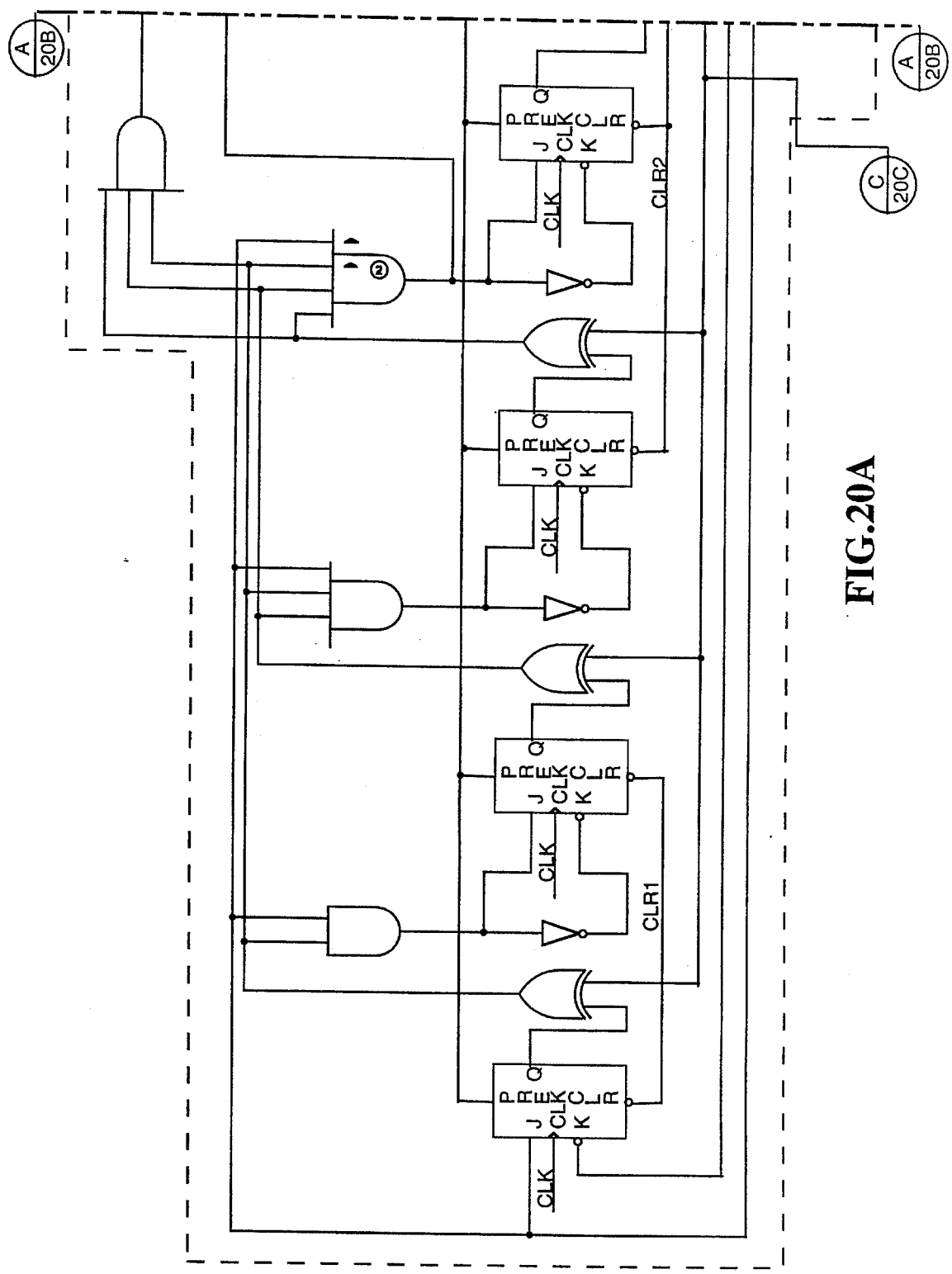
Figure 20B:
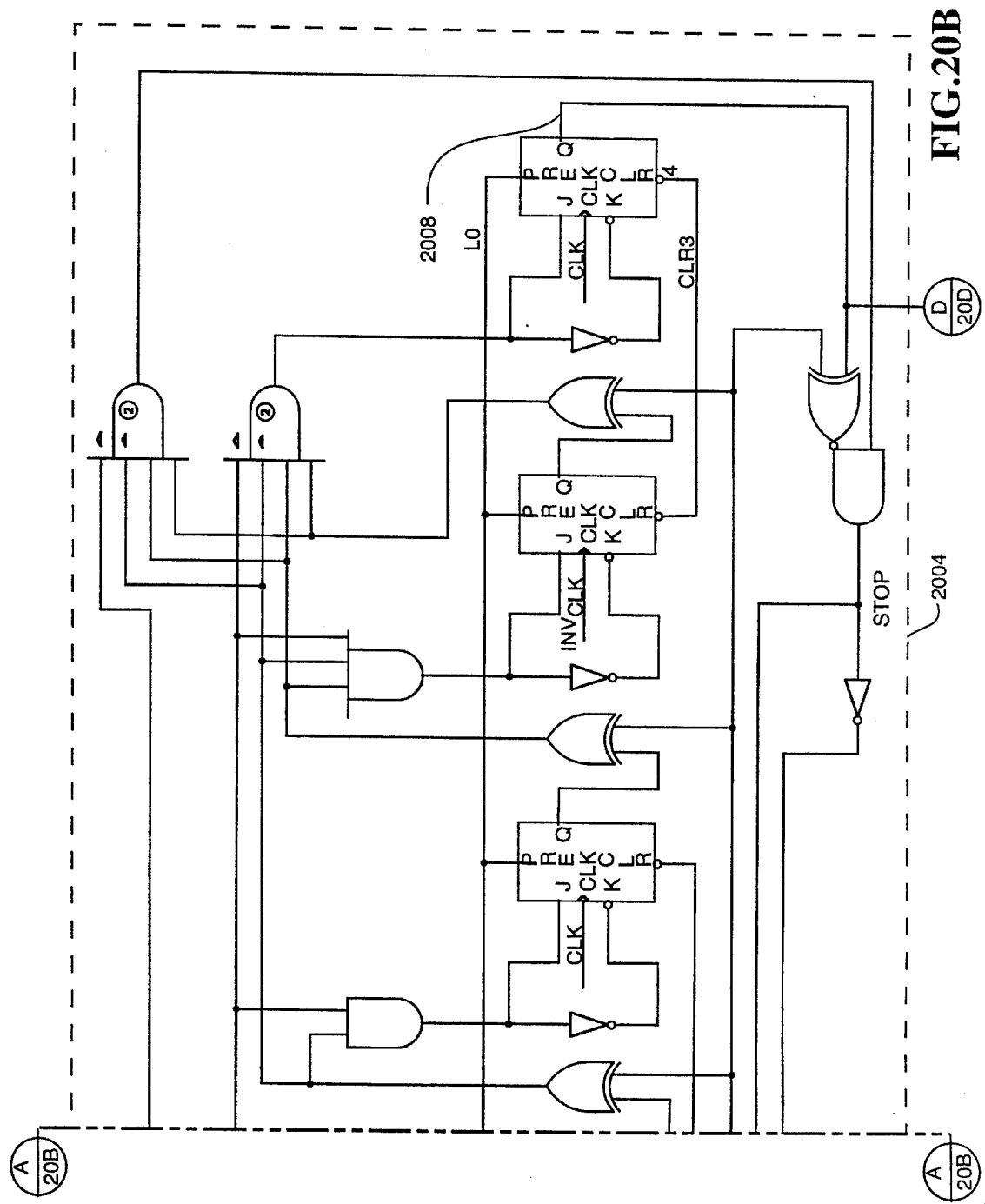
Figure 20C:
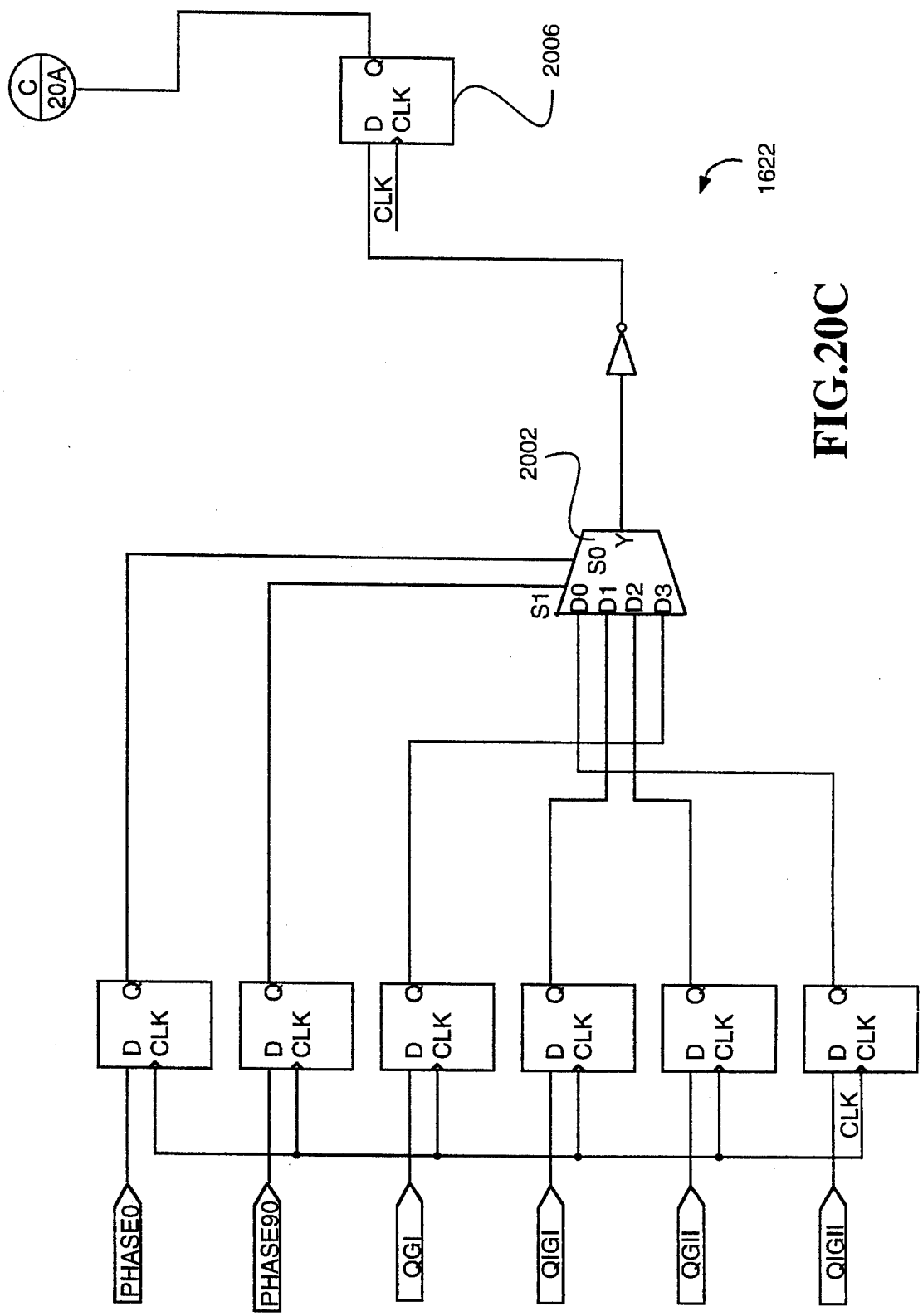
Figure 20D:
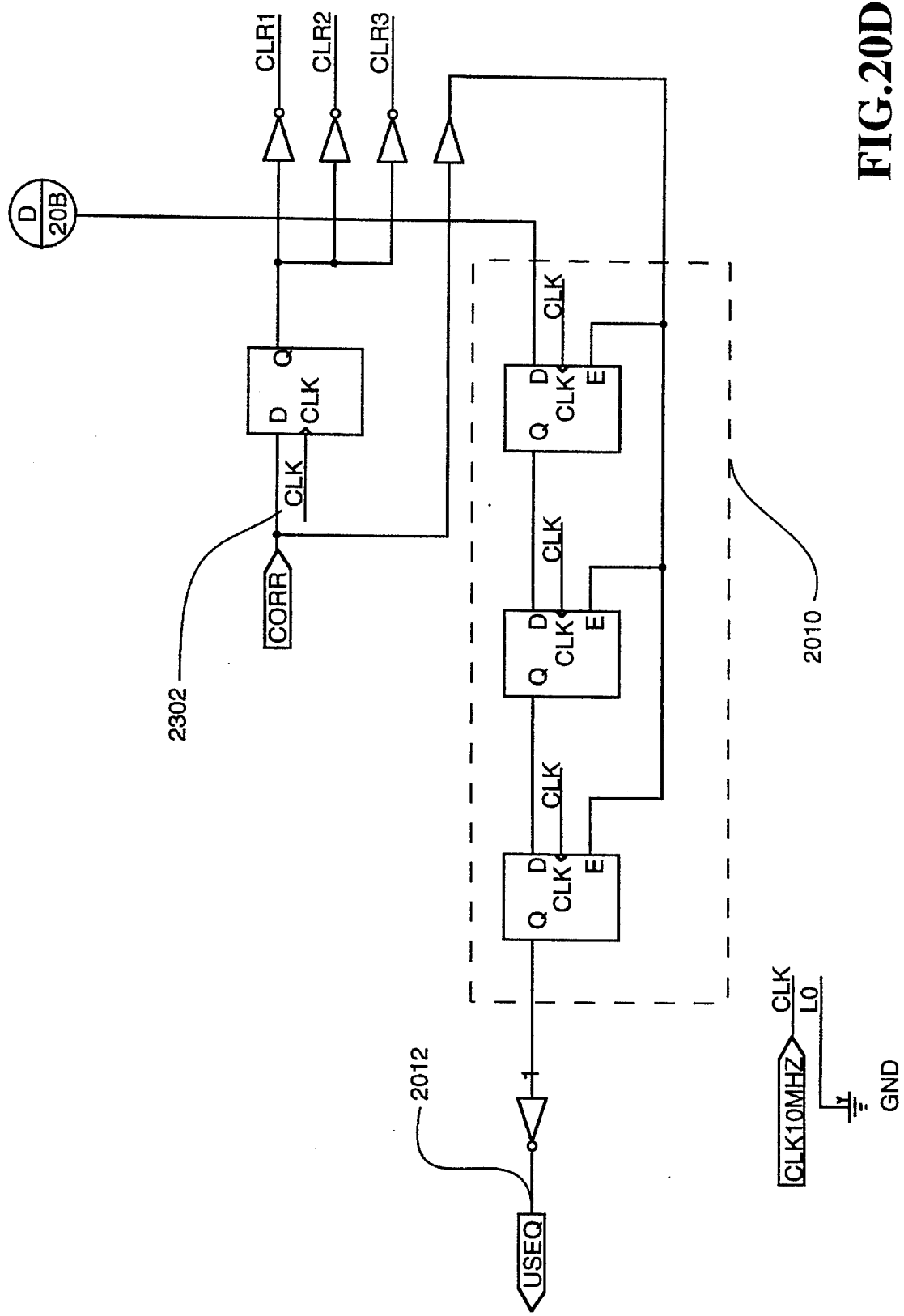
Figure 20C:
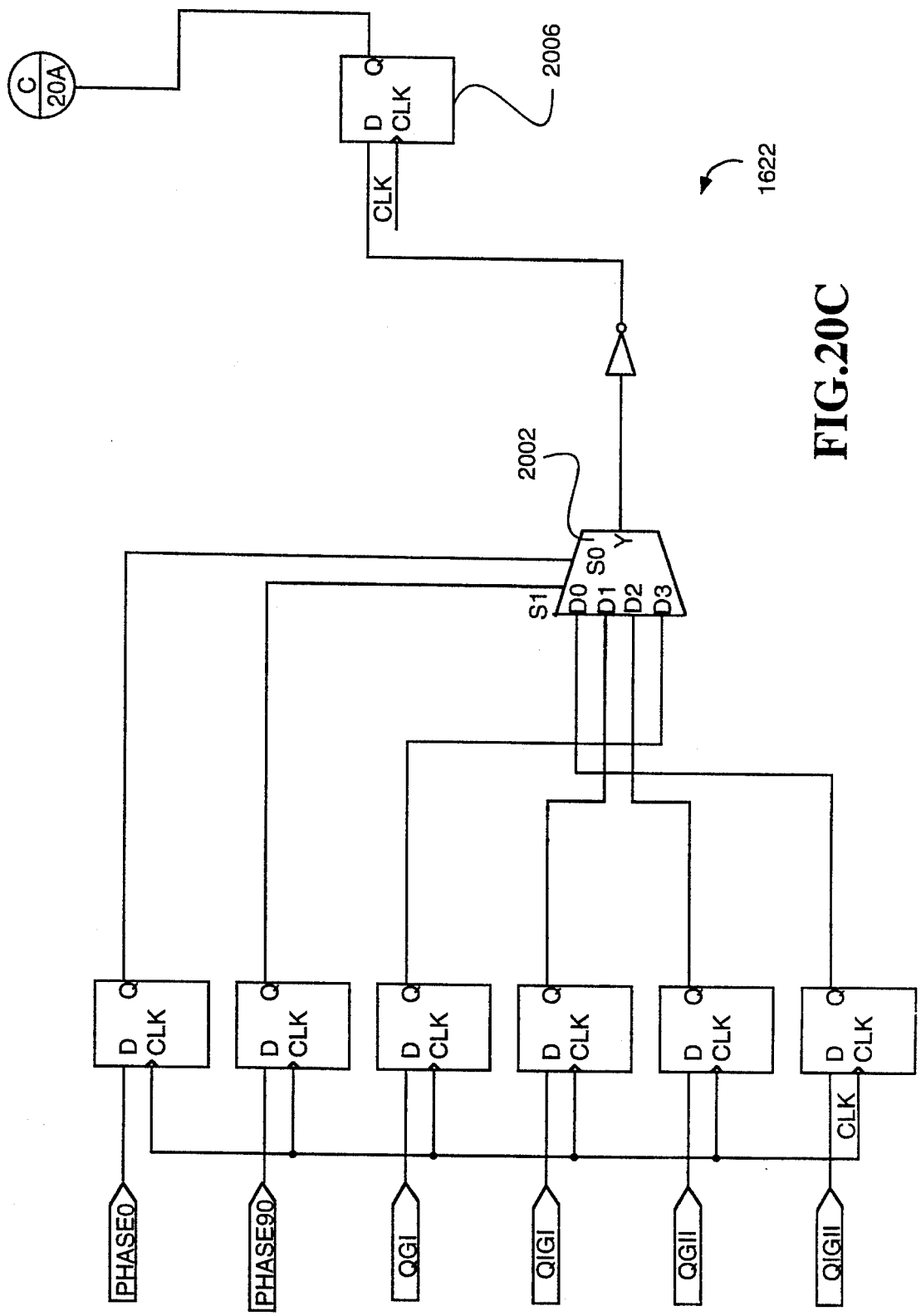
Figure 21:
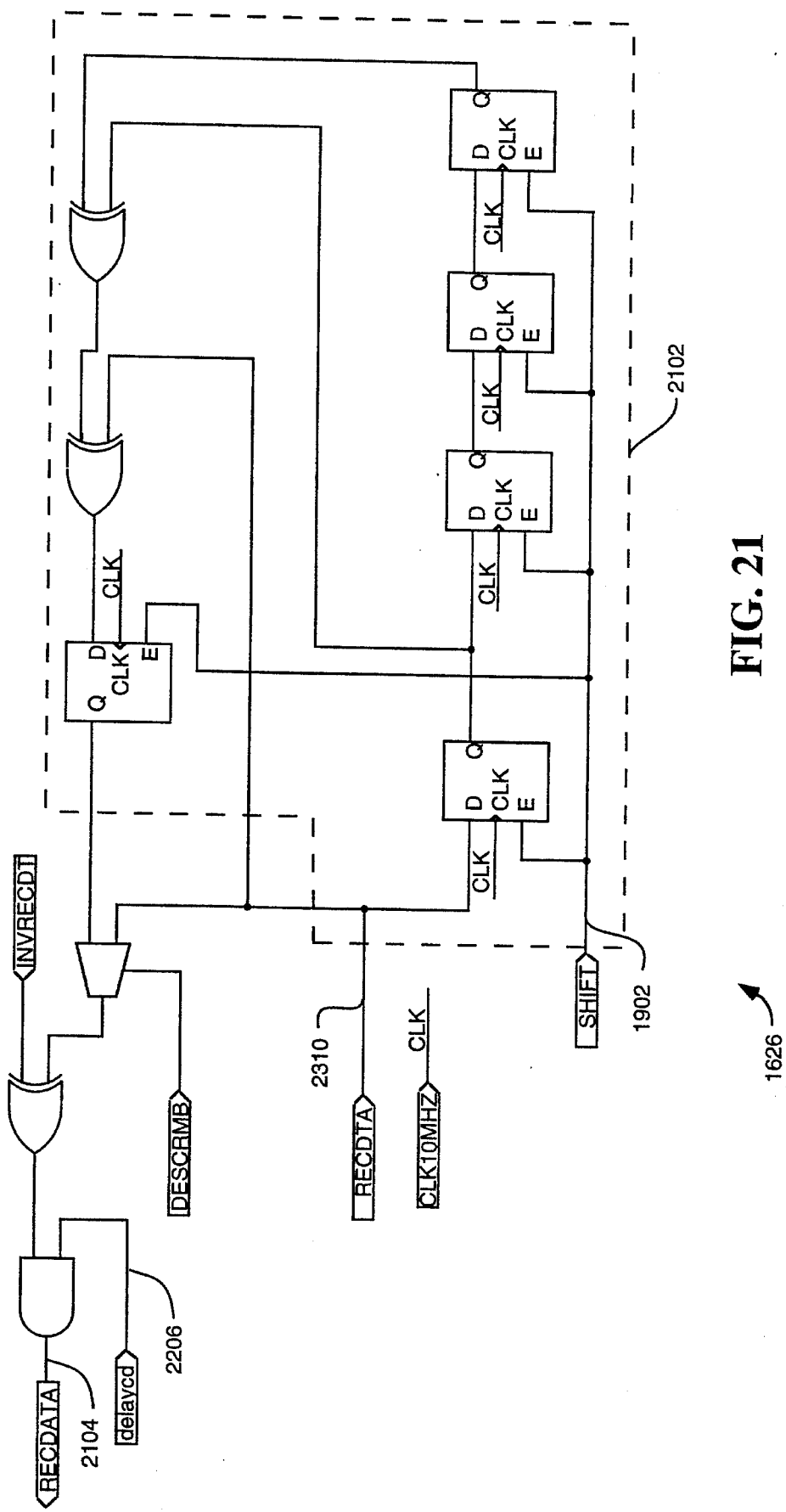

The timing circuit 1610, detailed in FIG. 19, comprises a modulo 52 counter which is reset to the count 'I' when it receives the CORR pulse 2302 and counts up to generate a 100 nsec. pulse on a SHIFT output signal 1902 when the counter reaches the count of 28, and a 100 nsec. pulse on a CLEAR output signal 1904 when the counter reaches the count of 29. The counter continues to count to 52, then overflows to a count of 1. Due to noise-induced jitter in the timing of the received signal, the next CORR pulse 2302 will reset the counter when it is near 52 or 1, but not necessarily exactly equal to 1, thus keeping the SHIFT and CLEAR signals synchronized with the received data. As the counter counts, it generates a receiver clock signal RXCLK 2304 (FIG. 19) for use by external digital equipment for determining when to load in each received data bit in the usual manner for synchronous modems.

Figure 22:
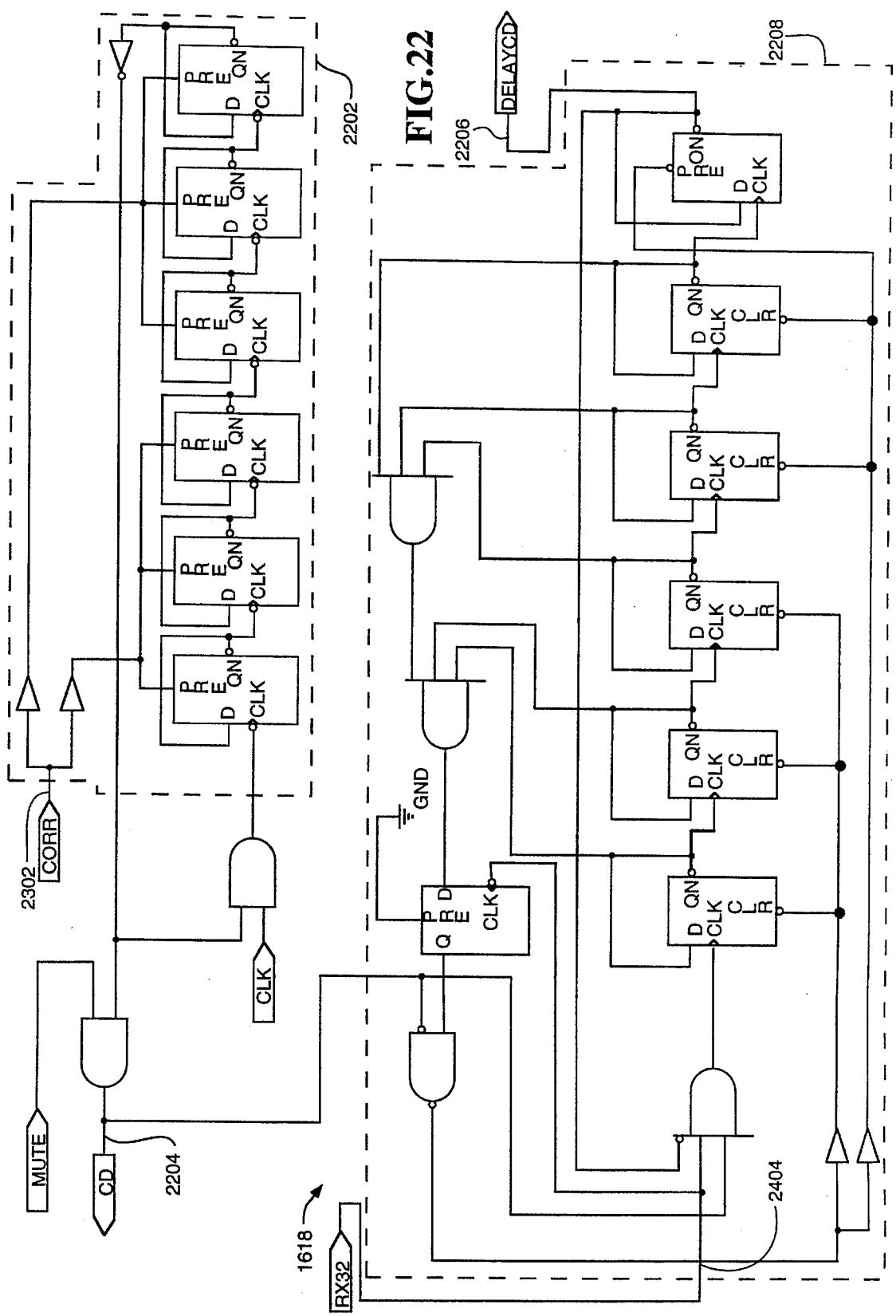

The CD circuit 1618 is detailed in FIG. 22 and contains a 6-bit binary down counter 2202 which is set to a count of 63 by the CORR pulse 2302, and which produces the CD signal 2204 while its count is between 63 and 32. The counter 2202 counts a CDCLK signal 2402 generated by a TXDEL4 circuit 1624 at ⅙ the system clock rate, as shown in FIGS. 16A, B and 24A–D. Thus, once asserted, the CD signal 2204, indicating that a signal has been received (CD is equivalent to a modem's carrier detect signal), will remain asserted for 19.2 microseconds after the last CORR pulse 2302 it receives. Since, during error-free reception, a CORR pulse 2302 will occur approximately every 5.2 μsec. (one data bit time), the CD signal 2204 will remain true even if the CORR pulse 2302 is not produced for two data bit times. The CD circuit 1618 also contains a counter 2208 which receives a divided receive clock RX32, 2404, and the CD signal 2204, and generates a delayed CD signal DELAYCD 2206.

The amplitude processor circuit AMPSEL 1622 receives the CORR signal 2302 as well as the six outputs QUAD (PHASE90), INPHASE (PHASE0), QGI, QGII, QIGI, and QIGII 314–324 of the comparators 302–312, as shown in FIG. 16B. As shown in detail in FIGS. 20A–D, these comparator signals, along with a 4-to-1 multiplexor circuit 2002 whose inputs are the 'greater than' comparators and whose select signals are the 'I' and the 'Q' data signals (PHASE0 and PHASE90), operate to select data from the channel having the highest amplitude for each received chip. AMPSEL 1622 also contains a 7-bit binary up/down counter 2004 which is cleared by the CORR pulse 302, counted at the 10 MHz system clock rate, and directed to count up or down by the output of a flip-flop 2006, depending on whether the 'I' or the 'Q' channel has the strongest data signal. When the magnitude of the I-channel signal is greater than that of the Q signal, the counter 2004 counts down, counting as far as 64 until it freezes and is prevented from counting down further. When the Q-channel has the stronger signal, this counter 2004 will count up to 127, then 0 and then as far as 63, where it freezes and will not count up further. Each CORR pulse 2302 samples the sign of the counter by enabling the sign bit, which is the Q output of the most significant counter stage 2008, to be shifted into a 3-bit shift register 2010 whose output is a USEQ signal 2012. The shift register 2010 corresponds in a timing sense to the three bit shift registers 1714 and 1716 in the I-channel data recovery circuits, IREC, (and identical structure in the Q-channel), so that the particular value of the USEQ signal 2012 which corresponds to the received amplitudes of all of the chips of a particular data bit is used to select which channel should provide that data bit to a RECDTA output signal 2310 of the DATAREC circuit 1604.

Figure 23A:
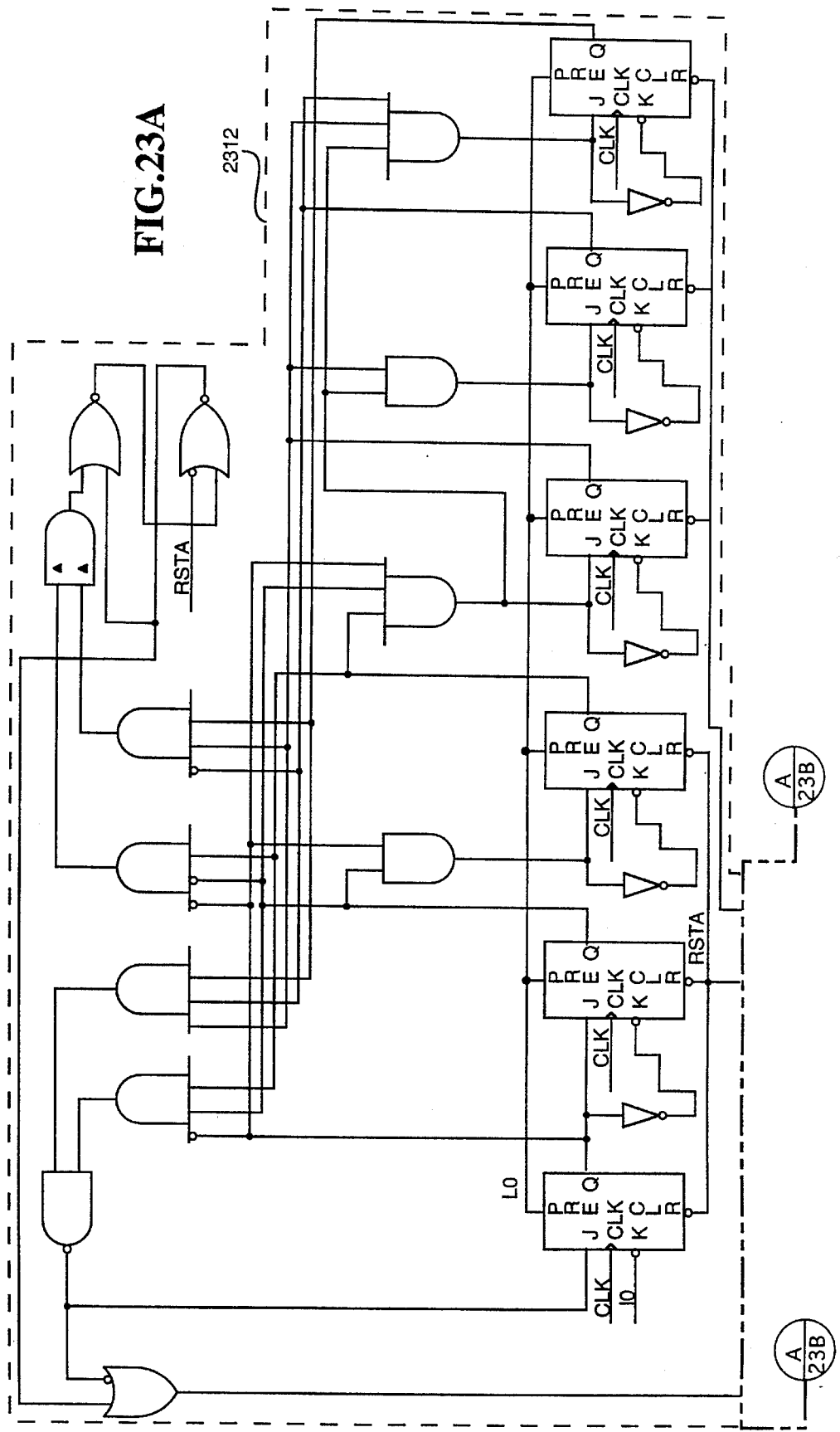
Figure 23B:
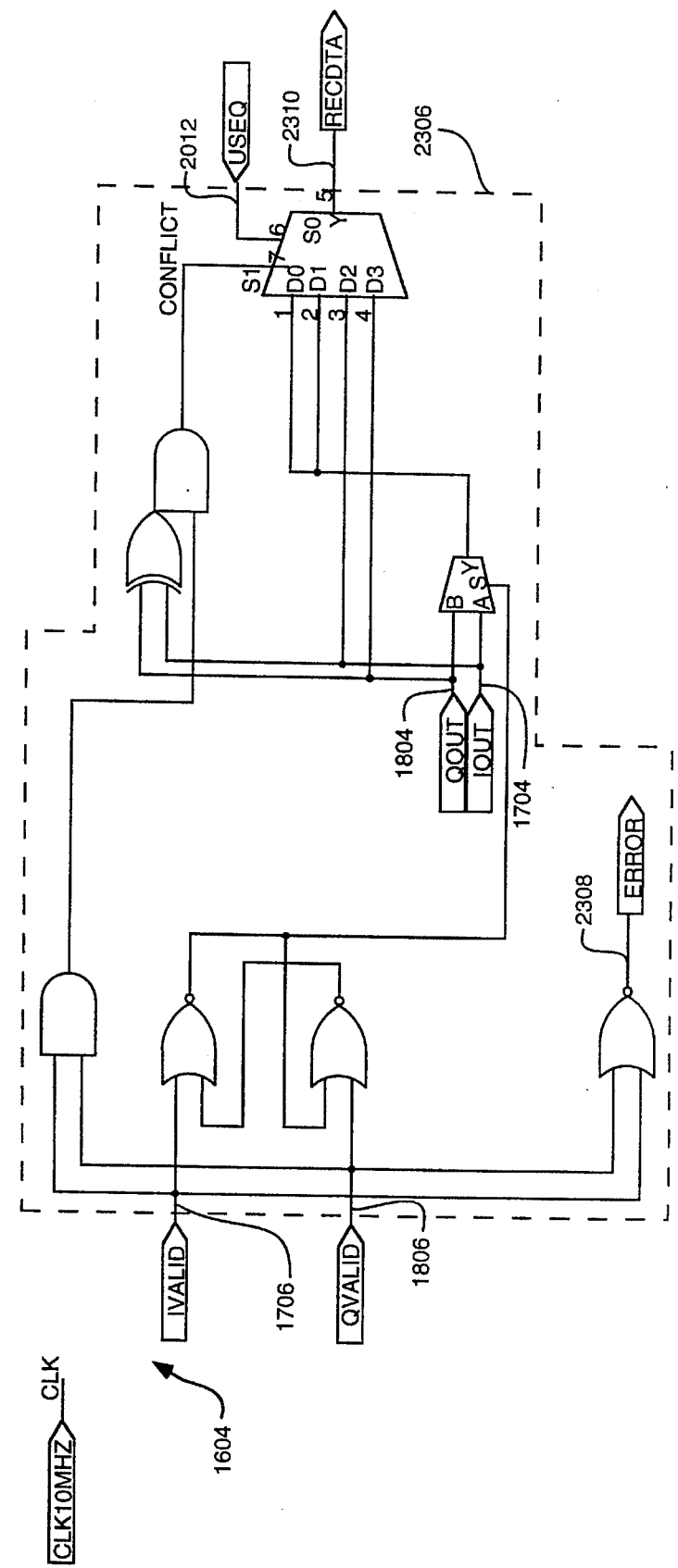
Figure 23B:
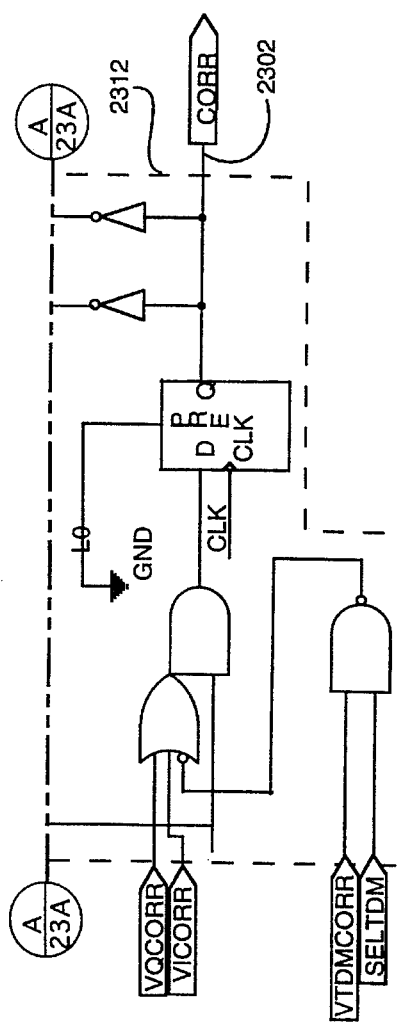
Figure 24A:
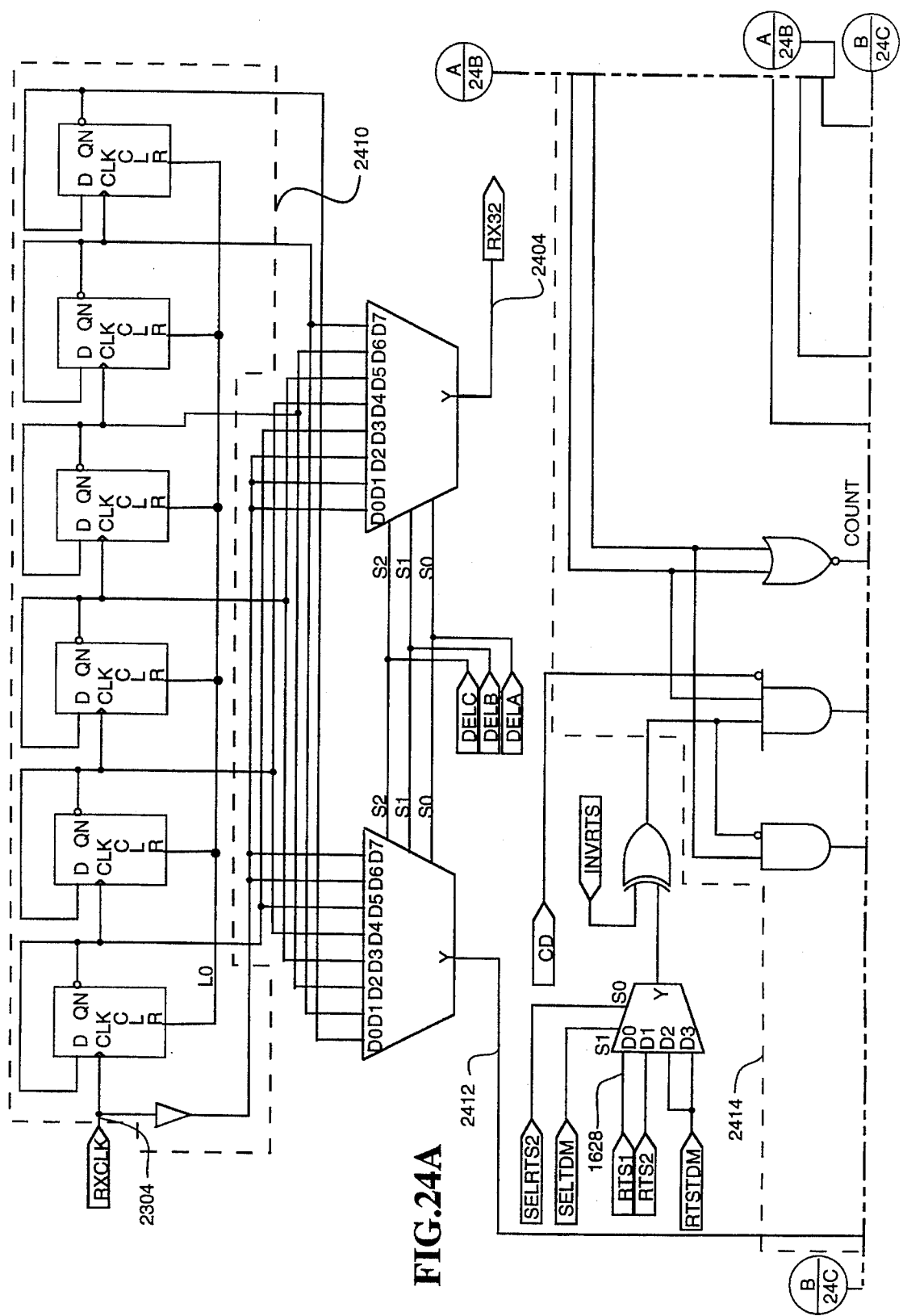
Figure 24B:
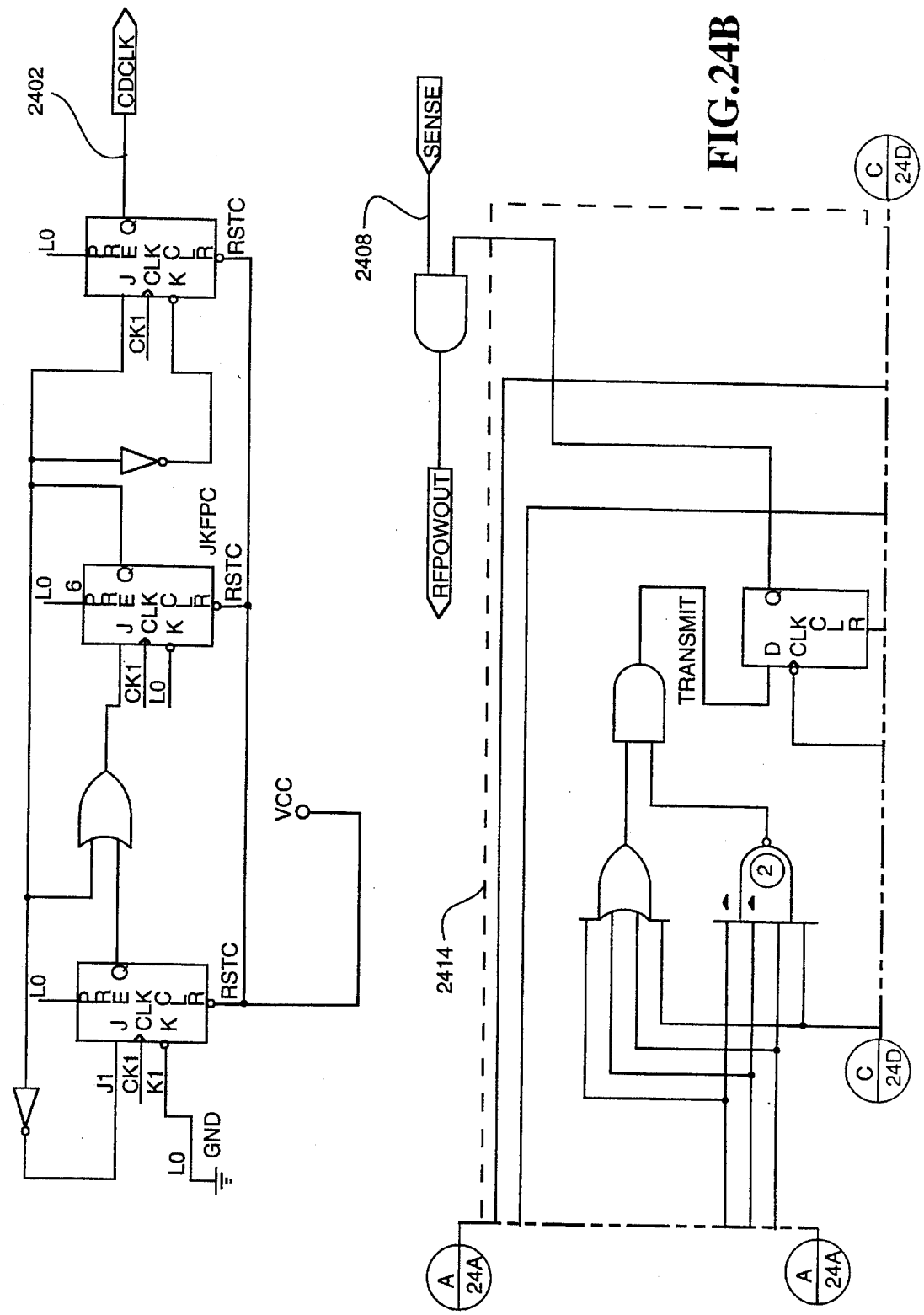
Figure 24C:
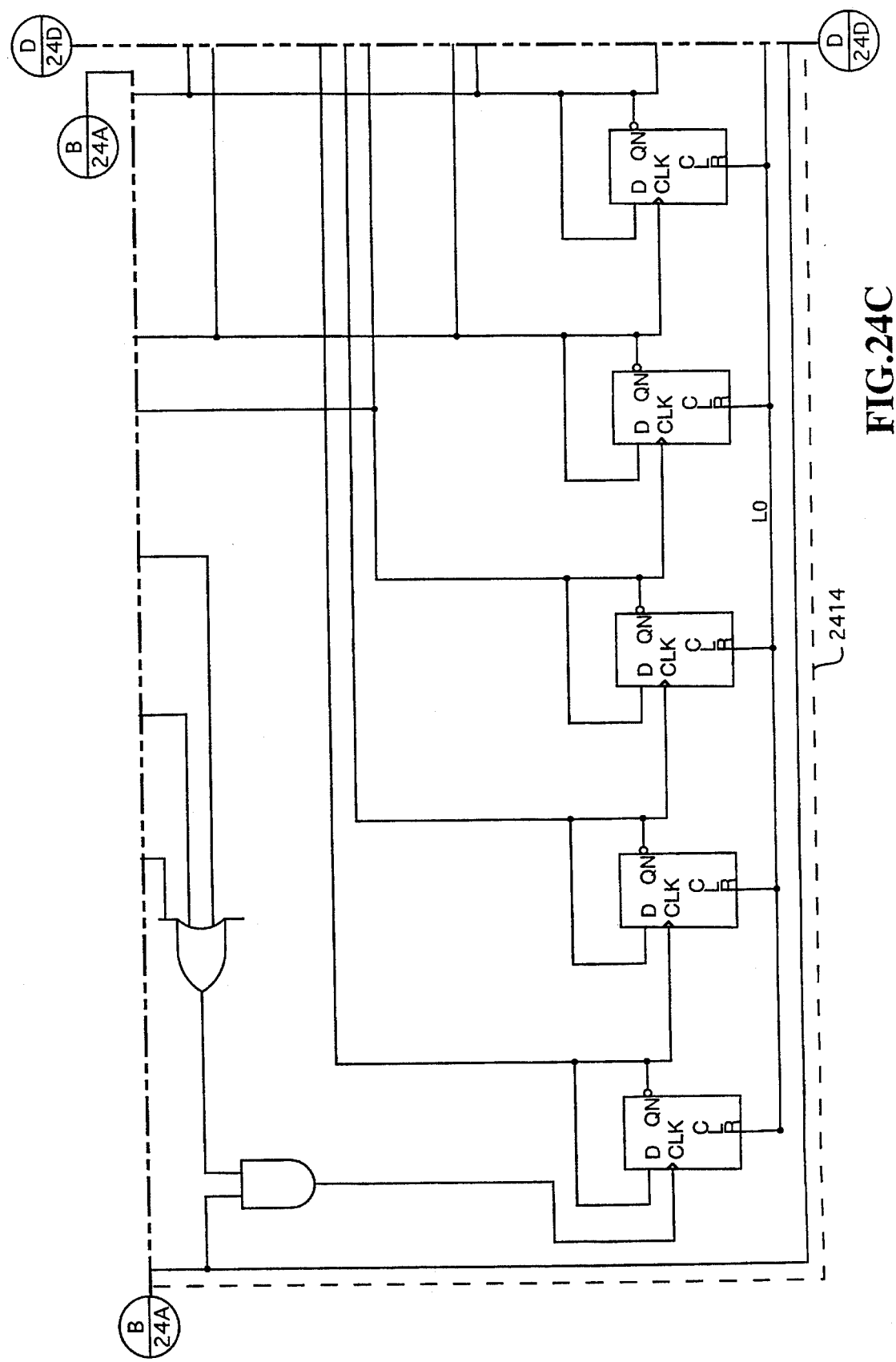
Figure 24D:
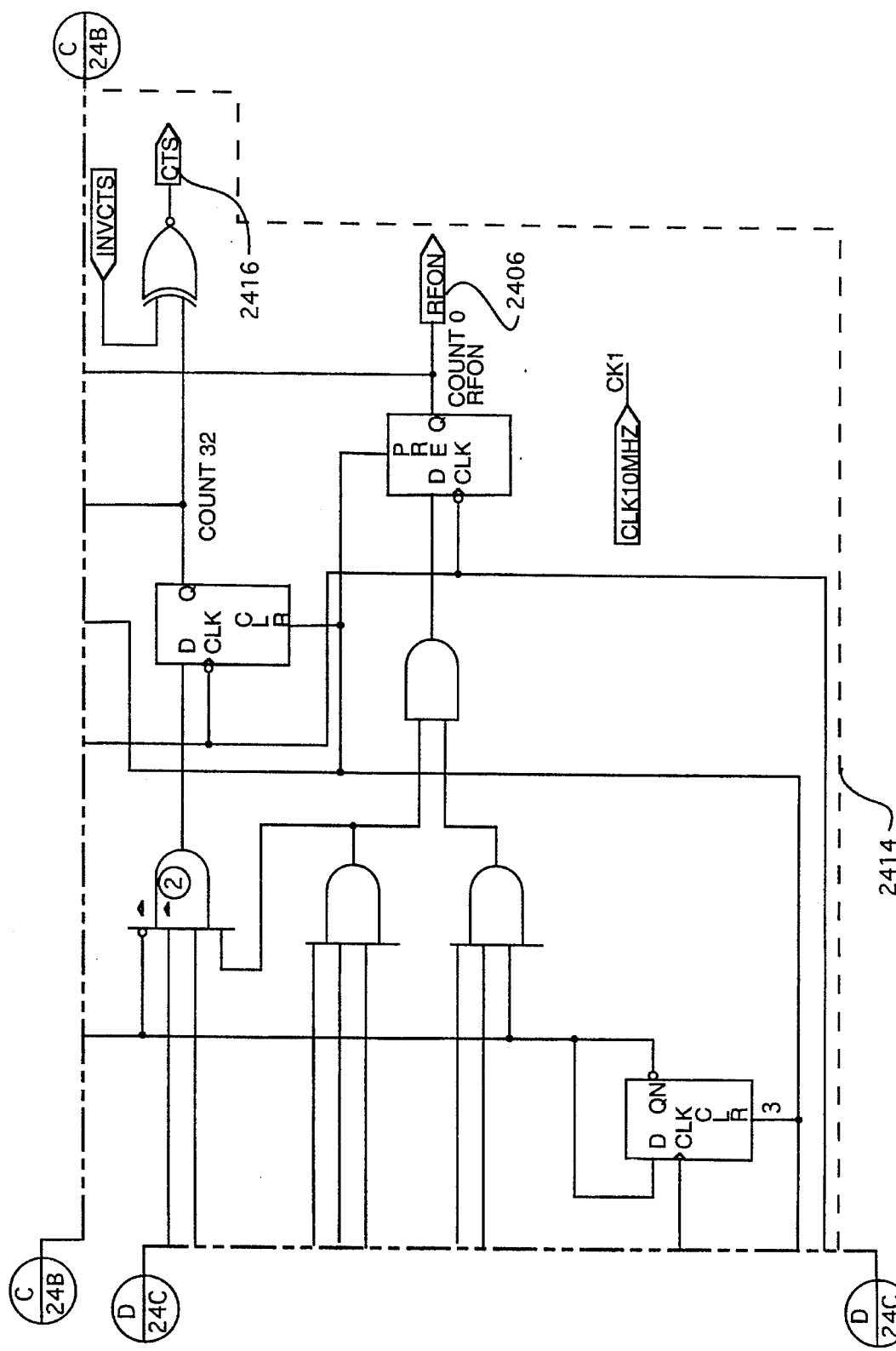

The signals USEQ, IVALID, QVALID, IOUT, and QOUT are provided to a selector element 2306 of the DATAREC circuit 1604 as shown in FIG. 23, where the best source of received data is selected for each bit of received information. For each received bit, if only one of the 'I' or the 'Q' channels indicated valid data, then that channel's data will be used for that bit. If both channels indicated valid data and both channels produced the same data value, then Q channel data will be selected to drive the received data output. If both channels indicated valid data, and the data values disagree, then the USEQ signal 2012 from the AMPSEL circuit 1622 is used to select the channel with the strongest average received amplitude over all the code chips of that bit.

A descrambler circuit DESCR 1626 receives the data signal RECDATA 2310 from the DATAREC circuit 1604, along with the SHIFT signal 1902 from the TIMING circuit 1610 and a delayed CD signal DELAYCD 2206, as shown in FIGS. 16A, B. The DESCR circuit 1626 is shown in schematic detail in FIG. 21, where it can be seen to reverse the scrambling introduced at the transmitter using a feedback shift register 102 whose structure and function is well known in the digital design art and which reverses the effect of the transmitter's feedback shift register circuit (such as the shift register 1002 in FIGS. 10A–C), thus producing a received data signal RECDATA 2104 to the external digital equipment, as the RXDTA signal 406 in FIGS. 4A, B, as soon as the delayed CD signal DELAYCD 2206 is true.

A TXDEL circuit 1624 receives the request to send signal RTS 1628 and the RXCLK received clock signal 2304, and generates a clock signal CDCLK 2402 for a carrier detect circuit 1618, a clock signal RX32 2404 for the delayed CD circuit 2208, and RF section control signals RFON 2406 and RFPOWEROUT 2408, to control the power to the transmitter power amplifier and the antenna switch, as shown in FIGS. 1A, 1B, 4A, 4B and 16A. The TXDEL circuit 1624 is shown in schematic detail in FIG. 24B, where it uses a counter 2410 to divide the RXCLK signal 2304 to generate the RX32 signal 2404, and uses a counter 2414 to provide the necessary delay between the assertion of the RTS signal 1628 by the external digital equipment and the actions of disconnecting the antenna from the receiver input, powering up the transmitter power amplifier so that the transmitter begins radiating RF energy, and asserting the CTS signal 2416 so that the external digital system is enabled to send data, in the usual manner of a synchronous modem with handshake signals.

OPERATION

In a system wherein the transmitter is transmitting to a receiver, the system clock of the receiver will not, in general, be in synchronization with the system clock of the transmitter. Because the 60 MHz demodulation signal in the receiver is phase locked to the receiver's 20 MHz master crystal oscillator, and is not, therefore, locked to the frequency of the modulation of the incoming signal from the remote transmitter, the phase of the receiver clock will continuously change with respect to the phase of the received signal, and thus the outputs of the receiver demodulators will display the effects of the heterodyne, or 'beat' between the transmitter clock and the receiver clock. The effect is that the output of a receiver demodulator will periodically null, that is, produce no data.

The frequency of this beat is a function of the number of times the 5 ppm accuracy 20 MHz master oscillator frequency is multiplied to produce the transmitter carrier frequency. A 5 ppm error at 20 MHz is 100 Hz, so that the oscillator with such an error would be producing a 20.0001 MHz signal. A 1000 MHz oscillator whose output is divided by 50 to be phase-locked to the 20.0001 MHz signal will actually be locked to the frequency 1000.005 MHz. This 1000 MHz signal is now in error by 5 KHz. Using a typical spread-spectrum non-licensed transmission band centered on 912.5 MHz, if the transmitter crystal is exactly on frequency, but the receiver crystal is a full 5 ppm high in frequency, then the output of the first receiver mixer, where a signal of exactly 912.5 MHz from the transmitter is mixed with a local oscillator which is 5 ppm higher than 972.5 MHz, the resulting IF output will not be centered on exactly 60 MHz, but rather 60.0048625 MHz. Then, when this IF signal is mixed with a 60 MHz oscillator that locked to the 20.0001 MHz crystal and thus is also in error by 5 ppm, or 300 Hz, the resulting spread IF signal contains a beat of 4.5625 KHz. The period of this beat is 219.1 µsec., so that each demodulator output goes to zero due to the beat every 109.5 µsec. Since this receiver uses two demodulators which are driven by 60 MHz local oscillator signals 90 degrees out of phase with each other, the resulting beats in the outputs of the two demodulators occur 90 degrees out of phase at the beat frequency. Therefore when the output of one demodulator is at its minimum, the output of the other demodulator is at its maximum. The use of both demodulator outputs to provide one good signal is a key to the processing of the received signal in this invention.

The preferred embodiment accepts a 192 Kilobit per second (Kb) signal from the data output of a system wishing to transmit data. Thus each data bit occupies 5.2 µsec. A 13-bit Barker code is used to spread the transmitted signal, so the chip rate of the resulting spread data signal is 400 nsec. per chip. The relationship between the crystal accuracy and the data rate using the receiver of this invention is that a bit must be able to be completely transmitted during a time when at least one of the receiver demodulators is not going through a minimum output period due to the beat as described above. Therefore the crystal accuracy, the transmission carrier frequency, the transmitted bandwidth, and the data rate must be selected according to the principles described above to meet this basic requirement. In the worst case of the present example, where the transmitter crystal is 5 ppm low and the receiver is 5 ppm high (or vice versa), the beat frequency is around 9 KHz, so each demodulator output nulls approximately every 55.5 µsec. Thus a bit must occupy less than 55.5 µsec. Since the transmission bandwidth is directly dependent upon the chip rate, the code length must be selected to permit a bit to be sent in less than the time determined by the beat frequency.

It can now be seen that the BB and AMPSEL circuits serve to track the quality of the received signal and thus to indicate which channel had the best quality of the receive data during the reception of each bit. This indication is only used when both channels indicated valid and correlated data and have unequal data values. The creation of the valid and correlated signals also make important contributions to the data recovery circuit's ability to reliably operate with short pN codes and without synchronization between the transmitting entity and the receiving entity.

An important aspect of the correlation detection method used in this invention is the generation of the INVALID signal by circuitry associated with the 52 bit shift register at the input to each receiver channel. The INVALID signal is generated by sampling each chip 4 times and insisting that each pair of adjacent samples in all 13 chips have the same value at one time. This process tends to reject noise, as noise tends to disrupt adjacent samples. If no noise disrupts the demodulator output, then the INVALID signal will be true only when the first and the second stage of each group of 4 shift register stages contain samples of different chips having different values. This will occur for at most 1 out of every 4 system clocks. When noise is present in the demodulator output, INVALID will be generated more often, and may be true all the time, even when all the chips of a single noise-damaged bit are correctly aligned in the 52 stages of the shift register. In this case, the INVALID circuitry will have done its job by causing the noisy data to be ignored.

The 52 bit shift register at the input of each receiver channel also forms a parallel correlator in conjunction with the XOR gates which compare one sample of each chip with the 13-bit Barker code used by this system. When no noise is present in the demodulator output, all 13 XOR correlation gates will indicate a perfect match or a perfect anti-match for 4 system clock periods. With reference to the description above of the transmitter operation, a match occurs when the bit transmitted is one value, causing all the chips of the code to be transmitted without inversion, and an anti-match occurs when the transmitted bit has the opposite value, causing all the code bits to be inverted, producing no match at each position. Note that random noise would tend to produce a match at half the bit positions, or 6 to 7 bits of match. When the received data is somewhat noisy, one chip may be in error and prevent a perfect match or perfect anti-match. It has been determined that good results can be achieved by tolerating one incorrect chip per bit. As the received chips shift through the shift register, the unary adder adds the number of matches found. When the number of matching chips is either 0-or-1 or is 12-or-13, the polarity generator and the match comparison circuits described above generate the CORR signal. The data bit is set TRUE if 12-or-13 chips matched, and is set FALSE if 0-or-1 chips matched.

Finally, each receiver channel further rejects noise by windowing valid correlation signals independently, and then the common data recovery circuit windows the combined results of the independently windowed signals. The windowing has the effect of ignoring valid correlation signals that occur too soon after the previous such signal was received. While a window counter may be started on a spurious valid correlation, it will tend to fall into step with the phase of the received data bits if the data signal is strong enough to be usable.

While the foregoing detailed description has described an embodiment of a low cost spread spectrum communications system in accordance with this invention, it is to be understood that the above description is illustrative only and not limiting of the disclosed invention. Thus the invention is to be limited only by the claims as set forth below.

What is claimed is:

1. A spread spectrum open loop data recovery processor, comprising:
   a balanced demodulator receiving a single information channel bi-phase modulated spread spectrum RF signal and a fixed frequency signal, the balanced demodulator combining the two signals to provide and in-phase information signal and a ('Q') quadrature information signal;
   an oscillator for providing the fixed frequency signal; and
   a digital processor receiving the in-phase information signal and the quadrature information signal and a predetermined spreading code, the digital processor filtering both the in-phase and the quadrature information signals for noise and correlating the filtered information signals with the predetermined spreading code, the digital processor defining an information signal quality based on the filtering and the correlation and determining which information signal has thee better signal quality, and selecting the better quality information signal for output as a received data signal and outputting a clock signal for use with the received data signal,
   whereby a single spread spectrum information channel is provided without phase locking to the received RF signal.

2. The data recovery processor as set forth in claim 1, wherein the oscillator has an accuracy of at least five parts per million.

3. The data recovery processor as set forth in claim 1, wherein the spreading code does not exceed 31 bits in length.

4. The data recovery processor as set forth in claim 3, wherein the spreading code is a 13-bit Barker code.

5. The data recovery processor as set forth in claim 1, wherein the digital processor outputs the selected information signal as a data output signal and outputs a clock signal for use with the data output signal.

6. The data recovery processor as set forth in claim 1, further comprising:
   the balanced demodulator providing an analog in-phase information signal and an analog quadrature information signal, each having an amplitude;
   an amplitude comparator receiving the analog information signals and providing a digital output signal indicating which analog information signal has the create amplitude; and
   the digital processor selecting the better quality information signal as follows:
      if both information signals are free of noise and are correlated with the spreading code, and the information signals agree, a predetermined one of the signals is selected;
      else, if exactly one information signal is both free of noise and is correlated with the spreading code, that one information signal is selected;
      else, if both information signals are free of noise and are correlated with the spreading code, and the information signals do not agree, the information signal having the greater amplitude is selected.

7. The data recovery processor as set forth in claim 6, wherein the greater amplitude signal is averaged throughout a predetermined interval and the information signal having the greater average amplitude during the interval is used to select the better quality information signal when both information signals are free of noise, correlated and do not agree.

8. The data recovery processor as set forth in claim 7, wherein the received RF signal in cooperation with the digital processor defines a data-bit interval and the predetermined averaging interval is the defined data-bit interval.

9. The data recovery processor as set forth in claim 8, wherein the digital processor defines an expected start time for the data-bit interval and rejects an information signal representing a data bit having a start time significantly different from the defined start time.

10. The data recovery processor as set forth in claim 1, wherein the received RF signal in cooperation with the digital processor defines a spreading chip and the digital processor defines a correlation threshold such that correlation is successful if at least a predetermined number of the spreading chips match the spreading code.

11. The data recovery processor as set forth in claim 1, wherein the digital processor includes separate processing channels for the in-phase and the information quadrature signals.

* * * * *